United States Patent
Lant et al.

(10) Patent No.: US 10,723,976 B2
(45) Date of Patent: Jul. 28, 2020

(54) FABRIC SOFTENING COMPOSITIONS COMPRISING AN ESTERQUAT AND BACTERIAL NUCLEASE ENZYME

(71) Applicant: The Procter & Gamble Company, Cincinnati, OH (US)

(72) Inventors: Neil Joseph Lant, Newcastle upon Tyne (GB); Klaus Gori, Bagsvaerd (DK)

(73) Assignee: The Procter & Gamble Company, Cincinnati, OH (US)

(*) Notice: Subject to any disclaimer, the term of this patent is extended or adjusted under 35 U.S.C. 154(b) by 131 days.

(21) Appl. No.: 15/947,889

(22) Filed: Apr. 9, 2018

(65) Prior Publication Data

US 2018/0298307 A1  Oct. 18, 2018

(30) Foreign Application Priority Data

Apr. 12, 2017 (EP) .................... 17166318

(51) Int. Cl.
| | | |
|---|---|---|
| C11D 1/62 | (2006.01) | |
| C11D 3/00 | (2006.01) | |
| C11D 3/386 | (2006.01) | |
| C11D 11/00 | (2006.01) | |

(52) U.S. Cl.
CPC ............ C11D 3/001 (2013.01); C11D 1/62 (2013.01); C11D 3/38636 (2013.01); *C11D 11/0017* (2013.01); *C12Y 301/21* (2013.01); *C12Y 301/22* (2013.01); *C12Y 301/30001* (2013.01); *C12Y 301/30002* (2013.01)

(58) Field of Classification Search
CPC .......... C11D 1/62; C11D 3/001; C11D 3/386; C11D 3/3927; C11D 11/0017
See application file for complete search history.

(56) References Cited

U.S. PATENT DOCUMENTS

| | | | |
|---|---|---|---|
| 6,566,114 B1 | 5/2003 | Kauppinen et al. | |
| 7,012,053 B1* | 3/2006 | Barnabas | C11D 3/221 510/101 |
| 8,617,542 B2 | 12/2013 | Madhyastha et al. | |
| 8,765,123 B1 | 7/2014 | Kaplan | |
| 9,205,133 B2 | 12/2015 | Dawson et al. | |
| 9,675,736 B2 | 6/2017 | Burgess et al. | |
| 2001/0014659 A1* | 8/2001 | Convents | C11D 3/386 510/392 |
| 2003/0203466 A1* | 10/2003 | Kauppinen | C12Y 302/0107 435/200 |
| 2006/0189507 A1* | 8/2006 | Metrot | C11D 1/83 510/515 |
| 2014/0230156 A1* | 8/2014 | Lant | C11D 1/62 8/137 |
| 2015/0299623 A1 | 10/2015 | Gori et al. | |
| 2016/0060611 A1* | 3/2016 | Alekseyev | C12Y 304/2402 510/226 |
| 2016/0319224 A1* | 11/2016 | Lant | C11D 11/0017 |
| 2016/0319225 A1 | 11/2016 | Lant et al. | |
| 2016/0319226 A1 | 11/2016 | Lant et al. | |
| 2016/0319227 A1 | 11/2016 | Lant et al. | |
| 2016/0319228 A1 | 11/2016 | Lant et al. | |
| 2017/0081616 A1 | 3/2017 | Baltsen et al. | |
| 2017/0081617 A1* | 3/2017 | Allesen-Holm | C11D 3/38636 |
| 2017/0107457 A1 | 4/2017 | Gori et al. | |
| 2017/0152462 A1 | 6/2017 | Baltsen et al. | |
| 2017/0319224 A1 | 11/2017 | Hultgren et al. | |

FOREIGN PATENT DOCUMENTS

| | | |
|---|---|---|
| WO | WO2017059801 A1 | 4/2017 |
| WO | WO2017059802 A1 | 4/2017 |
| WO | WO2017060475 A2 | 4/2017 |
| WO | WO2017060493 A4 | 4/2017 |
| WO | WO2017060505 A1 | 4/2017 |

OTHER PUBLICATIONS

Search Report for application No. 17166318.0-1358, dated Jul. 26, 2017, 6 pages.
Search Report for application PCT/US2018/026650, dated Jul. 4, 2018. 13 pages.
U.S. Appl. No. 15/827,021, filed Nov. 30, 2017, Neil Joseph Lant.

* cited by examiner

*Primary Examiner* — Charles I Boyer
(74) *Attorney, Agent, or Firm* — Andres E. Velarde; Melissa G. Krasovec

(57) ABSTRACT

A fabric softener composition comprising a quaternary ammonium ester fabric softener compound and an enzyme selected from specific nuclease enzymes, galactanase enzymes and mannanase enzymes. Also, methods of treating a fabric comprising a laundering step, optional rinsing steps and a rinse-treatment step in which the fabric is treated with an aqueous rinse liquor comprising the composition.

6 Claims, No Drawings
Specification includes a Sequence Listing.

FABRIC SOFTENING COMPOSITIONS COMPRISING AN ESTERQUAT AND BACTERIAL NUCLEASE ENZYME

FIELD OF INVENTION

This invention relates to softener compositions comprising enzymes.

BACKGROUND OF THE INVENTION

Microorganisms generally live attached to surfaces in many natural environments. Bi-products of bacteria may include extracellular substances including biopolymers and macromolecules which result in a soil which comprises slimy residue, or biofilm soil. Such slimy residues (biofilm soils) are difficult to remove from laundry items an adhesion of other soils such as particulates can be particularly problematic. Further, when very dirty laundry items are washed together with less dirty laundry items the dirt present in the wash liquor may adhere to the slimy residue soil so that some items may even be more "soiled" after washing. Build up of soils over time is undesirable for both coloured and white fabrics but may be particularly noticeable on white or pale-coloured fabrics, for example around collars and cuffs where incomplete cleaning occurs. These soils may exacerbate malodour, which may particularly develop after use of the laundry item and may be particularly problematic for example for sportswear.

International patent applications WO 2011/098579 (University of Newcastle) and WO 2014/087011 (Novozymes A/S) relate to deoxyribonuclease compounds and their uses. WO2016/176282 describes that compositions comprising nuclease enzymes have been found to be especially effective at cleaning fabrics having a fabric care composition deposited thereon.

SUMMARY OF THE INVENTION

This invention relates to a fabric softener composition comprising (i) from 2 to 50 wt % fabric softener compound comprising a quaternary ammonium ester compound having the following formula:

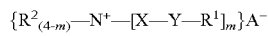

wherein:
m is 1, 2 or 3 with proviso that the value of each m is identical;
each $R^1$ is independently hydrocarbyl, or branched hydrocarbyl group, preferably $R^1$ is linear, more preferably $R^1$ is partially unsaturated linear alkyl chain;
each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_{2-3}$ alkoxy), polyethoxy, benzyl;
each X is independently $(CH_2)n$, $CH_2$—$CH(CH_3)$— or $CH$—$(CH_3)$—$CH_2$— and
each n is independently 1, 2, 3 or 4, preferably each n is 2;
each Y is independently —O—(O)C— or —C(O)—O—;
A– is independently selected from the group consisting of chloride, methyl sulfate, and ethyl sulfate, preferably A– is selected from the group consisting of chloride and methyl sulfate;
with the proviso that when Y is —O—(O)C—, the number of carbons in each IV is from 13 to 21, preferably from 13 to 1; and (ii) a soil-weakening enzyme selected from (a) nuclease enzymes having at least 60%, or at least 80%, or at least 90% or at least 95% identity with the amino acid sequence shown in any of SEQ ID NOs 1 to 107, (b) galactanase enzymes having at least 60%, or at least 80%, or at least 90% or at least 95% identity with the amino acid sequence shown in any of SEQ ID NO:108, SEQ ID NO:109 and SEQ ID NO:110, and (b) mannanase enzymes having at least 60% or at least 80%, or at least 90% or at least 95% sequence identity with the amino acid sequence shown in any of SEQ ID NO:111, SEQ ID NO:113, SEQ ID NO:114 and SEQ ID NO:115, and an amino acid sequence having at least 81% sequence identity to SEQ ID NO: 112 and (d) mixtures thereof.

Preferred nucleases are selected from deoxyribonuclease and ribonuclease enzymes.

The fabric softener component is selected from the group consisting of cationic softener components, silicone softener components, paraffins, waxes, dispersible polyolefins and mixtures thereof. Preferred softener components comprise cationic softener components, most preferably quaternary ammonium components, most preferably quaternary ammonium ester softening component. Preferably the fabric softener composition is a liquid.

The present invention also provides a method of treating a fabric, the method comprising the steps of (i) in a laundering step, treating a fabric with an aqueous wash liquor comprising from 0.1 g/l to 5 g/l of a surfactant, preferably comprising anionic and/or nonionic surfactant; (ii) optionally rinsing the textile one or two or more times with water; and (iii) in a rinse-treatment step, treating the fabric with an aqueous rinse liquor comprising soil-weakening enzyme selected from a soil-weakening enzyme selected from (a) nuclease enzymes having at least 60%, or at least 80%, or at least 90% or at least 95% identity with the amino acid sequence shown in any of SEQ ID NOs 1 to 107, (b) galactanase enzymes having at least 60%, or at least 80%, or at least 90% or at least 95% identity with the amino acid sequence shown in any of SEQ ID NO:108, SEQ ID NO:109 and SEQ ID NO:110, and (b) mannanase enzymes having at least 60% or at least 80%, or at least 90% or at least 95% sequence identity with the amino acid sequence shown in any of SEQ ID NO:111, SEQ ID NO:113, SEQ ID NO:114 and SEQ ID NO:115, and an amino acid sequence having at least 81% sequence identity to SEQ ID NO: 112 and (d) mixtures thereof, and fabric softener component; and (iv) drying the fabric. A further additional rinse step may be provided between steps (iii) and (iv) however it may be preferred for the fabric to be dried immediately after step (iii).

DETAILED DESCRIPTION OF THE INVENTION

Definitions

As used herein, the term "alkoxy" is intended to include C1-C8 alkoxy and C1-C8 alkoxy derivatives of polyols having repeating units such as butylene oxide, glycidol oxide, ethylene oxide or propylene oxide.

As used herein, unless otherwise specified, the terms "alkyl" and "alkyl capped" are intended to include C1-C18 alkyl groups, or even C1-C6 alkyl groups.

As used herein, unless otherwise specified, the term "aryl" is intended to include C3-12 aryl groups.

As used herein, unless otherwise specified, the term "arylalkyl" and "alkaryl" are equivalent and are each intended to include groups comprising an alkyl moiety bound to an aromatic moiety, typically having C1-C18 alkyl groups and, in one aspect, C1-C6 alkyl groups.

The terms "ethylene oxide," "propylene oxide" and "butylene oxide" may be shown herein by their typical designation of "EO," "PO" and "BO," respectively.

As used herein, the term "cleaning and/or treatment composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, "cellulosic substrates" are intended to include any substrate which comprises cellulose, either 100% by weight cellulose or at least 20% by weight, or at least 30% by weight or at least 40 or at least 50% by weight or even at least 60% by weight cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Typically cellulosic substrates comprise cotton. Articles formed from cellulosic fibers include textile articles such as fabrics. Articles formed from pulp include paper.

As used herein, the term "maximum extinction coefficient" is intended to describe the molar extinction coefficient at the wavelength of maximum absorption (also referred to herein as the maximum wavelength), in the range of 400 nanometers to 750 nanometers.

As used herein "average molecular weight" is reported as an average molecular weight, as determined by its molecular weight distribution: as a consequence of their manufacturing process, polymers disclosed herein may contain a distribution of repeating units in their polymeric moiety.

As used herein the term "variant" refers to a polypeptide that contains an amino acid sequence that differs from a wild type or reference sequence. A variant polypeptide can differ from the wild type or reference sequence due to a deletion, insertion, or substitution of a nucleotide(s) relative to said reference or wild type nucleotide sequence. The reference or wild type sequence can be a full-length native polypeptide sequence or any other fragment of a full-length polypeptide sequence. A polypeptide variant generally has at least about 60% or at least about 65% or at least about 70% amino acid sequence identity with the reference sequence, but may include 75% amino acid sequence identity within the reference sequence, 80% amino acid sequence identity within the reference sequence, 85% amino acid sequence identity with the reference sequence, 86% amino acid sequence identity with the reference sequence, 87% amino acid sequence identity with the reference sequence, 88% amino acid sequence identity with the reference sequence, 89% amino acid sequence identity with the reference sequence, 90% amino acid sequence identity with the reference sequence, 91% amino acid sequence identity with the reference sequence, 92% amino acid sequence identity with the reference sequence, 93% amino acid sequence identity with the reference sequence, 94% amino acid sequence identity with the reference sequence, 95% amino acid sequence identity with the reference sequence, 96% amino acid sequence identity with the reference sequence, 97% amino acid sequence identity with the reference sequence, 98% amino acid sequence identity with the reference sequence, 98.5% amino acid sequence identity with the reference sequence or 99% amino acid sequence identity with the reference sequence.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated. The cleaning and/or treatment composition will comprise in addition to the nuclease enzyme, any of the additional adjunct materials from such a cleaning and/or treatment composition, as described below.

Soil-Weakening Enzyme

The soil-weakening enzyme is selected from a soil-weakening enzyme selected from (a) nuclease enzymes having at least 60%, or at least 80%, or at least 90% or at least 95% identity with the amino acid sequence shown in any of SEQ ID NOs 1 to 107, (b) galactanase enzymes having at least 60%, or at least 80%, or at least 90% or at least 95% identity with the amino acid sequence shown in any of SEQ ID NO:108, SEQ ID NO:109 and SEQ ID NO:110, and (b) mannanase enzymes having at least 60% or at least 80%, or at least 90% or at least 95% sequence identity with the amino acid sequence shown in any of SEQ ID NO:111, SEQ ID NO:113, SEQ ID NO:114 and SEQ ID NO:115, and an amino acid sequence having at least 81% sequence identity to SEQ ID NO: 112 and (d) mixtures thereof.

A preferred soil-weakening enzyme comprises a nuclease enzyme.

The soil-weakening enzyme is preferably present in the fabric softener composition in an amount from 0.0001 to 0.5 wt % based on weight of active protein in the composition, or from 0.001 to 0.3 wt % or from 0.002 to 0.2 wt % based on weight of active protein in the composition. Preferably the soil-weakening enzyme is present in the aqueous rinse liquor in an amount of from 0.01 ppm to 1000 ppm based on active protein of the nuclease enzyme, or from 0.05 or from 0.1 ppm to 750 or 500 ppm. Optionally soil-weakening enzyme may also be present in the aqueous wash liquor, typically in an amount from 0.01 ppm to 1000 ppm of the enzyme.

Nuclease Enzyme

The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof or mixtures thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

Preferably the nuclease enzyme is a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof.

Nucleases in class E.C. 3.1.21.x cleave at the 3' hydroxyl to liberate 5' phosphomonoesters as follows:

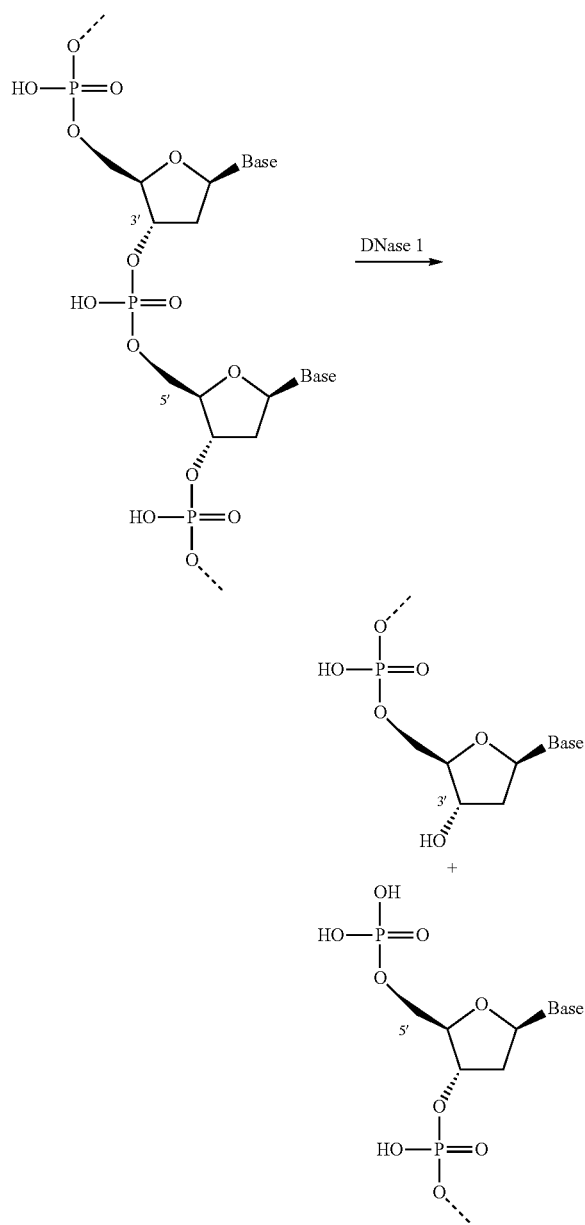

Nuclease enzymes from class E.C. 3.1.21.x and especially where x=1 are particularly preferred.

Nucleases in class E.C. 3.1.22.y cleave at the 5' hydroxyl to liberate 3' phosphomonoesters.

Enzymes in class E.C. 3.1.30.z may be preferred as they act on both DNA and RNA and liberate 5'-phosphomonoesters. A preferred class of nucleases comprises nucleases from class E.C. 3.1.31.2, for example as described in US2012/0135498A, such as a variant of SEQ ID NO:3 therein. Such enzymes are commercially available as DENARASE® enzyme from c-LECTA. Nuclease enzymes from class E.C. 3.1.31.1 produce 3' phosphomonoesters.

Preferably, the nuclease enzyme comprises a microbial enzyme. The nuclease enzyme may be fungal or bacterial in origin. Bacterial nucleases may be most preferred. Fungal nucleases may be most preferred.

The microbial nuclease is obtainable from *Bacillus, Paenibacillus, Fictibacillus, Streptomyces, Exiguobacterium, Streptococcus, Jeotgalibacillus* bacteria.

Microbial nucleases obtainable from or being variants of *Bacillus* species may be preferred, such as a *Bacillus licheniformis, Bacillus subtilis, Bacillus* sp-62451, *Bacillus horikoshii, Bacillus* sp-62520, *Bacillus* sp-16840, *Bacillus* sp-62668, *Bacillus* sp-13395, *Bacillus horneckiae, Bacillus* sp-11238, *Bacillus cibi, Bacillus* sp-18318, *Bacillus idriensis, Bacillus algicola, Bacillus vietnamensis, Bacillus hwajinpoensis, Bacillus indicus, Bacillus marisflavi, Bacillus luciferensis, Bacillus* sp. SA2-6, *Bacillus* sp-62738, *Bacillus pumilus, Bacillus* sp-62490, *Bacillus* sp-13390, *Bacillus* sp-62738, *Bacillus* sp-62599, *Bacillus akibai*, bacterial nucleases may be preferred.

Other fungal nucleases include those encoded by the DNA sequences of *Aspergillus oryzae* RIB40, *Aspergillus oryzae* 3.042, *Aspergillus flavus* NRRL3357, *Aspergillus parasiticus* SU-1, *Aspergillus nomius* NRRL13137, *Trichoderma reesei* QM6a, *Trichoderma virens* Gv29-8, *Oidiodendron maius* Zn, *Metarhizium guizhouense* ARSEF 977, *Metarhizium majus* ARSEF 297, *Metarhizium robertsii* ARSEF 23, *Metarhizium acridum* CQMa 102, *Metarhizium brunneum* ARSEF 3297, *Metarhizium anisopliae, Colletotrichum fioriniae* PJ7, *Colletotrichum sublineola, Trichoderma atroviride* IMI 206040, *Tolypocladium ophioglossoides* CBS 100239, *Beauveria bassiana* ARSEF 2860, *Colletotrichum higginsianum, Hirsutella minnesotensis* 3608, *Scedosporium apiospermum, Phaeomoniella chlamydospora, Fusarium verticillioides* 7600, *Fusarium oxysporum* f. sp. *cubense* race 4, *Colletotrichum graminicola* M1.001, *Fusarium oxysporum* FOSC 3-a, *Fusarium avenaceum, Fusarium langsethiae, Grosmannia clavigera* kw1407, *Claviceps purpurea* 20.1, *Verticillium longisporum, Fusarium oxysporum* f. sp. *cubense* race 1, *Magnaporthe oryzae* 70-15, *Beauveria bassiana* D1-5, *Fusarium pseudograminearum* CS3096, *Neonectria ditissima, Magnaporthiopsis poae* ATCC 64411, *Cordyceps militaris* CM01, *Marssonina brunnea* f. sp. 'multigermtubi' MB_m1, *Diaporthe ampelina, Metarhizium album* ARSEF 1941, *Colletotrichum gloeosporioides* Nara gc5, *Madurella mycetomatis, Metarhizium brunneum* ARSEF 3297, *Verticillium alfalfae* VaMs.102, *Gaeumannomyces graminis* var. *tritici* R3-111a-1, *Nectria haematococca* mpVI 77-13-4, *Verticillium longisporum, Verticillium dahliae* VdLs.17, *Torrubiella hemipterigena, Verticillium longisporum, Verticillium dahliae* VdLs.17, *Botrytis cinerea* B05.10, *Chaetomium globosum* CBS 148.51, *Metarhizium anisopliae, Stemphylium lycopersici, Sclerotinia borealis* F-4157, *Metarhizium robertsii* ARSEF 23, *Myceliophthora thermophila* ATCC 42464, *Phaeosphaeria nodorum* SN15, *Phialophora attae, Ustilaginoidea virens, Diplodia seriata, Ophiostoma piceae* UAMH 11346, *Pseudogymnoascus pannorum* VKM F-4515

(FW-2607), *Bipolaris oryzae* ATCC 44560, *Metarhizium guizhouense* ARSEF 977, *Chaetomium thermophilum* var. *thermophilum* DSM 1495, *Pestalotiopsis fici* W106-1, *Bipolaris zeicola* 26-R-13, *Setosphaeria turcica* Et28A, *Arthroderma otae* CBS 113480 and *Pyrenophora tritici-repentis* Pt-1C-BFP.

Preferably the nuclease is an isolated nuclease.

Galactanases

The composition of the invention may comprise a β-1,6-galactanase enzymes having at least 60%, or at least 80%, or at least 90% or at least 95% identity with the amino acid sequence shown in SEQ ID NO:108, SEQ ID NO:109 or SEQ ID NO:110. The term "endo-beta-1,6-galactanase" or "a polypeptide having endo-beta-1,6-galactanase activity" means a endo-beta-1,6-galactanase activity (EC 3.2.1.164) that catalyzes the hydrolytic cleavage of 1,6-3-D-galactooligosaccharides with a degree of polymerization (DP) higher than 3, and their acidic derivatives with 4-O-methylglucosyluronate or glucosyluronate groups at the non-reducing terminals.

For purposes of the present disclosure, endo-beta-1,6-galactanase activity is determined according to the procedure described in WO 2015185689 in Assay I. Suitable examples from class EC 3.2.1.164 are described in WO 2015185689, such as the mature polypeptide SEQ ID NO: 110 described herein. Preferably the galactanase enzyme is selected from Glycoside Hydrolase (GH) Family 30.

Preferably, the endo-beta-1,6-galactanase comprises a microbial enzyme. The endo-beta-1,6-galactanase may be fungal or bacterial in origin. Bacterial endo-beta-1,6-galactanase may be most preferred. Fungal endo-beta-1,6-galactanase may be most preferred.

A bacterial endo-beta-1,6-galactanase is obtainable from *Streptomyces*, for example *Streptomyces davawensis*. A preferred endo-beta-1,6-galactanase is obtainable from *Streptomyces davawensis* JCM 4913 defined in SEQ ID NO: 108 herein, or variant thereof, for example having at least 60% or 70% or 75% or 80% or 85% or 90% or 95%, 96%, 97%, 98%, 99% or 100% identity thereto.

Other bacterial endo-beta-1,6-galactanase include those obtainable from *Streptomyces avermitilis* according to SEQ ID NO:109 herein, or variant thereof, for example having at least 60% or 70% or 75% or 80% or 85% or 90% or 95%, 96%, 97%, 98%, 99% or 100% identity thereto.

A fungal endo-beta-1,6-galactanase is obtainable from *Trichoderma*, for example *Trichoderma harzianum*. A preferred endo-beta-1,6-galactanase is obtainable from *Trichoderma harzianum* defined in SEQ ID NO: 110 herein, or variant thereof, for example having at least 60% or 70% or 75% or 80% or 85% or 90% or 95%, 96%, 97%, 98%, 99% or 100% identity thereto.

Other fungal endo-beta-1,6-galactanase include those encoded by the DNA sequences of *Ceratocystis fimbriata f.sp. Platani, Muscodor strobelii* WG-2009a, *Oculimacula yallundae, Trichoderma viride* GD36A, *Thermomyces stellatus, Myceliophthora thermophilia*.

Preferably the galactanase is an isolated galactanase.

Mannanases

The compositions of the invention may comprise a mannanase. The mannanase may be obtainable from *Ascobolus stictoideus* for example as defined in SEQ ID NO: 111 herein or a variant thereof, for example having at least 60% or 70% or 75% or 80% or 85% or 90% or 95%, 96%, 97%, 98%, 99% or 100% identity thereto. The mannanase may be obtainable from *Chaetomium virescens* for example as defined in SEQ ID NO: 112 herein or a variant thereof, having at least 81% or 82% or 85% or 90% or 95%, 96%, 97%, 98%, 99% or 100% identity thereto.

The mannanase may be obtainable from *Preussia aemulans* for example as defined in SEQ ID NO: 113 herein or a variant thereof, having at least 75% or 80% or 85% or 90% or 95%, 96%, 97%, 98%, 99% or 100% identity thereto. The mannanase may be obtainable from *Yunnania penicillata* for example as defined in SEQ ID NO: 114 herein or a variant thereof, having at least 65% or 70% or 75% or 80% or 85% or 90% or 95%, 96%, 97%, 98%, 99% or 100% identity thereto. The mannanase may be obtainable from *Myrothecium roridum* for example as defined in SEQ ID NO: 115 herein or a variant thereof, having at least 75% or 80% or 85% or 90% or 95%, 96%, 97%, 98%, 99% or 100% identity thereto.

For purposes of the present disclosure, mannanase activity may be determined using the Reducing End Assay as described in the experimental section of WO2015040159. Suitable examples from class EC 3.2.1.78 are described in WO2015040159, such as the mature polypeptide SEQ ID NO: 111 described herein.

Preferably the mannanase is an isolated mannanase.

Preferred soil-weakening enzymes are selected from those obtainable from and/or a variant of the polypeptides shown in SEQ ID NOs: 1-115 and mixtures thereof. For example:

1.) a variant of the polypeptide shown in SEQ ID NO: 1
2.) a variant of the polypeptide shown in SEQ ID NO: 2
3.) a variant of the polypeptide shown in SEQ ID NO: 3
4.) a variant of the polypeptide shown in SEQ ID NO: 4
5.) a variant of the polypeptide shown in SEQ ID NO: 5
6.) a variant of the polypeptide shown in SEQ ID NO: 6
7.) a variant of the polypeptide shown in SEQ ID NO: 7
8.) a variant of the polypeptide shown in SEQ ID NO: 8
9.) a variant of the polypeptide shown in SEQ ID NO: 9
10.) a variant of the polypeptide shown in SEQ ID NO: 10
11.) a variant of the polypeptide shown in SEQ ID NO: 11
12.) a variant of the polypeptide shown in SEQ ID NO: 12
13.) a variant of the polypeptide shown in SEQ ID NO: 13
14.) a variant of the polypeptide shown in SEQ ID NO: 14
15.) a variant of the polypeptide shown in SEQ ID NO: 15
16.) a variant of the polypeptide shown in SEQ ID NO: 16
17.) a variant of the polypeptide shown in SEQ ID NO: 17
18.) a variant of the polypeptide shown in SEQ ID NO: 18
19.) a variant of the polypeptide shown in SEQ ID NO: 19
20.) a variant of the polypeptide shown in SEQ ID NO: 20
21.) a variant of the polypeptide shown in SEQ ID NO: 21
22.) a variant of the polypeptide shown in SEQ ID NO: 22
23.) a variant of the polypeptide shown in SEQ ID NO: 23
24.) a variant of the polypeptide shown in SEQ ID NO: 24
25.) a variant of the polypeptide shown in SEQ ID NO: 25
26.) a variant of the polypeptide shown in SEQ ID NO: 26
27.) a variant of the polypeptide shown in SEQ ID NO: 27
28.) a variant of the polypeptide shown in SEQ ID NO: 28
29.) a variant of the polypeptide shown in SEQ ID NO: 29
30.) a variant of the polypeptide shown in SEQ ID NO: 30
31.) a variant of the polypeptide shown in SEQ ID NO: 31
32.) a variant of the polypeptide shown in SEQ ID NO: 32
33.) a variant of the polypeptide shown in SEQ ID NO: 33
34.) a variant of the polypeptide shown in SEQ ID NO: 34
35.) a variant of the polypeptide shown in SEQ ID NO: 35
36.) a variant of the polypeptide shown in SEQ ID NO: 36
37.) a variant of the polypeptide shown in SEQ ID NO: 37
38.) a variant of the polypeptide shown in SEQ ID NO: 38
39.) a variant of the polypeptide shown in SEQ ID NO: 39
40.) a variant of the polypeptide shown in SEQ ID NO: 40
41.) a variant of the polypeptide shown in SEQ ID NO: 41

42.) a variant of the polypeptide shown in SEQ ID NO: 42
43.) a variant of the polypeptide shown in SEQ ID NO: 43
44.) a variant of the polypeptide shown in SEQ ID NO: 44
45.) a variant of the polypeptide shown in SEQ ID NO: 45
46.) a variant of the polypeptide shown in SEQ ID NO: 46
47.) a variant of the polypeptide shown in SEQ ID NO: 47
48.) a variant of the polypeptide shown in SEQ ID NO: 48
49.) a variant of the polypeptide shown in SEQ ID NO: 49
50.) a variant of the polypeptide shown in SEQ ID NO: 50
51.) a variant of the polypeptide shown in SEQ ID NO: 51
52.) a variant of the polypeptide shown in SEQ ID NO: 52
53.) a variant of the polypeptide shown in SEQ ID NO: 53
54.) a variant of the polypeptide shown in SEQ ID NO: 54
55.) a variant of the polypeptide shown in SEQ ID NO: 55
56.) a variant of the polypeptide shown in SEQ ID NO: 56
57.) a variant of the polypeptide shown in SEQ ID NO: 57
58.) a variant of the polypeptide shown in SEQ ID NO: 58
59.) a variant of the polypeptide shown in SEQ ID NO: 59
60.) a variant of the polypeptide shown in SEQ ID NO: 60
61.) a variant of the polypeptide shown in SEQ ID NO: 61
62.) a variant of the polypeptide shown in SEQ ID NO: 62
63.) a variant of the polypeptide shown in SEQ ID NO: 63
64.) a variant of the polypeptide shown in SEQ ID NO: 64
65.) a variant of the polypeptide shown in SEQ ID NO: 65
66.) a variant of the polypeptide shown in SEQ ID NO: 66
67.) a variant of the polypeptide shown in SEQ ID NO: 67
68.) a variant of the polypeptide shown in SEQ ID NO: 68
69.) a variant of the polypeptide shown in SEQ ID NO: 69
70.) a variant of the polypeptide shown in SEQ ID NO: 70
71.) a variant of the polypeptide shown in SEQ ID NO: 71
72.) a variant of the polypeptide shown in SEQ ID NO: 72
73.) a variant of the polypeptide shown in SEQ ID NO: 73
74.) a variant of the polypeptide shown in SEQ ID NO: 74
75.) a variant of the polypeptide shown in SEQ ID NO: 75
76.) a variant of the polypeptide shown in SEQ ID NO: 76
77.) a variant of the polypeptide shown in SEQ ID NO: 77
78.) a variant of the polypeptide shown in SEQ ID NO: 78
79.) a variant of the polypeptide shown in SEQ ID NO: 79
80.) a variant of the polypeptide shown in SEQ ID NO: 80
81.) a variant of the polypeptide shown in SEQ ID NO: 81
82.) a variant of the polypeptide shown in SEQ ID NO: 82
83.) a variant of the polypeptide shown in SEQ ID NO: 83
84.) a variant of the polypeptide shown in SEQ ID NO: 84
85.) a variant of the polypeptide shown in SEQ ID NO: 85
86.) a variant of the polypeptide shown in SEQ ID NO: 86
87.) a variant of the polypeptide shown in SEQ ID NO: 87
88.) a variant of the polypeptide shown in SEQ ID NO: 88
89.) a variant of the polypeptide shown in SEQ ID NO: 89
90.) a variant of the polypeptide shown in SEQ ID NO: 90
91.) a variant of the polypeptide shown in SEQ ID NO: 91
92.) a variant of the polypeptide shown in SEQ ID NO: 92
93.) a variant of the polypeptide shown in SEQ ID NO: 93
94.) a variant of the polypeptide shown in SEQ ID NO: 94
95.) a variant of the polypeptide shown in SEQ ID NO: 95
96.) a variant of the polypeptide shown in SEQ ID NO: 96
97.) a variant of the polypeptide shown in SEQ ID NO: 97
98.) a variant of the polypeptide shown in SEQ ID NO: 98
99.) a variant of the polypeptide shown in SEQ ID NO: 99
100.) a variant of the polypeptide shown in SEQ ID NO: 100
101.) a variant of the polypeptide shown in SEQ ID NO: 101
102.) a variant of the polypeptide shown in SEQ ID NO: 102
103.) a variant of the polypeptide shown in SEQ ID NO: 103
104.) a variant of the polypeptide shown in SEQ ID NO: 104
105.) a variant of the polypeptide shown in SEQ ID NO: 105
106.) a variant of the polypeptide shown in SEQ ID NO: 106
107.) a variant of the polypeptide shown in SEQ ID NO: 107
108.) a variant of the polypeptide shown in SEQ ID NO: 108
109.) a variant of the polypeptide shown in SEQ ID NO: 109
110.) a variant of the polypeptide shown in SEQ ID NO: 110
111.) a variant of the polypeptide shown in SEQ ID NO: 111
112.) a variant of the polypeptide shown in SEQ ID NO: 112
113.) a variant of the polypeptide shown in SEQ ID NO: 113
114.) a variant of the polypeptide shown in SEQ ID NO: 114
115.) a variant of the polypeptide shown in SEQ ID NO: 115
116.) mixtures thereof.

The soil-weakening enzymes may be present in the composition in microcapsules. The liquid compositions of the invention may comprise an enzyme, which may be a nuclease, galactanase and/or mannanase containing microcapsule, wherein the membrane of the microcapsule is produced by cross-linking of a polybranched polyamine having a molecular weight of more than 1 kDa. Encapsulating of enzymes in a microcapsule with a semipermeable membrane having a water activity inside these capsules (prior to addition to the liquid softener composition) higher than in the liquid softener composition, the capsules will undergo a (partly) collapse when added to the softener composition, thus leaving a more concentrated and more viscous enzyme containing interior in the capsules. The collapse of the membrane may also result in a reduced permeability.

This can be further utilized by addition of stabilizers/polymers, especially ones that are not permeable through the membrane. The collapse and resulting increase in viscosity will reduce/hinder the diffusion of hostile components (e.g., surfactants or sequestrants) into the capsules, and thus increase the storage stability of enzymes such as nucleases in the softener composition. Components in the softener composition that are sensitive to the enzyme (e.g., components that act as substrate for the enzyme) are also protected against degradation by the enzyme. During use the softener composition is diluted by water, thus increasing the water activity. Water will now diffuse into the capsules (osmosis). The capsules will swell and the membrane will either become permeable to the enzyme so they can leave the capsules, or simply burst and in this way releasing the enzyme. The concept is very efficient in stabilizing the enzymes against hostile components in softener compositions, and vice versa also protects enzyme sensitive components in the softener compositions from enzymes.

Examples of components which are sensitive to, and can be degraded by, enzymes include (relevant enzyme in parenthesis): xanthan gum (xanthanase), polymers with ester bonds (lipase), hydrogenated castor oil (lipase), perfume (lipase), methyl ester sulfonate surfactants (lipase), cellulose and cellulose derivatives (e.g. CMC) (cellulase), and dextrin and cyclodextrin (amylase).

Also, sensitive ingredients can be encapsulated, and thus stabilized, in the microcapsules of the invention. Sensitive ingredients are prone to degradation during storage. Such sensitive ingredients include bleaching compounds, bleach activators, perfumes, polymers, builder, surfactants, etc.

Generally, the microcapsules can be used to separate incompatible components/compounds in detergents.

Addition of the microcapsules to detergents can be used to influence the visual appearance of the detergent product, such as an opacifying effect (small microcapsules) or an effect of distinctly visible particles (large microcapsules). The microcapsules may also be colored.

The microcapsules can be used to reduce the enzyme dust levels during handling and processing of enzyme products.

Microcapsule: The microcapsules are typically produced by forming a water-in-oil emulsion in which the enzymes and any other materials to be encapsulated are present in the aqueous phase, and subsequent formation of the membrane by interfacial polymerization via addition of a cross-linking agent. After eventual curing the capsules can be recovered and further rinsed and formulated by methods known in the art. The capsule formulation is subsequently added to the detergent.

The cross-linking agent(s) is typically subsequently added to the emulsion, either directly or more typically by preparing a solution of the crosslinking agent in a solvent which is soluble in the continuous phase. The emulsion and cross-linking agent or solution hereof can be mixed by conventional methods used in the art, e.g., by simple mixing or by carefully controlling the flows of the emulsion and the cross-linking agent solution through an in-line mixer.

The capsules may be post modified, e.g., by reacting components onto the membrane to hinder or reduce flocculation of the particles in the detergent as described in WO 99/01534.

The produced capsules can be isolated or concentrated by methods known in the art, e.g., by filtration, centrifugation, distillation or decantation of the capsule dispersion.

The resulting capsules can be further formulated, e.g., by addition of surfactants to give the product the desired properties for storage, transport and later handling and addition to the detergent. Other microcapsule formulation agents include rheology modifiers, biocides (e.g., Proxel), acid/base for adjustment of pH (which will also adjust inside the microcapsules), and water for adjustment of water activity.

The capsule forming process may include the following steps:
  Preparation of the initial water and oil phase(s),
  Forming a water-in-oil emulsion,
  Membrane formation by interfacial polymerization,
  Optional post modification,
  Optional isolation and/or formulation,
  Addition to detergent.

The process can be either a batch process or a continuous or semi-continuous process.

A microcapsule may be a small aqueous sphere with a uniform membrane around it. The material inside the microcapsule is referred to as the core, internal phase, or fill, whereas the membrane is sometimes called a shell, coating, or wall. The microcapsules typically have diameters between 0.5 µm and 2 millimeters. Preferably, the mean diameter of the microcapsules is in the range of 1 µm to 1000 µm, more preferably in the range of 5 µm to 500 µm, even more preferably in the range of 10 µm to 500 µm, even more preferably in the range of 50 µm to 500 µm, and most preferably in the range of 50 µm to 200 µm. Alternatively, the diameter of the microcapsules is in the range of 0.5 µm to 30 µm; or in the range of 1 µm to 25 µm. The diameter of the microcapsule is measured in the oil phase after polymerization is complete. The diameter of the capsule may change depending on the water activity of the surrounding chemical environment.

Microencapsulation of enzymes may be carried out by interfacial polymerization, wherein the two reactants in a polymerization reaction meet at an interface and react rapidly. The basis of this method is a reaction of a polyamine with an acid derivative, usually an acid halide, acting as a crosslinking agent. The polyamine is preferably substantially water-soluble (when in free base form). Under the right conditions, thin flexible membranes form rapidly at the interface. One way of carrying out the polymerization is to use an aqueous solution of the enzyme and the polyamine, which are emulsified with a non-aqueous solvent (and an emulsifier), and a solution containing the acid derivative is added. An alkaline agent may be present in the enzyme solution to neutralize the acid formed during the reaction. Polymer (polyamide) membranes form instantly at the interface of the emulsion droplets. The polymer membrane of the microcapsule is typically of a cationic nature, and thus bind/complex with compounds of an anionic nature.

The diameter of the microcapsules is determined by the size of the emulsion droplets, which is controlled, for example by the stirring rate.

Polyamine: The rigidity/flexibility and permeability of the membrane is mainly influenced by the choice of polyamine. The polyamine according to the invention is a polybranched polyamine. Each branch, preferably ending with a primary amino group serves as a tethering point in the membrane network, thereby giving the favourable properties of the invention. A polybranched polyamine according to the present invention is a polyamine having more than two branching points and more than two reactive amino groups (capable of reacting with the crosslinking agent, i.e., primary and secondary amino groups). The polybranched polyamine is used as starting material when the emulsion is prepared—it is not formed in situ from other starting materials. To obtain the attractive properties, the polybranched structure of the polyamine must be present as starting material.

There is a close relation between number of branching points and number of primary amines, since primary amines will always be positioned at the end of a branch: A linear amine can only contain two primary amines. For each branching point hypothetically introduced in such a linear di-amine will allow one or more primary amine(s) to be introduced at the end of the introduced branch(es). In this context we the primary amino group is understood as part of the branch, i.e., the endpoint of the branch. For example, both tris(2-aminoethyl)amine and 1,2,3-propanetriamine is considered as molecules having one branching point. The polyamine preferably has at least four primary amines. Branching points can be introduced from an aliphatic hydrocarbon chain from unsaturated carbon bonds, such as in, e.g., 3,3'-diaminobenzidine, or from tertiary amino groups, such as in N,N,N',N'-tetrakis-(2-aminoethyl)ethylenediamine In addition to the number of branching points, the compactness of the reactive amino groups is of high importance. A substance such as, e.g., N,N,N',N'-tetrakis-(12-aminododecyl)ethylenediamine would not be suitable. Neither would a peptide or protein, such as an enzyme, be suitable for membrane formation. Thus, the polybranched polyamine is not a peptide or protein.

The reactive amino groups preferably constitute at least 15% of the molecular weight of the polybranched polyamine, such as more than 20%, or more than 25%. Preferably, the molecular weight of the polybranched polyamine is at least 1 kDa; more preferably, the molecular weight of the polybranched polyamine is at least 1.3 kDa.

The polybranched polyamine may be a polyethyleneimine (PEI), and modifications thereof, having more than two branching points and more than two reactive amino groups; wherein the reactive amino groups constitute at least 15% of the molecular weight of the PEI, such as more than 20%, or more than 25%. Preferably, the molecular weight of the PEI is at least 1 kDa.

Combinations of different polybranched polyamines may be used for preparing the microcapsule.

The advantageous properties (e.g., enzyme storage stability, reduced enzyme leakage, reduced in-flux of detergent ingredients) of the microcapsule may be improved by adding one or more small amines with a molecular weight of less than 1 kDa. The small amine is preferably substantially water-soluble (when in free base form) and can be a material such as ethylene diamine, hexamethylene diamine, hexane diamine, diethylene tetramine, ethylene tetramine, diamino benzene, piperazine, tetramethylene pentamine or, preferably, diethylene triamine (DETA). The small amines may be added in an amount of up to 50%, preferably up to 40%, up to 30%, up to 20%, up to 10%, or up to 5%, by weight of the total content of small amine and polybranched polyamine, when preparing the microcapsule.

Crosslinking agent: The crosslinking agent as used in the present invention is a molecule with at least two groups/sites capable of reacting with amines to form covalent bonds.

The crosslinking agent is preferably oil soluble and can be in the form of an acid anhydride or acid halide, preferably an acid chloride. For example, it can be adipoyl chloride, sebacoyl chloride, dodecanedioc acid chloride, phthaloyl chloride, terephthaloyl chloride, isophthaloyl chloride, or trimesoyl chloride; but preferably, the crosslinking agent is terephthaloyl chloride or trimesoyl chloride.

The microcapsule, as described above, may be added to the softener composition in an amount corresponding to from 0.0001% to 5% (w/w) active enzyme protein (AEP); preferably from 0.001% to 5%, more preferably from 0.005% to 5%, more preferably from 0.005% to 4%, more preferably from 0.005% to 3%, more preferably from 0.005% to 2%, even more preferably from 0.01% to 2%, and most preferably from 0.01% to 1% (w/w) active enzyme protein.

The microcapsule is further described in WO 2014/177709 which is incorporated by reference.

The Quaternary Ammonium Ester Compound

The fabric softener composition of the present invention comprises from 2.0 wt % to 50 wt % of a fabric softener compound comprising a quaternary ammonium ester softening active (Fabric Softening Active, "FSA") by weight of the composition. In preferred fabric softener compositions, the quaternary ammonium ester softening active is present at a level from 3.0% to 30%, more preferably from 3.0% to 18 or 20%, even more preferably from 7.0% to 15% by weight of the composition. The level of quaternary ammonium ester softening active may depend on the desired concentration of total softening active in the composition (diluted or concentrated composition) and on the presence or not of other softening active. The risk on dispenser residues is especially present with high FSA concentration. On the other hand, at very high FSA levels, the viscosity may no longer be stable over time.

Suitable quaternary ammonium ester softening actives include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester softening active.

Said quaternary ammonium ester softening active may comprise compounds of the following formula:

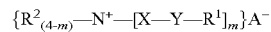

wherein:
m is 1, 2 or 3 with proviso that the value of each m is identical;
each $R^1$ is independently hydrocarbyl, or branched hydrocarbyl group, preferably $R^1$ is linear, more preferably $R^1$ is partially unsaturated linear alkyl chain;
each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_{2-3}$ alkoxy), polyethoxy, benzyl;
each X is independently $(CH_2)n$, $CH_2$—$CH(CH_3)$— or $CH$—$(CH_3)$—$CH_2$— and
each n is independently 1, 2, 3 or 4, preferably each n is 2;
each Y is independently —O—(O)C— or —C(O)—O—;
A– is independently selected from the group consisting of chloride, methyl sulfate, and ethyl sulfate, preferably A– is selected from the group consisting of chloride and methyl sulfate;
with the proviso that when Y is —O—(O)C—, the sum of carbons in each IV is from 13 to 21, preferably from 13 to 19.

The fabric softener composition herein is preferably a liquid fabric softener composition.

The Liquid Fabric Softener Composition

As used herein, "liquid fabric softener composition" refers to any treatment composition comprising a liquid capable of softening fabrics e.g., clothing in a domestic washing machine. The composition can include solids or gases in suitably subdivided form, but the overall composition excludes product forms which are non-liquid overall, such as tablets or granules. The liquid fabric softener composition preferably has a density in the range from 0.9 to 1.3 g·cm$^{-3}$, excluding any solid additives but including any bubbles, if present.

Aqueous liquid fabric softening compositions are preferred. For such aqueous liquid fabric softener compositions, the water content can be present at a level of from 5% to 97%, preferably from 50% to 96%, more preferably from 70% to 95% by weight of the liquid fabric softener composition.

The pH of the neat fabric softener composition (see Methods) is typically acidic to improve hydrolytic stability of the quaternary ammonium ester softening active and may be from pH 2.0 to 6.0, preferably from pH 2.0 to 4.5, more preferably from 2.0 to 3.5.

To maintain phase stability of the fabric softener composition, the dynamic yield stress (see Methods) at 20° C. of the fabric softener composition is from 0.001 Pa to 1.0 Pa, preferably from 0.002 Pa to 0.9 Pa, more preferably from 0.005 Pa to 0.8 Pa, even more preferably from 0.010 Pa to 0.5 Pa. On the one hand, absence of a dynamic yield stress may lead to phase instabilities, especially when the fabric softener composition comprises encapsulated benefit agents or particles. On the other hand, very high dynamic yield stresses may lead to undesired air entrapment during filling of a bottle with the fabric softener composition.

To provide a rich appearance while maintaining pourability of the fabrics softener composition, the viscosity (see Methods) of the fabric softener composition is from 200 mPa·s to 1000 mPa·s, preferably from 250 mPa·s to 900 mPa·s, more preferably from 300 mPa·s to 800 mPa·s, even more preferably from 350 mPa·s to 700 mPa·s at 20° C.

The liquid fabric softener composition may comprise adjunct ingredients suitable for use in the instant compositions and may be desirably incorporated in certain aspects of the invention, for example to improve the aesthetics of the composition as is the case with pigments and dyes. Moreover, liquid fabric softener compositions comprising unsaturated quaternary ammonium ester softening actives are subject to some degree of UV light and/or oxidation which increases the risk on yellowing of the fabric softener composition as well as yellowing of treated fabrics. However, especially in the presence of a dye any dispenser residue becomes more apparent. The liquid fabric softener composition may comprise from 0.0001% to 0.1%, preferably from 0.001% to 0.05% of a dye by weight of the composition. Suitable dyes are selected from the list comprising bis-azo dyes, tris-azo dyes, acid dyes, azine dyes, hydrophobic dyes, methane basic dyes, anthraquinone basic dyes, and dye conjugates formed by binding acid or basic dyes to polymers.

In preferred liquid fabric softener compositions the iodine value of the parent fatty acid from which the quaternary ammonium fabric softening active is formed is from 0 to 100, more preferably from 10 to 60, even more preferably from 15 to 45.

Examples of suitable quaternary ammonium ester softening actives are commercially available from KAO Chemicals under the trade name Tetranyl AT-1 and Tetranyl AT-7590, from Evonik under the tradename Rewoquat WE16 DPG, Rewoquat WE18, Rewoquat WE20, Rewoquat WE28, and Rewoquat 38 DPG, from Stepan under the tradename Stepantex GA90, Stepantex VR90, Stepantex VK90, Stepantex VA90, Stepantex DC90, Stepantex VL90A.

These types of agents and general methods of making them are disclosed in U.S. Pat. No. 4,137,180.

Cellulose Fibers:

Optionally the compositions of the invention may comprise cellulose fibers. These may be useful to thicken, and structure the fabric softener composition. They may be useful to help minimize the formation of dispenser residues. Where present, cellulose fibers are typically present in amounts from 0.01% to 5.0%, more preferably 0.05% to 1.0%, even more preferably from 0.10% to 0.75% of cellulose fibers by weight of the composition.

By cellulose fibers it is meant herein cellulose micro or nano fibrils. The cellulose fibers can be of bacterial or botanical origin, i.e. produced by fermentation or extracted from vegetables, plants, fruits or wood. Cellulose fiber sources may be selected from the group consisting of citrus peels, such as lemons, oranges and/or grapefruit; fruits, such as apples, bananas and/or pear; vegetables such as carrots, peas, potatoes and/or chicory; plants such as bamboo, jute, abaca, flax, cotton and/or sisal, cereals, and different wood sources such as spruces, eucalyptus and/or oak. Preferably, the cellulose fibers source is selected from the group consisting of wood or plants, in particular, spruce, eucalyptus, jute, and sisal.

The content of cellulose in the cellulose fibers will vary depending on the source and treatment applied for the extraction of the fibers, and will typically range from 15% to 100%, preferably above 30%, more preferably above 50%, and even more preferably above 80% of cellulose by weight of the cellulose fibers.

Such cellulose fibers may comprise pectin, hemicellulose, proteins, lignin and other impurities inherent to the cellulose based material source such as ash, metals, salts and combinations thereof. The cellulose fibers are preferably non-ionic. Such fibers are commercially available, for instance Citri-Fi 100FG from Fiberstar, Herbacel® Classic from Herbafood, and Exilva® from Borregaard.

The cellulose fibers may have an average diameter from 10 nm to 350 nm, preferably from 30 nm to 250 nm, more preferably from 50 nm to 200 nm.

Non-Ionic Surfactants

It may be preferred for the fabric softener composition to comprise nonionic surfactant, for example from 0.01% to 5%, preferably from 0.1% to 3.0%, more preferably from 0.5% to 2.0% of non-ionic surfactant based on the total fabric softener composition weight. Non-ionic surfactants help to effectively disperse perfume into the fabric softener composition and improve the overall dispersability of the fabric softener composition into water.

In preferred liquid fabric softener compositions the non-ionic surfactant is an alkoxylated non-ionic surfactant, preferably an ethoxylated non-ionic surfactant. Preferably the alkoxylated non-ionic surfactant has an average degree of alkoxylation of at least 3, preferably from 5 to 100, more preferably from 10 to 60.

Preferably ethoxylated non-ionic surfactant, more preferably an ethoxylated non-ionic surfactant having a hydrophobic lipophilic balance value of 8 to 18.

Examples of suitable non-ionic surfactants are commercially available from BASF under the tradename Lutensol AT80 (ethoxylated alcohol with an average degree of ethoxylation of 80 from BASF), from Clariant under the tradename Genapol T680 (ethoxylated alcohol with an average degree of ethoxylation of 68), from Sigma Aldrich under the tradename Tween 20 (polysorbate with an average degree of ethoxylation of 20), from The Dow Chemical Company under the tradename Tergitol 15-S-30 (ethoxylated branched alcohol with an average degree of ethoxylation of 30).

Dispersed Perfume

The liquid fabric softener composition of the present invention may comprise a dispersed perfume composition to provide a pleasant smell. By dispersed perfume we herein mean a perfume composition that is freely dispersed in the fabric softener composition and is not encapsulated. A perfume composition comprises one or more perfume raw materials. Perfume raw materials are the individual chemical compounds that are used to make a perfume composition. The choice of type and number of perfume raw materials is dependent upon the final desired scent. In the context of the present invention, any suitable perfume composition may be used. Those skilled in the art will recognize suitable compatible perfume raw materials for use in the perfume composition, and will know how to select combinations of ingredients to achieve desired scents.

Preferably, the level of dispersed perfume is at a level of from 0.1% to 10.0%, preferably from 0.5% to 7.5%, more preferably from 0.8% to 5.0% by total weight of the composition.

The perfume composition may comprise from 2.5% to 30%, preferably from 5% to 30% by total weight of perfume composition of perfume raw materials characterized by a log P lower than 3.0, and a boiling point lower than 250° C.

The perfume composition may comprise from 5% to 30%, preferably from 7% to 25% by total weight of perfume composition of perfume raw materials characterized by having a log P lower than 3.0 and a boiling point higher than 250° C. The perfume composition may comprise from 35% to 60%, preferably from 40% to 55% by total weight of perfume composition of perfume raw materials characterized by having a log P higher than 3.0 and a boiling point lower than 250° C. The perfume composition may comprise from 10% to 45%, preferably from 12% to 40% by total weight of perfume composition of perfume raw materials characterized by having a log P higher than 3.0 and a boiling point higher than 250° C.

Particles

The liquid fabric softener composition of the present invention may also comprise particles. The liquid fabric softener composition may comprise, based on the total liquid fabric softener composition weight, from 0.02% to 10%, preferably from 0.1% to 4%, more preferably from 0.25% to 2.5% of particles. Said particles include beads, pearlescent agents, benefit agent encapsulates, and mixtures thereof.

Encapsulated Benefit Agent:

The liquid fabric softener composition may comprise from 0.05% to 10%, preferably from 0.05% to 3.0%, more preferably from 0.05% to 2.0% by weight of encapsulated benefit agent. The benefit agent is selected from the group consisting of perfume composition, moisturizers, a heating or cooling agent, an insect/moth repellent, germ/mould/mildew control agents, softening agents, antistatic agents, anti-allergenic agents, UV protection agents, sun fade inhibitors, hueing dyes, additional enzymes and combinations thereof, color protection agents such as dye transfer inhibitors, bleach agents, and combinations thereof. Perfume compositions are preferred.

The benefit agent is encapsulated, for instance, as part of a core in one or more capsules. Such cores can comprise other materials, such as diluents, solvents and density balancing agents.

The capsules have a wall, which at least partially, preferably fully surrounds the benefit agent comprising core. The capsule wall material may be selected from the group consisting of melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, resorcinol-based materials, poly-isocyanate-based materials, acetals (such as 1,3,5-triol-benzene-gluteraldehyde and 1,3,5-triol-benzene melamine), starch, cellulose acetate phthalate and mixtures thereof.

Preferably, the capsule wall comprises one or more wall material comprising melamine, polyacrylate based material and combinations thereof.

Said melamine wall material may be selected from the group consisting of melamine crosslinked with formaldehyde, melamine-dimethoxyethanol crosslinked with formaldehyde, and combinations thereof.

Said polyacrylate based material may be selected from the group consisting of polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer and combinations thereof.

Said polystyrene wall material may be selected from polyestyrene cross-linked with divinylbenzene.

Polyurea capsules can comprise a polyurea wall which is the reaction product of the polymerisation between at least one polyisocyanate comprising at least two isocyanate functional groups and at least one amine, preferably a polyfunctional amine as a cross-linking and a colloidal stabilizer.

Polyurethane capsules can comprise a polyureathane wall which is the reaction product of a polyfunctional isocyanate and a polyfunctional alcohol as a cross-linking agent and a colloidal stabilizer.

Suitable capsules can be obtained from Encapsys (Appleton, Wis., USA). The fabric softener compositions may comprise combinations of different capsules, for example capsules having different wall materials and/or benefit agents.

As mentioned earlier, perfume compositions are the preferred encapsulated benefit agent. The perfume composition comprises perfume raw materials. The perfume composition can further comprise essential oils, malodour reducing agents, odour controlling agents and combinations thereof.

The perfume raw materials are typically present in an amount of from 10% to 95%, preferably from 20% to 90% by weight of the capsule.

The perfume composition may comprise from 2.5% to 30%, preferably from 5% to 30% by total weight of perfume composition of perfume raw materials characterized by a log P lower than 3.0, and a boiling point lower than 250° C.

The perfume composition may comprise from 5% to 30%, preferably from 7% to 25% by total weight of perfume composition of perfume raw materials characterized by having a log P lower than 3.0 and a boiling point higher than 250° C. The perfume composition may comprise from 35% to 60%, preferably from 40% to 55% by total weight of perfume composition of perfume raw materials characterized by having a log P higher than 3.0 and a boiling point lower than 250° C. The perfume composition may comprise from 10% to 45%, preferably from 12% to 40% by total weight of perfume composition of perfume raw materials characterized by having a log P higher than 3.0 and a boiling point higher than 250° C.

Ratio of Encapsulated Benefit Agent to Dispersed Perfume Oil

The liquid fabric softener composition may comprise a ratio of perfume oil encapsulates to dispersed perfume oil by weight of from 1:1 to 1:40, preferably from 1:2 to 1:20, more preferably from 1:3 to 1:10.

Additional Fabric Softening Active

The liquid fabric softener composition of the present invention may comprise from 0.01% to 10%, preferably from 0.1% to 10%, more preferably from 0.1% to 5% of additional fabric softening active. Suitable fabric softening actives, include, but are not limited to, materials selected from the group consisting of non-ester quaternary ammonium compounds, amines, fatty esters, sucrose esters, silicones, dispersible polyolefins, polysaccharides, fatty acids, softening oils, polymer latexes and combinations thereof.

Non-Ester Quaternary Ammonium Compounds:

Suitable non-ester quaternary ammonium compounds comprise compounds of the formula:

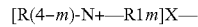

[R(4−m)-N+—R1m]X− wherein each R comprises either hydrogen, a short chain C1-C6, in one aspect a C1-C3 alkyl or hydroxyalkyl group, for example methyl, ethyl, propyl, hydroxyethyl, poly(C2-3 alkoxy), polyethoxy, benzyl, or mixtures thereof; each m is 1, 2 or 3 with the proviso that the value of each m is the same; the sum of carbons in each R1 may be C12-C22, with each R1 being a hydrocarbyl, or substituted hydrocarbyl group; and X— may comprise any softener-compatible anion. The softener-compatible anion may comprise chloride, bromide, methylsulfate, ethylsulfate, sulfate, and nitrate. The softener-compatible anion may comprise chloride or methyl sulfate.

Non-limiting examples include dialkylenedimethylammonium salts such as dicanoladimethylammonium chloride, di(hard)tallowdimethylammonium chloride dicanoladimethylammonium methylsulfate, and mixtures thereof. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

Amines

Suitable amines include but are not limited to, materials selected from the group consisting of amidoesteramines, amidoamines, imidazoline amines, alkyl amines, and combinations thereof. Suitable ester amines include but are not limited to, materials selected from the group consisting of monoester amines, diester amines, triester amines and combinations thereof. Suitable amidoamines include but are not limited to, materials selected from the group consisting of monoamido amines, diamido amines and combinations thereof. Suitable alkyl amines include but are not limited to, materials selected from the group consisting of mono alkylamines, dialkyl amines quats, trialkyl amines, and combinations thereof.

Fatty Acid

The liquid fabric softener composition may comprise a fatty acid, such as a free fatty acid as fabric softening active. The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

Mixtures of fatty acids from different fat sources can be used.

The cis/trans ratio for the unsaturated fatty acids may be important, with the cis/trans ratio (of the C18:1 material) being from at least 1:1, at least 3:1, from 4:1 or even from 9:1 or higher.

Branched fatty acids such as isostearic acid are also suitable since they may be more stable with respect to oxidation and the resulting degradation of color and odor quality.

The fatty acid may have an iodine value from 0 to 140, from 50 to 120 or even from 85 to 105.

Polysaccharides

The liquid fabric softener composition may comprise a polysaccharide as a fabric softening active, such as cationic starch. Suitable cationic starches for use in the present compositions are commercially-available from Cerestar under the trade name C*BOND® and from National Starch and Chemical Company under the trade name CATO® 2A.

Sucrose Esters

The liquid fabric softener composition may comprise a sucrose esters as a fabric softening active. Sucrose esters are typically derived from sucrose and fatty acids. Sucrose ester is composed of a sucrose moiety having one or more of its hydroxyl groups esterified.

Sucrose is a disaccharide having the following formula:

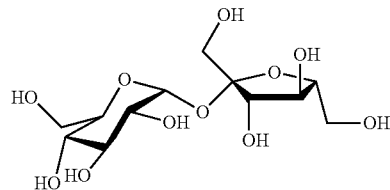

Alternatively, the sucrose molecule can be represented by the formula: $M(OH)_8$, wherein M is the disaccharide backbone and there are total of 8 hydroxyl groups in the molecule.

Thus, sucrose esters can be represented by the following formula:

$$M(OH)_{8-x}(OC(O)R^1)_x$$

wherein x is the number of hydroxyl groups that are esterified, whereas (8-x) is the hydroxyl groups that remain unchanged; x is an integer selected from 1 to 8, alternatively from 2 to 8, alternatively from 3 to 8, or from 4 to 8; and $R^1$ moieties are independently selected from $C_1$-$C_{22}$ alkyl or $C_1$-$C_{30}$ alkoxy, linear or branched, cyclic or acyclic, saturated or unsaturated, substituted or unsubstituted.

The $R^1$ moieties may comprise linear alkyl or alkoxy moieties having independently selected and varying chain length. For example, $R^1$ may comprise a mixture of linear alkyl or alkoxy moieties wherein greater than 20% of the linear chains are $C_{18}$, alternatively greater than 50% of the linear chains are $C_{18}$, alternatively greater than 80% of the linear chains are $C_{18}$.

The $R^1$ moieties may comprise a mixture of saturate and unsaturated alkyl or alkoxy moieties. The iodine value (IV) of the sucrose esters suitable for use herein ranges from 1 to 150, or from 2 to 100, or from 5 to 85. The $R^1$ moieties may be hydrogenated to reduce the degree of unsaturation. In the case where a higher IV is preferred, such as from 40 to 95, then oleic acid and fatty acids derived from soybean oil and canola oil are suitable starting materials.

The unsaturated $R^1$ moieties may comprise a mixture of "cis" and "trans" forms the unsaturated sites. The "cis"/"trans" ratios may range from 1:1 to 50:1, or from 2:1 to 40:1, or from 3:1 to 30:1, or from 4:1 to 20:1.

Dispersible Polyolefins and Latexes:

Generally, all dispersible polyolefins that provide fabric softening benefits can be used as fabric softening active in the present invention. The polyolefins can be in the form of waxes, emulsions, dispersions or suspensions.

The polyolefin may be chosen from a polyethylene, polypropylene, or combinations thereof. The polyolefin may be at least partially modified to contain various functional groups, such as carboxyl, alkylamide, sulfonic acid or amide groups. The polyolefin may be at least partially carboxyl modified or, in other words, oxidized.

Non-limiting examples of fabric softening active include dispersible polyethylene and polymer latexes. These agents can be in the form of emulsions, latexes, dispersions, suspensions, and the like. In one aspect, they are in the form of an emulsion or a latex. Dispersible polyethylenes and polymer latexes can have a wide range of particle size diameters ($\chi_{50}$) including but not limited to from 1 nm to 100 μm; alternatively from 10 nm to 10 μm. As such, the particle sizes of dispersible polyethylenes and polymer latexes are generally, but without limitation, smaller than silicones or other fatty oils.

Generally, any surfactant suitable for making polymer emulsions or emulsion polymerizations of polymer latexes can be used as emulsifiers for polymer emulsions and latexes used as fabric softeners active in the present invention. Suitable surfactants include anionic, cationic, and nonionic surfactants, and combinations thereof. In one aspect, such surfactants are nonionic and/or anionic surfactants. In one aspect, the ratio of surfactant to polymer in the fabric softening active is 1:5, respectively.

Silicone:

The liquid fabric softener composition may comprise a silicone as fabric softening active. Useful silicones can be any silicone comprising compound. The silicone polymer may be selected from the group consisting of cyclic silicones, polydimethylsiloxanes, aminosilicones, cationic silicones, silicone polyethers, silicone resins, silicone urethanes, and combinations thereof. The silicone may be a polydialkylsilicone, alternatively a polydimethyl silicone (polydimethyl siloxane or "PDMS"), or a derivative thereof. The silicone may be chosen from an aminofunctional silicone, amino-polyether silicone, alkyloxylated silicone, cationic silicone, ethoxylated silicone, propoxylated silicone, ethoxylated/propoxylated silicone, quaternary silicone, or combinations thereof.

Further Perfume Delivery Technologies

The liquid fabric softener composition may comprise one or more perfume delivery technologies that stabilize and enhance the deposition and release of perfume ingredients from treated substrate. Such perfume delivery technologies can be used to increase the longevity of perfume release from the treated substrate. Perfume delivery technologies, methods of making certain perfume delivery technologies and the uses of such perfume delivery technologies are disclosed in US 2007/0275866 A1.

The liquid fabric softener composition may comprise from 0.001% to 20%, or from 0.01% to 10%, or from 0.05% to 5%, or even from 0.1% to 0.5% by weight of the perfume delivery technology. Said perfume delivery technologies may be selected from the group consisting of: pro-perfumes, cyclodextrins, starch encapsulated accord, zeolite and inorganic carrier, and combinations thereof.

Amine Reaction Product (ARP): For purposes of the present application, ARP is a subclass or species of pro-perfumes. One may also use "reactive" polymeric amines in which the amine functionality is pre-reacted with one or more PRMs to form an amine reaction product (ARP). Typically the reactive amines are primary and/or secondary amines, and may be part of a polymer or a monomer (non-polymer). Such ARPs may also be mixed with additional PRMs to provide benefits of polymer-assisted delivery and/or amine-assisted delivery. Nonlimiting examples of polymeric amines include polymers based on polyalkylimines, such as polyethyleneimine (PEI), or polyvinylamine (PVAm). Nonlimiting examples of monomeric (non-polymeric) amines include hydroxyl amines, such as 2-aminoethanol and its alkyl substituted derivatives, and aromatic amines such as anthranilates. The ARPs may be premixed with perfume or added separately in leave-on or rinse-off applications. A material that contains a heteroatom other than nitrogen, for example oxygen, sulfur, phosphorus or selenium, may be used as an alternative to amine compounds. The aforementioned alternative compounds can be used in combinations with amine compounds. A single molecule may comprise an amine moiety and one or more of the alternative heteroatom moieties, for example, thiols, and phosphines. The benefit may include improved delivery of perfume as well as controlled perfume release.

Deposition Aid

The liquid fabric softener composition may comprise, based on the total liquid fabric softener composition weight, from 0.0001% to 3%, preferably from 0.0005% to 2%, more preferably from 0.001% to 1% of a deposition aid. The deposition aid may be a cationic or amphoteric polymer. The cationic polymer may comprise a cationic acrylate. Cationic polymers in general and their method of manufacture are known in the literature. Deposition aids can be added concomitantly with particles or directly in the liquid fabric softener composition. Preferably, the deposition aid is selected from the group consisting of polyvinylformamide, partially hydroxylated polyvinylformamide, polyvinylamine, polyethylene imine, ethoxylated polyethylene imine, polyvinylalcohol, polyacrylates, and combinations thereof.

The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. In one aspect, the weight-average molecular weight of the cationic polymer may be from 500 to 37500 Dalton.

Method

The present invention also provides a method of treating a fabric, the method comprising the steps of (i) in a laundering step, treating a fabric with an aqueous wash liquor comprising from 0.1 g/l to 5 g/l of a surfactant, preferably comprising anionic and/or nonionic surfactant; (ii) optionally rinsing the fabric one or two or more times with water; and (iii) in a rinse-treatment step, treating the fabric with an aqueous rinse liquor comprising soil-weakening enzyme selected from (i) nuclease enzymes, (ii) galactanase enzymes having at least 60%, or at least 80%, or at least 90% or at least 95% identity with the amino acid sequence shown in SEQ ID NO:111, SEQ ID NO:112 or SEQ ID NO:113, and (iii) mannanase enzymes having at least 60% sequence identity to SEQ ID NO:114, or having at least 81% sequence identity to SEQ ID NO: 115, and (iv) mixtures thereof, and fabric softener component; and (iv) drying the fabric. A further additional rinse step may be provided between steps (iii) and (iv) however it may be preferred for the fabric to be dried immediately after step (iii).

The laundering step may be any conventional fabric washing step. A detergent composition can be used to form the aqueous wash liquor for use in the laundering. The detergent composition will comprise a surfactant and optional additional adjuncts.

Surfactant System

The surfactant system comprises an anionic surfactant and/or a nonionic surfactant wherein the weight ratio of anionic to non-ionic surfactant is from 1.5:1 to 1:10, preferably from 1.2:1 to 1:5, more preferably from 1:1 to 1:4.

The total surfactant level in the cleaning composition is preferably from 5 to 80% by weight, or from 10 to 50% by weight, more preferably from 15 to 45% by weight.

Anionic Surfactant

The anionic surfactant may comprise one surfactant or typically mixtures of more than one surfactant. Preferred anionic detersive surfactants are alkyl benzene sulfonates, alkoxylated anionic surfactant, or a combination thereof. Suitable anionic detersive surfactants include sulphate and sulphonate detersive surfactants.

Particularly preferred alkyl benzene sulphonates are linear alkylbenzene sulphonates, particularly those having a carbon chain length of C8-15, or C10-13 alkyl benzene sulphonate. Suitable alkyl benzene sulphonate (LAS) is obtainable, or even obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. Another suitable anionic detersive surfactant is alkyl benzene sulphonate that is obtained by DETAL catalyzed process, preferably having 8 to 15 carbon atoms. Other synthesis routes, such as HF, may also be suitable.

Suitable sulphate detersive surfactants include alkyl sulphate, such as C8-18 alkyl sulphate, or predominantly C12 alkyl sulphate. The alkyl sulphate may be derived from natural sources, such as coco and/or tallow. Alternatively, the alkyl sulphate may be derived from synthetic sources such as C12-15 alkyl sulphate.

It may be preferred for the surfactant composition to comprise as additional anionic surfactant, in addition an alkyl alkoxylated sulphate, such as alkyl ethoxylated sulphate, or a C8-18 alkyl alkoxylated sulphate, or a C8-18 alkyl ethoxylated sulphate. Preferably the alkyl chain length may be from 12 to 16 carbon atoms. The alkyl alkoxylated sulphate may have an average degree of alkoxylation of from 0.5 to 20, or from 0.5 to 10, or from 0.5 to 7, or from 0.5 to 5 or from 0.5 to 3. Examples include predominantly C12 sodium lauryl ether sulphate ethoxylated with an average of 3 moles of ethylene oxide per mole.

The alkyl sulphate, alkyl alkoxylated sulphate and alkyl benzene sulphonates may be linear or branched, substituted or un-substituted.

The anionic detersive surfactant may be a mid-chain branched anionic detersive surfactant, such as a mid-chain branched alkyl sulphate and/or a mid-chain branched alkyl benzene sulphonate. The mid-chain branches are typically C1-4 alkyl groups, such as methyl and/or ethyl groups.

Another suitable anionic detersive surfactant is alkyl ethoxy carboxylate.

The anionic surfactants are typically present in their salt form, typically being complexed with a suitable cation. Suitable counter-ions include Na+ and K+, substituted ammonium such as C1-C6 alkanolammnonium such as mono-ethanolamine (MEA) tri-ethanolamine (TEA), di-ethanolamine (DEA), and any mixture thereof.

In the cleaning compositions, when alky (optionally ethoxylated) sulphates are present preferably the weight ratio of linear alkyl benzene sulphonate to alkyl sulphate and/or alkyl alkoxylated sulphate is from 20:1 to 1:2, more preferably from 5:1 to 1:1. Typically the anionic surfactant is present in the cleaning composition in an amount from 5 to 30 wt % anionic surfactant, or from at least 8 or at least 10% by weight anionic surfactant.

Herein, fatty acid is not considered as a surfactant.

Nonionic Surfactant

Suitable non-ionic surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein the alkoxylate units may be ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; C14-C22 mid-chain branched alkyl alkoxylates, typically having an average degree of alkoxylation of from 1 to 30; alkylpolysaccharides, in one aspect, alkylpolyglycosides; polyhydroxy fatty acid amides; ether capped poly(oxyalkylated) alcohol surfactants; and mixtures thereof.

Suitable non-ionic detersive surfactants include alkyl polyglucoside and/or an alkyl alkoxylated alcohol.

When alkyl alkoxylated alcohols are present, preferably they are selected from $C_{8-18}$ alkyl alkoxylated alcohol, for example a $C_{8-18}$ alkyl ethoxylated alcohol. Preferably the alkyl alkoxylated alcohol has an average degree of alkoxylation of from 1 to 80, preferably from 1 to 50, most preferably from 1 to 30, from 1 to 20, or from 1 to 10. Preferred nonionic surfactants may be $C_{8-18}$ alkyl alkoxylated, preferably ethoxylated alcohols having an average degree of alkoxylation, preferably ethoxylation of from 1 to 10, from 1 to 7, more from 1 to 5 or from 3 to 7, or even below 3 or 2. The alkyl alkoxylated alcohol can be linear or branched, and substituted or un-substituted.

Suitable nonionic surfactants include those with the tradename Lutensol® (BASF).

Typically the nonionic surfactant is present in the cleaning composition in an amount from 4 to 40 wt % anionic surfactant, or from at least from 8 or at least from 10% by weight, or from 12 10% by weight nonionic surfactant.

Detergent compositions may be in any suitable form, for example, solid such as powder detergent or liquid or in unit dose form. It may be preferred for a liquids to be an externally structured aqueous isotropic liquid laundry detergent composition.

The wash liquor comprises from 0.1 g/l to 5 g/l of the surfactant system.

Detergent Composition Adjunct Materials

Further suitable adjuncts may be, for example to assist or enhance cleaning performance, or to modify the aesthetics of the detergent composition as is the case with perfumes, colorants, non-fabric-shading dyes or the like. Suitable adjunct materials include, but are not limited to, surfactants, builders, chelating agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, additional brighteners, suds suppressors, dyes, hueing dyes, perfumes, perfume delivery systems, structure elasticizing agents, fabric softeners, carriers, hydrotropes, processing aids, solvents, additional dyes and/or pigments, some of which are discussed in more detail below. In addition to the disclosure below, suitable examples of such other adjuncts and levels of use are found in U.S. Pat. Nos. 5,576,282, 6,306,812 B1 and 6,326,348 B1 that are incorporated by reference.

Generally, an effective amount of such a composition is added to water, for example in a conventional fabric automatic washing machine, to form the aqueous wash liquor. The aqueous wash liquor so formed is then contacted, typically under agitation, with the fabrics to be laundered. An effective amount of the detergent composition added to water to form aqueous laundering solutions can comprise amounts sufficient to form from about 500 to 25,000 ppm, or from 500 to 15,000 ppm of composition in aqueous washing solution, or from about 1,000 to 3,000 ppm of the detergent compositions herein will be provided in aqueous washing solution.

Typically, the wash liquor is formed by contacting the detergent with wash water in such an amount so that the concentration of the detergent in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 litres or less of water, or 30 litres or less, or 20 litres or less, or 10 litres or less, or 8 litres or less, or even 6 litres or less of water. The wash liquor may comprise from above 0 to 15 litres, or from 2 litres, and to 12 litres, or even to 8 litres of water. Typically from 0.01 kg to 2 kg of fabric per litre of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per litre of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the detergent of the invention has a pH of from 3 to 11.5.

The laundering step may be followed by one or more optional rinsing steps. In the subsequent rinse-treatment step (iii), the fabric is treated with an aqueous rinse liquor comprising soil-weakening enzyme selected from (i) nuclease enzymes, (ii) galactanase enzymes having at least 60%, or at least 80%, or at least 90% or at least 95% identity with the amino acid sequence shown in SEQ ID NO:108, SEQ ID NO:109 or SEQ ID NO:110, and (iii) mannanase enzymes having at least 60% sequence identity to SEQ ID NO:114, or having at least 81% sequence identity to SEQ ID NO: 115, and (iv) mixtures thereof, and fabric softener component. This can be achieved by adding the softener composition described herein into the rinse water, either in a hand washing processing or in a laundry washing machine rinse step. This step is preferably the final rinse step, immediately before drying the fabric. If desired a rinse step may take place between the rinse-treatment step and drying the fabric.

Drying of the fabric may be by any conventional means either in domestic or industrial settings: machine drying or open-air drying. The fabric may comprise any fabric capable of being laundered in normal consumer or institutional use conditions, and the invention is particularly suitable for synthetic textiles such as polyester and nylon and especially for treatment of mixed fabrics and/or fibres comprising synthetic and cellulosic fabrics and/or fibres. As examples of synthetic fabrics are polyester, nylon, these may be present in mixtures with cellulosic fibres, for example, polycotton fabrics. The water temperatures typically range from about 5° C. to about 90° C., though lower water temperatures up to 60 or 40 or 30° C. are useful. The water to fabric ratio is typically from about 1:1 to about 30:1.

Methods

For each method applied to a fabric softener composition, a visually homogeneous sample is used. In case the fabric softener composition is visually not homogeneous, the entire fabric softener composition is homogenized in a way to avoid air entrapment, prior to sampling to ensure representative sampling.

Method for Determining Viscosity and Dynamic Yield Stress

Viscosity and dynamic yield stress are measured using a controlled stress rheometer (such as an HAAKE MARS from Thermo Scientific, or equivalent), using a 60 mm parallel plate and a gap size of 500 microns at 20° C. The viscosity and dynamic yield stress are obtained by measuring quasi steady state shear stress as a function of shear rate in the range starting from $10\ s^{-1}$ to $10^4\ s^{-1}$, taking 25 points logarithmically distributed over the shear rate range. Quasi-steady state is defined as the shear stress value once variation of shear stress over time is less than 3%, after at least 30 seconds and a maximum of 60 seconds at a given shear rate. Variation of shear stress over time is continuously evaluated by comparison of the average shear stress measured over periods of 3 seconds. If after 60 seconds measurement at a certain shear rate, the shear stress value varies more than 3%, the final shear stress measurement is defined as the quasi state value for calculation purposes. The viscosity of the fabric softener composition is defined as the measured shear stress divided by the applied shear rate of $10\ s^{-1}$.

Shear stress data is then fitted using least squares method in logarithmic space as a function of shear rate following a Herschel-Bulkley model:

$$\tau = \tau_0 + k\dot{\gamma}^n$$

wherein $\tau$ is the measured equilibrium quasi steady state shear stress at each applied shear rate $\dot{\gamma}$, $\tau_0$ is the fitted dynamic yield stress. k and n are fitting parameters.

Method of Determining pH of a Fabric Softener Composition

The pH is measured on the neat fabric softener composition, using a Sartorius PT-10P pH meter with gel-filled probe (such as the Toledo probe, part number 52 000 100), calibrated according to the instructions manual.

Method for Determining Fabric Softener Active by CatSO3 Titration

The fabric softener activity is determined by cationic CatSO3 titration as described in ISO2871.

Specifically, to a sample containing cationic fabric softener active, a mixed indicator composed of a cationic and an anionic dye is added under stirring in a water-chloroform system. The cationic fabric softener active—anionic dye complex is blue and chloroform soluble, whereas the red cationic dye remains dissolved in the aqueous phase. Upon titration with anionic surfactant (standardized sodium dodecyl sulfate, "NaLS"), the blue dye-surfactant complex in the chloroform breaks and a colorless cationic fabric softening active—anionic titrant complex is formed while the liberated blue dye migrates back into the aqueous phase. A color change from blue to grey in the chloroform layer indicates the endpoint. Excess anionic surfactant forms a complex with the red cationic dye, giving a pink to red color to the chloroform layer.

Calculation:
$$\% \text{ Cationic SO3 equivalent} = [(V*N)]*0.080*100/W$$

Where:
V=mL NaLS Standard Solution
N=Normality of NaLS Standard Solution
0.080=Milliequivalent Weight of SO3
W=Sample weight in g Method for Determining Dispenser Residue:

Following setup is used to simulate the final rinse cycle in the dispenser of the washing machine.

The dispenser drawer PP-T40 corresponding to a Miele Novotronic W986 washing machine is fixed in horizontal position. Then, 25 grams of the fabric softener composition is added into the fabric softener composition compartment of the dispenser drawer.

A total flow of 3.47 kg of water of 2.5 mmol/L hardness is flushed through the dispenser in 80 seconds at 20° C. by using a "cylindrical nozzle" located horizontally 2.5 cm above and parallel to the dispenser compartment. Such cylindrical nozzle having a diameter of 4 cm and a length of 12.8 cm with 3 orifices of 0.5 cm diameter located corresponding to the orifices of the fabric care composition compartment of the dispenser drawer.

Rinse water containing the fabric care composition is collected in a bucket containing 5 kg of 2.5 mmol/L hardness water and homogenized with an IKA EURO-ST P VC with an R 2302 4-bladed Propeller stirrer at 450 rpm for 1 minute after water flow has finished. The total rinse water mass obtained at the end of the dispenser residue test is 8.47 kg.

The fabric softener activity, measured using CatSO3 titration, is measured of the fabric softener composition added into the dispenser and of the rinse water.

Dispensing residue expressed in % is calculated as:

$$\frac{0.025 \cdot CatSO3_{(fabric\ softener\ composition)} - 8.47 \cdot CatSO3_{(rinse\ water)}}{0.025 \cdot CatSO3_{(fabric\ softener\ composition)}}$$

wherein
$CatSO3_{(fabric\ softener\ composition)}$ is the % Cationic SO3 Equivalent determined by CatSO3 titration of the fabric softener composition;
$CatSO3_{(rinse\ water)}$ is the % Cationic SO3 Equivalent determined by CatSO3 titration of the rinse water collected at the end of the dispenser residue test.

EXAMPLES

TABLE 1

Liquid fabric softener compositions examples 1 through 8.

| | Weight % | | | |
|---|---|---|---|---|
| | Ex. 1 | Ex. 2 | Ex. 3 | Ex. 4 |
| deionized water | Balance | Balance | Balance | Balance |
| NaHEDP | 0.007 | 0.007 | 0.007 | 0.007 |
| Formic acid | 0.044 | 0.044 | 0.044 | 0.044 |
| HCl | 0.009 | 0.009 | 0.009 | 0.009 |
| Preservative[a] | 0.022 | 0.022 | 0.022 | 0.022 |
| FSA[b] | 7.6 | 7.6 | 7.6 | 7.6 |
| Antifoam[c] | 0.1 | 0.1 | 0.1 | 0.1 |
| coconut oil | 0.3 | 0.3 | 0.3 | 0.3 |
| isopropanol | 0.78 | 0.78 | 0.77 | 0.77 |
| Encapsulated perfume[d] | 0.15 | 0.15 | 0.15 | 0.15 |
| dye | 0.015 | 0.015 | 0.015 | 0.015 |
| Catinic polymeric thickener[e] | 0.15 | 0.20 | 0.28 | 0.35 |
| Nuclease enzyme[g] | 0.005 | 0.005 | — | — |
| Galactanase enzyme[h] | 0.002 | — | 0.01 | — |
| Mannanase enzyme[i] | — | — | — | 0.005 |
| Perfume | 1.0 | 1.0 | 1.0 | 1.0 |
| Dynamic yield stress | 0.000 Pa | 0.090 Pa | 0.380 Pa | 0.380 Pa |
| Viscosity at 10 s$^{-1}$ | 172 mPa·s | 284 mPa·s | 474 mPa·s | 662 mPa·s |
| Dispenser residue | 11% | 14% | 34% | 39% |

| | Weight % | | | |
|---|---|---|---|---|
| | Ex. 5 | Ex. 6 | Ex. 7 | Ex. 8 |
| deionized water | Balance | Balance | Balance | Balance |
| NaHEDP | 0.007 | 0.007 | 0.007 | 0.007 |
| Formic acid | 0.043 | 0.043 | 0.043 | 0.043 |
| HCl | 0.009 | 0.009 | 0.009 | 0.009 |
| Preservative[a] | 0.022 | 0.021 | 0.021 | 0.021 |
| FSA[b] | 7.4 | 7.4 | 7.3 | 7.3 |
| Nuclease enzyme | 0.004 | 0.008 | 0.03 | 0.02 |
| Antifoam[c] | 0.1 | 0.1 | 0.1 | 0.1 |
| coconut oil | 0.3 | 0.3 | 0.3 | 0.2 |
| isopropanol | 0.76 | 0.76 | 0.75 | 0.75 |
| Encapsulated perfume[d] | 0.15 | 0.15 | 0.15 | 0.15 |
| dye | 0.015 | 0.015 | 0.015 | 0.015 |
| Cationic polymeric thickener[e] | 0.22 | — | — | — |
| Microfibrous cellulose[f] | | 0.27 | 0.34 | 0.36 |

TABLE 1-continued

Liquid fabric softener compositions examples 1 through 8.

| | | | | |
|---|---|---|---|---|
| Nuclease enzyme[g] | 0.01 | 0.005 | — | 0.008 |
| Galactanase enzyme[h] | — | — | — | — |
| Mannanase enzyme[i] | — | 0.005 | 0.01 | — |
| Perfume | 1.0 | 1.0 | 1.0 | 1.0 |
| Dynamic yield stress | 0.060 Pa | 0.110 Pa | 0.200 Pa | 0.230 Pa |
| Viscosity at 10 s$^{-1}$ | 208 mPa·s | 230 mPa·s | 367 mPa·s | 600 mPa·s |
| Dispenser residue | 12% | 12% | 6% | 5% |

[a] Proxel GXL, 20% aqueous dipropylene glycol solution of 1,2-benzisothiazolin-3-one, supplied by Lonza.
[b] N,N-bis(hydroxyethyl)-N,N-dimethyl ammonium chloride fatty acid ester. The iodine value of the parent fatty acid of this material is between 18 and 22. The material as obtained from Evonik contains impurities in the formof free fatty acid, the monoester form of N,N-bis(hydroxyethyl)-N,N-dimethyl ammonium chloride fatty acid ester, and fatty acid esters of N,N-bis(hydroxyethyl)-N-methylamine.
[c] MP10 ®, supplied by Dow Corning, 8% activity
[d] as described in U.S. Pat. No. 8,765,659, expressed as 100% encapsulated perfume oil
[e] Rheovis ® CDE, cationic polymeric thickener supplied by BASF
[f] Exilva ®, microfibrous cellulose, expressed as 100% dry matter, supplied as 10% aqueous dispersion by Borregaard
[g] Nuclease enzyme variant of any of SEQ ID NOs: 1-107
[h] Galactanase enzyme variant of any of SEQ ID NOs: 108-110
[i] Mannanase enzyme variant of any of SEQ ID NOs: 111-115

| | (% wt) | | | | | |
|---|---|---|---|---|---|---|
| | 9 | 10 | 11 | 12 | 13 | 14 |
| FSA[a] | 9.2 | 7 | — | — | — | — |
| FSA[b] | — | — | — | 9.3 | 12.5 | — |
| FSA[c] | — | — | — | — | — | — |
| FSA[n] | — | — | 5 | — | — | 8.5 |
| Coco oil | 0.735 | 0.1 | 0.51 | 0.3 | 0.6 | 0.8 |
| Low MW Alcohol[d] | 0.58 | 0.11 | 0.58 | 0.95 | 0.95 | 0.95 |
| Perfume | 1.65 | 3.5 | 1.65 | 1.00 | 1.60 | 1.00 |
| Perfume encapsulate[e] | 0.26 | 1.33 | 0.26 | 0.25 | 0.25 | 0.25 |
| Calcium Chloride | 0.12 | 0.05 | — | 0.12 | 0.16 | 0.07 |
| Chelant[f] | 0.01 | 0.01 | 0.01 | 0.01 | 0.01 | 0.01 |
| Preservative[g] | 0.001 | — | 0.001 | — | — | — |
| Acidulent (Formic Acid) | — | 0.06 | — | 0.06 | 0.06 | 0.06 |
| Antifoam[h] | — | 0.02 | — | — | — | — |
| Polymer 1[i] | 0.03 | 0.25 | 0.01 | 0.12 | 0.12 | 0.12 |
| Polymer 2[i] | 0.04 | 0.18 | 0.02 | 0.12 | 0.12 | 0.12 |
| Water soluble dialkyl quat[j] | 0.29 | 0.29 | 0.29 | 0.11 | 0.11 | 0.11 |
| Dispersant[k] | — | — | 0.15 | — | — | 0.10 |
| Stabilizing Surfactant[l] | — | — | 0.45 | 0.50 | 0.1 | 0.10 |
| Stabilizing Surfactant[p] | — | — | 0.10 | — | 0.25 | — |
| Floc preventing agent[o] | 0.40 | — | — | — | — | 0.12 |
| PDMS emulsion[m] | 1.12 | — | 0.85 | — | — | — |
| Amino-functional Organosiloxane Polymer | — | 3.1 | 0.95 | — | — | — |
| Dye | 0.03 | 0.03 | — | 0.03 | 0.03 | 0.03 |
| Hydrochloric Acid | 0.03 | 0.03 | 0.03 | 0.03 | 0.03 | 0.03 |
| Nuclease enzyme[s] | 0.01 | 0.005 | — | 0.008 | 0..1 | 0.009 |
| Galactanase enzyme[t] | — | — | — | — | — | — |
| Mannanase enzyme[u] | — | 0.005 | 0.01 | — | — | — |
| Deionized Water | Balance | Balance | Balance | Balance | Balance | Balance |

| | (% wt) | | | | | |
|---|---|---|---|---|---|---|
| | 15 | 16 | 17 | 18 | 19 | 20 |
| FSA[r] | 4.3 | 7 | 9 | 11 | 14.7 | 18 |
| Coco oil | — | 0.5 | — | — | — | — |
| Low MW Alcohol[d] | — | — | — | — | — | 0.5 |
| Perfume | 0.7 | 2.2 | 2.2 | 3.3 | 1.60 | 1.2 |
| Perfume encapsulate[e] | — | 1.33 | 0.26 | 0.25 | 0.25 | 0.25 |
| Calcium Chloride | — | 0.03 | 0.045 | 0.12 | 0.15 | 0.2 |
| Chelant[f] | 0.01 | 0.01 | 0.01 | 0.01 | 0.01 | 0.01 |
| Preservative[g] | 0.001 | — | 0.001 | — | — | — |
| Acidulent (Formic Acid) | — | 0.06 | — | 0.06 | 0.06 | 0.06 |
| Antifoam[h] | — | 0.02 | — | — | — | — |
| Polymer 1[i] | 0.03 | 0.2 | 0.01 | 0.12 | 0.12 | 0.12 |
| Polymer 2[i] | 0.04 | 0.1 | 0.02 | 0.12 | 0.12 | 0.12 |
| Water soluble dialkyl quat[j] | — | — | 0.2 | 0.4 | — | — |
| Dispersant[k] | — | — | 0.15 | — | — | 0.10 |
| Stabilizing Surfactant[l] | — | — | 0.1 | 0.156 | — | — |
| Stabilizing Surfactant[p] | — | — | 0.10 | — | — | — |
| Floe preventing agent[o] | 0.40 | 0.4 | 0.4 | — | — | — |
| Amino-functional | — | 3.1 | 0.95 | — | — | — |

TABLE 1-continued

Liquid fabric softener compositions examples 1 through 8.

| | | | | | | |
|---|---|---|---|---|---|---|
| Organosiloxane Polymer | | | | | | |
| Dye | 0.03 | 0.03 | — | 0.03 | 0.03 | 0.03 |
| Hydrochloric Acid | 0.02 | 0.03 | 0.03 | 0.03 | 0.035 | 0.035 |
| Nuclease enzyme$^s$ | 0.01 | 0.005 | — | 0.2 | 0.005 | 0.008 |
| Galactanase enzyme $^t$ | — | — | — | — | — | 0.001 |
| Mannanase enzyme$^u$ | — | 0.005 | 0.01 | — | 0.005 | |
| Deionized Water | Balance | Balance | Balance | Balance | Balance | Balance |

$^a$ reaction product of Methyl-diethanolamine with fatty acids, in molar ratio ranging from 1:1.5 to 1:2, fully or partially quaternized with methylchloride. The fatty acid has a chain length distribution comprising about 35-55% saturated C18 chains, 10-25% mono-unsaturated C18 chains, and has an iodine value of about 20. Material available from Evonik.
$^b$ reaction product of Tri-ethanolamine with fatty acids in molar ratio ranging from 1:1.5 to 1:2, fully or partially quaternized with dimethylsulphate. The fatty acid has a chain length distribution of about 35-55% saturated C18 chains, 15-25% mono-unsaturated C18 chains, and an iodine value of about 40. Material available from Stepan.
$^c$ reaction product of Methyl-diethanolamine with fatty acids, in molar ratio ranging from 1:1.5 to 1:2, fully or partially quaternized with methylchloride. The fatty acid has a chain length distribution comprising about 35-55% saturated C18 chains, 10-25% mono-unsaturated C18 chains, and an iodine value of about 56. Material available from Evonik.
$^d$ Low molecular weight alcohol such as ethanol or isopropanol.
$^e$ Perfume microcapsules available ex Appleton Papers, Inc.
$^f$ Diethylenetriaminepentaacetic acid or hydroxyl ethylidene-1,1-diphosphonic acid.
$^g$ 1,2-Benzisothiazolin-3-ONE (BIT) under the trade name Proxel available from Lonza.
$^h$ Silicone antifoam agent available from Dow Corning ® under the trade name DC2310.
$^i$ Polymer 1 are chosen from Table 1 and Polymer 2 are chosen from Table 2.
$^j$ Didecyl dimethyl ammonium chloride under the trade name Bardac® 2280 or Hydrogenated tallowalkyl(2-ethylhexyl)-dimethyl ammonium methylsulfate from AkzoNobel under the trade name Arquad® HTL8-MS.
$^k$ Non-ionic surfactant from BASF under the trade name Lutensol® XL-70.
$^l$ Non-ionic surfactant, such as TWEEN 20 ™, Lutensol AT25 (ethoxylated alcohol with an average degree of ethoxylation of 25 from BASF).
$^m$ Polydimethylsiloxane emulsion from Dow Corning under the trade name DC346®.
$^n$ reaction product of Methyl-diisopropanolamine with fatty acids, mixed in a molar ratio ranging from 1:1.5 to 1:2, fully or partially quaternized with dimethylsulphate. The fatty acid has a chain length distribution comprising less than 10% saturated C18 chains, about 20-30% mono-unsaturated C18 chains, about 50-70% C16 chains, and an iodine of about 35. Material available from Evonik.
$^o$ Nonionic surfactant such as Lutensol AT80 (ethoxylated alcohol with an average degree of ethoxylation of 80 from BASF) or Genapol T680 (ethoxylated alcohol with an average degree of ethoxylation of 68 from Clariant).
$^p$ ethoxylated cationic surfactant such as Berol R648 (average degree of ethoxylation of 15 from Akzo Nobel) or Variquat K1215 (average degree of ethoxylation of 15 from Evonik).
$^q$ Rheovis CDE ® commercially available from BASF.
$^r$ reaction product of Methyl-diisopropanolamine with fatty acids, mixed in a molar ratio ranging from 1:1.5 to 1:2, fully or partially quaternized with dimethylsulphate. The fatty acid has a chain length distribution comprising about 35-55% saturated C18 chains, 10-25% mono-unsaturated C18 chains, and has an iodine value of about 20. Material available from Evonik.
$^s$Nuclease enzyme variant of any of SEQ ID NOs: 1-107
$^t$ Galactanase enzyme variant of any of SEQ ID NOs: 108-110
$^u$Mannanase enzyme variant of any of SEQ ID NOs: 111-115

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric softener composition comprising:
(i) from 2 to 50 wt % fabric softener compound comprising a quaternary ammonium ester compound having the following formula:

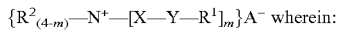

$\{R^2_{(4-m)}-N^+-[X-Y-R^1]_m\}A^-$ wherein:

m is 1, 2 or 3 with proviso that the value of each m is identical;
each $R^1$ is independently hydrocarbyl, or branched hydrocarbyl group;
each $R^2$ is independently a C1-C3 alkyl or hydroxy alkyl group;
each X is independently (CH2)n, CH2-CH(CH3)- or CH—(CH3)-CH2- and
each n is independently 1, 2, 3 or 4;
each Y is independently —O—(O)C— or —C(O)—O—;
A- is independently selected from the group consisting of chloride, methyl sulfate, and ethyl sulfate;
with the proviso that when Y is —O—(O)C—, the number of carbons in each $R^1$ is from 13 to 21; and
(ii) a soil-weakening enzyme comprising a bacterial nuclease enzyme, wherein the bacterial nuclease enzyme is from a *Bacillus* species selected from the group consisting of *Bacillus* sp-62451, *Bacillus horikoshii*, *Bacillus* sp-62520, *Bacillus* sp-16840, *Bacillus* sp-62668, *Bacillus* sp-13395, *Bacillus horneckiae*, *Bacillus* sp-11238, *Bacillus cibi*, *Bacillus* sp-18318, *Bacillus idriensis*, *Bacillus algicola*, *Bacillus vietnamensis*, *Bacillus hwajinpoensis*, *Bacillus indicus*, *Bacillus marisflavi*, *Bacillus luciferensis*, *Bacillus* sp. SA2-6, *Bacillus* sp-62738, *Bacillus pumilus*, *Bacillus* sp-62490, *Bacillus* sp-13390, *Bacillus* sp-62738, *Bacillus* sp-62599, *Bacillus akibai*, bacterial nucleases.

2. A fabric softener composition according to claim 1 further comprising a galactanase enzyme having at least 90% identity with the amino acid sequence shown in any of the amino acid sequences SEQ ID NO:108, SEQ ID NO:109 and SEQ ID NO:110.

3. A fabric softener composition according to claim 1 wherein the enzyme further comprises a mannanase enzyme having at least 90% sequence identity with the amino acid sequence shown in any of the amino acid sequences SEQ ID NO:111, SEQ ID 112, SEQ ID NO:113, SEQ ID NO:114 and SEQ ID NO:115.

4. A method of treating a fabric, the method comprising the steps of (i) in a laundering step, treating a fabric with an aqueous wash liquor comprising from 0.1 g/l to 5 g/l of a surfactant; (ii) optionally rinsing the fabric one or two or more times with water; and (iii) in a rinse-treatment step, treating the fabric with an aqueous rinse liquor comprising a fabric softener composition according to claim 1; (iv) optionally rinsing the fabric one or two or more times with water; and (v) drying the fabric.

5. A method according to claim 4 wherein the fabric from rinse-treatment step (iii) is dried after step (iii) with no rinse step (iv).

6. A method according to claim 4 wherein there is no rinse step between steps (i) and (iii).

* * * * *

SEQUENCE LISTING

<160> NUMBER OF SEQ ID NOS: 115

<210> SEQ ID NO 1
<211> LENGTH: 109
<212> TYPE: PRT
<213> ORGANISM: Bacillus licheniformis

<400> SEQUENCE: 1

Ala Arg Tyr Asp Asp Val Leu Tyr Phe Pro Ala Ser Arg Tyr Pro Glu
1               5                   10                  15

Thr Gly Ala His Ile Ser Asp Ala Ile Lys Ala Gly His Ala Asp Val
            20                  25                  30

Cys Thr Ile Glu Arg Ser Gly Ala Asp Lys Arg Arg Gln Glu Ser Leu
        35                  40                  45

Lys Gly Ile Pro Thr Lys Pro Gly Phe Asp Arg Asp Glu Trp Pro Met
    50                  55                  60

Ala Met Cys Glu Glu Gly Gly Lys Gly Ala Ser Val Arg Tyr Val Ser
65                  70                  75                  80

Ser Ser Asp Asn Arg Gly Ala Gly Ser Trp Val Gly Asn Arg Leu Asn
                85                  90                  95

Gly Tyr Ala Asp Gly Thr Arg Ile Leu Phe Ile Val Gln
            100                 105

<210> SEQ ID NO 2
<211> LENGTH: 109
<212> TYPE: PRT
<213> ORGANISM: Bacillus subtilis

<400> SEQUENCE: 2

Ala Ser Ser Tyr Asp Lys Val Leu Tyr Phe Pro Leu Ser Arg Tyr Pro
1               5                   10                  15

Glu Thr Gly Ser His Ile Arg Asp Ala Ile Ala Glu Gly His Pro Asp
            20                  25                  30

Ile Cys Thr Ile Asp Asp Gly Ala Asp Lys Arg Arg Glu Glu Ser Leu
        35                  40                  45

Lys Gly Ile Pro Thr Lys Pro Gly Tyr Asp Arg Asp Glu Trp Pro Met
    50                  55                  60

Ala Val Cys Glu Glu Gly Gly Ala Gly Ala Asp Val Arg Tyr Val Thr
65                  70                  75                  80

Pro Ser Asp Asn Arg Gly Ala Gly Ser Trp Val Gly Asn Gln Met Ser
                85                  90                  95

Ser Tyr Pro Asp Gly Thr Arg Val Leu Phe Ile Val Gln
            100                 105

<210> SEQ ID NO 3
<211> LENGTH: 109
<212> TYPE: PRT
<213> ORGANISM: Bacillus licheniformis

<400> SEQUENCE: 3

Ala Arg Tyr Asp Asp Ile Leu Tyr Phe Pro Ala Ser Arg Tyr Pro Glu
1               5                   10                  15

Thr Gly Ala His Ile Ser Asp Ala Ile Lys Ala Gly His Ser Asp Val
            20                  25                  30

Cys Thr Ile Glu Arg Ser Gly Ala Asp Lys Arg Arg Gln Glu Ser Leu
        35                  40                  45

Lys Gly Ile Pro Thr Lys Pro Gly Phe Asp Arg Asp Glu Trp Pro Met
    50                  55                  60

```
Ala Met Cys Glu Glu Gly Gly Lys Gly Ala Ser Val Arg Tyr Val Ser
 65                  70                  75                  80

Ser Ser Asp Asn Arg Gly Ala Gly Ser Trp Val Gly Asn Arg Leu Ser
                 85                  90                  95

Gly Phe Ala Asp Gly Thr Arg Ile Leu Phe Ile Val Gln
            100                 105

<210> SEQ ID NO 4
<211> LENGTH: 245
<212> TYPE: PRT
<213> ORGANISM: Serratia marcescens

<400> SEQUENCE: 4

Asp Thr Leu Glu Ser Ile Asp Asn Cys Ala Val Gly Cys Pro Thr Gly
 1               5                  10                  15

Gly Ser Ser Asn Val Ser Ile Val Arg His Ala Tyr Thr Leu Asn Asn
             20                  25                  30

Asn Ser Thr Thr Lys Phe Ala Asn Trp Val Ala Tyr His Ile Thr Lys
         35                  40                  45

Asp Thr Pro Ala Ser Gly Lys Thr Arg Asn Trp Lys Thr Asp Pro Ala
     50                  55                  60

Leu Asn Pro Ala Asp Thr Leu Ala Pro Ala Asp Tyr Thr Gly Ala Asn
 65                  70                  75                  80

Ala Ala Leu Lys Val Asp Arg Gly His Gln Ala Pro Leu Ala Ser Leu
                 85                  90                  95

Ala Gly Val Ser Asp Trp Glu Ser Leu Asn Tyr Leu Ser Asn Ile Thr
            100                 105                 110

Pro Gln Lys Ser Asp Leu Asn Gln Gly Ala Trp Ala Arg Leu Glu Asp
        115                 120                 125

Gln Glu Arg Lys Leu Ile Asp Arg Ala Asp Ile Ser Ser Val Tyr Thr
    130                 135                 140

Val Thr Gly Pro Leu Tyr Glu Arg Asp Met Gly Lys Leu Pro Gly Thr
145                 150                 155                 160

Gln Lys Ala His Thr Ile Pro Ser Ala Tyr Trp Lys Val Ile Phe Ile
                165                 170                 175

Asn Asn Ser Pro Ala Val Asn His Tyr Ala Ala Phe Leu Phe Asp Gln
            180                 185                 190

Asn Thr Pro Lys Gly Ala Asp Phe Cys Gln Phe Arg Val Thr Val Asp
        195                 200                 205

Glu Ile Glu Lys Arg Thr Gly Leu Ile Ile Trp Ala Gly Leu Pro Asp
    210                 215                 220

Asp Val Gln Ala Ser Leu Lys Ser Lys Pro Gly Val Leu Pro Glu Leu
225                 230                 235                 240

Met Gly Cys Lys Asn
                245

<210> SEQ ID NO 5
<211> LENGTH: 182
<212> TYPE: PRT
<213> ORGANISM: Bacillus sp. 62451

<400> SEQUENCE: 5

Leu Pro Pro Asp Leu Pro Ser Lys Ser Thr Thr Gln Ala Gln Leu Asn
 1               5                  10                  15

Ser Leu Asn Val Lys Asn Glu Glu Ser Met Ser Gly Tyr Ser Arg Glu
             20                  25                  30
```

```
Lys Phe Pro His Trp Ile Ser Gln Gly Asp Gly Cys Asp Thr Arg Gln
            35                  40                  45

Val Ile Leu Lys Arg Asp Ala Asp Asn Tyr Ser Gly Asn Cys Pro Val
 50                  55                  60

Thr Ser Gly Lys Trp Tyr Ser Tyr Tyr Asp Gly Ile Thr Phe Asn Asp
 65                  70                  75                  80

Pro Ser Gln Leu Asp Ile Asp His Val Val Pro Leu Ala Glu Ala Trp
                85                  90                  95

Arg Ser Gly Ala Ser Ser Trp Ser Thr Ala Lys Arg Glu Asp Phe Ala
            100                 105                 110

Asn Asp Leu Asn Gly Pro Gln Leu Ile Ala Val Ser Ala Ser Ser Asn
            115                 120                 125

Arg Ser Lys Gly Asp Gln Asp Pro Ser Thr Trp Gln Pro Pro Arg Ala
130                 135                 140

Gly Ala Asn Cys Ala Tyr Ala Lys Met Trp Ile Asn Thr Lys Tyr Asn
145                 150                 155                 160

Trp Gly Leu His Leu Gln Ser Ser Glu Lys Thr Ala Leu Gln Gly Met
                165                 170                 175

Leu Asn Ser Cys Ser Tyr
            180

<210> SEQ ID NO 6
<211> LENGTH: 182
<212> TYPE: PRT
<213> ORGANISM: Bacillus horikoshii

<400> SEQUENCE: 6

Leu Pro Pro Gly Thr Pro Thr Lys Ser Glu Ala Gln Asn Gln Leu Asn
1               5                   10                  15

Ser Leu Thr Val Lys Ser Glu Gly Ser Met Thr Gly Tyr Ser Arg Asp
            20                  25                  30

Leu Phe Pro His Trp Ser Gly Gln Gly Asn Gly Cys Asp Thr Arg Gln
            35                  40                  45

Ile Val Leu Gln Arg Asp Ala Asp Tyr Tyr Thr Gly Thr Cys Pro Thr
 50                  55                  60

Thr Ser Gly Lys Trp Tyr Ser Tyr Phe Asp Gly Val Ile Val Tyr Ser
 65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Gln Arg Arg Ala Phe Ala
            100                 105                 110

Asn Asp Leu Asn Gly Pro Gln Leu Ile Ala Val Thr Ala Ser Val Asn
            115                 120                 125

Arg Ser Lys Gly Asp Gln Asp Pro Ser Thr Trp Gln Pro Pro Arg Ala
130                 135                 140

Gly Ala Arg Cys Ala Tyr Ala Lys Trp Trp Ile Asn Thr Lys His Arg
145                 150                 155                 160

Trp Asn Leu His Leu Gln Ser Ser Glu Lys Ser Ser Leu Gln Thr Met
                165                 170                 175

Leu Asn Gly Cys Ala Tyr
            180

<210> SEQ ID NO 7
<211> LENGTH: 180
<212> TYPE: PRT
```

-continued

<213> ORGANISM: Paenibacillus sp. 18057

<400> SEQUENCE: 7

```
Gln Lys Pro Leu Ala Asp Ala Pro Arg Gln Thr Glu His Asp Asp Tyr
1               5                   10                  15

Asp Tyr Glu Leu Ile Phe Pro Ser Asp Asp Tyr Pro Glu Thr Ala Leu
            20                  25                  30

His Ile Leu Gly Ala Ile Glu Gln Gly Tyr Ser Asp Val Cys Thr Ile
        35                  40                  45

Asp Arg Gly Gly Ala Glu Glu Asn Arg Lys Gln Ser Leu Ala Gly Ile
    50                  55                  60

Glu Thr Arg Ser Gly Tyr Asp Arg Asp Glu Trp Pro Met Ala Met Cys
65                  70                  75                  80

Glu Glu Gly Gly Ala Gly Ala Ser Val Ala Tyr Ile Asp Ala Ser Asp
                85                  90                  95

Asn Arg Gly Ala Gly Ser Trp Val Gly His Gln Leu Ser Ala Tyr Glu
            100                 105                 110

Asp Gly Thr Lys Ile Leu Phe Ile Val Glu Lys Pro Lys Val Leu Phe
        115                 120                 125

Pro Asn Gln Pro Ala Thr Ala Ala Pro Ala Gly Asn Asn Glu Val Arg
    130                 135                 140

Tyr Pro Asn Cys Ala Ala Val Arg Glu Ala Gly Lys Ala Pro Leu Arg
145                 150                 155                 160

Lys Gly Asp Pro Gly Tyr Ser Ala Lys Leu Asp Arg Asp Gly Asp Gly
                165                 170                 175

Val Ala Cys Glu
            180
```

<210> SEQ ID NO 8
<211> LENGTH: 182
<212> TYPE: PRT
<213> ORGANISM: Bacillus sp. 62520

<400> SEQUENCE: 8

```
Leu Pro Pro Gly Thr Pro Ser Lys Ser Glu Ala Gln Ser Gln Leu Asn
1               5                   10                  15

Ala Leu Thr Val Lys Pro Glu Asp Pro Met Thr Gly Tyr Ser Arg Asp
            20                  25                  30

His Phe Pro His Trp Ile Ser Gln Gly Asn Gly Cys Asn Thr Arg Gln
        35                  40                  45

Ile Val Leu Gln Arg Asp Ala Asp Tyr Tyr Ser Gly Ala Cys Pro Val
    50                  55                  60

Thr Thr Gly Lys Trp Tyr Ser Tyr Phe Asp Gly Val Ile Val Tyr Ser
65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Lys Arg Arg Ser Phe Ala
            100                 105                 110

Asn Asp Leu Asn Gly Pro Gln Leu Ile Ala Val Thr Ala Ser Val Asn
        115                 120                 125

Arg Ser Lys Gly Asp Gln Asp Pro Ser Thr Trp Gln Pro Pro Arg Ala
    130                 135                 140

Gly Ala Arg Cys Ala Tyr Ala Lys Trp Trp Ile Asn Thr Lys His Arg
145                 150                 155                 160

Trp Gly Leu His Leu Gln Ser Ser Glu Lys Ser Ser Leu Gln Ser Met
```

Leu Asn Gly Cys Ala Tyr
            180

<210> SEQ ID NO 9
<211> LENGTH: 182
<212> TYPE: PRT
<213> ORGANISM: Bacillus sp. 62520

<400> SEQUENCE: 9

Leu Pro Pro Gly Thr Pro Ser Lys Ser Glu Ala Gln Ser Gln Leu Asn
1               5                   10                  15

Ala Leu Thr Val Lys Pro Glu Asp Pro Met Thr Gly Tyr Ser Arg Asp
            20                  25                  30

His Phe Pro His Trp Ile Ser Gln Gly Asn Gly Cys Asn Thr Arg Gln
        35                  40                  45

Ile Val Leu Gln Arg Asp Ala Asp Tyr Tyr Ser Gly Ala Cys Pro Val
    50                  55                  60

Thr Thr Gly Lys Trp Tyr Ser Tyr Phe Asp Gly Val Ile Val Tyr Ser
65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Gln Arg Arg Ser Phe Ala
            100                 105                 110

Asn Asp Leu Asn Gly Pro Gln Leu Ile Ala Val Thr Ala Ser Val Asn
        115                 120                 125

Arg Ser Lys Gly Asp Gln Asp Pro Ser Thr Trp Gln Pro Pro Arg Ala
    130                 135                 140

Gly Ala Arg Cys Ala Tyr Ala Lys Trp Trp Ile Asn Thr Lys His Arg
145                 150                 155                 160

Trp Gly Leu His Leu Gln Ser Ser Glu Lys Ser Ser Leu Gln Ser Met
                165                 170                 175

Leu Asn Gly Cys Ala Tyr
            180

<210> SEQ ID NO 10
<211> LENGTH: 182
<212> TYPE: PRT
<213> ORGANISM: Bacillus horikoshii

<400> SEQUENCE: 10

Leu Pro Pro Gly Thr Pro Ser Lys Ser Glu Ala Gln Ser Gln Leu Asn
1               5                   10                  15

Ser Leu Thr Val Lys Ser Glu Asp Pro Met Thr Gly Tyr Ser Arg Asp
            20                  25                  30

His Phe Pro His Trp Ser Gly Gln Gly Asn Gly Cys Asp Thr Arg Gln
        35                  40                  45

Ile Val Leu Gln Arg Asp Ala Asp Tyr Tyr Ser Gly Asn Cys Pro Val
    50                  55                  60

Thr Ser Gly Lys Trp Tyr Ser Tyr Phe Asp Gly Val Ile Val Tyr Ser
65                  70                  75                  80

Pro Ser Glu Ile Asp Ile Asp His Val Val Pro Leu Ala Glu Ala Trp
                85                  90                  95

Arg Ser Gly Ala Ser Ser Trp Thr Thr Glu Gln Arg Arg Ser Phe Ala
            100                 105                 110

Asn Asp Leu Asn Gly Pro Gln Leu Ile Ala Val Thr Ala Ser Val Asn

```
            115                 120                 125
Arg Ser Lys Gly Asp Gln Asp Pro Ser Thr Trp Gln Pro Pro Arg Ala
        130                 135                 140

Gly Ala Arg Cys Ala Tyr Ala Lys Trp Trp Ile Asn Thr Lys His Arg
145                 150                 155                 160

Trp Asn Leu His Leu Gln Ser Ser Glu Lys Ser Ala Leu Gln Thr Met
                165                 170                 175

Leu Asn Gly Cys Val Tyr
            180

<210> SEQ ID NO 11
<211> LENGTH: 182
<212> TYPE: PRT
<213> ORGANISM: Bacillus horikoshii

<400> SEQUENCE: 11

Leu Pro Pro Gly Thr Pro Ser Lys Ser Glu Ala Gln Ser Gln Leu Asn
1               5                   10                  15

Ser Leu Thr Val Lys Thr Glu Asp Pro Met Thr Gly Tyr Ser Arg Asp
            20                  25                  30

Leu Phe Pro His Trp Ser Gly Gln Gly Ser Gly Cys Asp Thr Arg Gln
        35                  40                  45

Ile Val Leu Gln Arg Asp Ala Asp Tyr Phe Thr Gly Thr Cys Pro Thr
    50                  55                  60

Thr Ser Gly Lys Trp Tyr Ser Tyr Phe Asp Gly Val Ile Val Tyr Ser
65                  70                  75                  80

Pro Ser Glu Ile Asp Val Asp His Ile Val Pro Leu Ala Glu Ala Trp
                85                  90                  95

Arg Ser Gly Ala Ser Ser Trp Thr Thr Glu Gln Arg Arg Ala Phe Ala
            100                 105                 110

Asn Asp Leu Thr Gly Pro Gln Leu Ile Ala Val Thr Ala Ser Val Asn
        115                 120                 125

Arg Ser Lys Gly Asp Gln Asp Pro Ser Thr Trp Gln Pro Pro Arg Ala
    130                 135                 140

Gly Ala Arg Cys Ala Tyr Ala Lys Trp Trp Ile Asn Thr Lys His Arg
145                 150                 155                 160

Trp Asn Leu His Leu Gln Ser Ser Glu Lys Ser Ser Leu Gln Thr Met
                165                 170                 175

Leu Asn Gly Cys Ala Tyr
            180

<210> SEQ ID NO 12
<211> LENGTH: 182
<212> TYPE: PRT
<213> ORGANISM: Bacillus sp. 16840

<400> SEQUENCE: 12

Leu Pro Pro Gly Thr Pro Ser Lys Ser Glu Ala Gln Ser Gln Leu Asn
1               5                   10                  15

Ala Leu Thr Val Lys Ala Glu Asp Pro Met Thr Gly Tyr Ser Arg Asn
            20                  25                  30

Leu Phe Pro His Trp Asn Ser Gln Gly Asn Gly Cys Asn Thr Arg Gln
        35                  40                  45

Leu Val Leu Gln Arg Asp Ala Asp Tyr Tyr Ser Gly Asn Cys Pro Val
    50                  55                  60

Thr Ser Gly Arg Trp Tyr Ser Tyr Phe Asp Gly Val Val Val Thr Ser
```

```
            65                  70                  75                  80
Pro Ser Glu Ile Asp Ile Asp His Ile Val Pro Leu Ala Glu Ala Trp
                85                  90                  95

Arg Ser Gly Ala Ser Ser Trp Thr Thr Glu Lys Arg Lys Glu Phe Ala
            100                 105                 110

Asn Asp Leu Asn Gly Pro Gln Leu Ile Ala Val Thr Ala Ser Val Asn
            115                 120                 125

Arg Ser Lys Gly Asp Gln Asp Pro Ser Thr Trp Gln Pro Pro Arg Ala
            130                 135                 140

Ala Ala Arg Cys Gly Tyr Ala Lys Trp Trp Ile Asn Thr Lys Tyr Arg
145                 150                 155                 160

Trp Asp Leu Ser Leu Gln Ser Ser Glu Lys Ser Ser Leu Gln Thr Met
                165                 170                 175

Leu Asn Thr Cys Ser Tyr
            180

<210> SEQ ID NO 13
<211> LENGTH: 182
<212> TYPE: PRT
<213> ORGANISM: Bacillus sp. 16840

<400> SEQUENCE: 13

Leu Pro Pro Gly Thr Pro Ser Lys Ser Gln Ala Gln Ser Gln Leu Asn
1               5                   10                  15

Ala Leu Thr Val Lys Ala Glu Asp Pro Met Thr Gly Tyr Ser Arg Asn
            20                  25                  30

Leu Phe Pro His Trp Ser Ser Gln Gly Asn Gly Cys Asn Thr Arg Gln
        35                  40                  45

Leu Val Leu Gln Arg Asp Ala Asp Tyr Tyr Ser Gly Asn Cys Pro Val
    50                  55                  60

Thr Ser Gly Arg Trp Tyr Ser Tyr Phe Asp Gly Val Val Val Thr Ser
65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Lys Arg Lys Glu Phe Ala
            100                 105                 110

Asn Asp Leu Asn Gly Pro Gln Leu Ile Ala Val Thr Ala Ser Val Asn
            115                 120                 125

Arg Ser Lys Gly Asp Gln Asp Pro Ser Thr Trp Gln Pro Pro Arg Val
            130                 135                 140

Ala Ala Arg Cys Gly Tyr Ala Lys Trp Trp Ile Asn Thr Lys Tyr Arg
145                 150                 155                 160

Trp Asp Leu Ser Leu Gln Ser Ser Glu Lys Ser Ser Leu Gln Thr Met
                165                 170                 175

Leu Asn Thr Cys Ser Tyr
            180

<210> SEQ ID NO 14
<211> LENGTH: 182
<212> TYPE: PRT
<213> ORGANISM: Bacillus sp. 62668

<400> SEQUENCE: 14

Leu Pro Pro Gly Thr Pro Ser Lys Ser Glu Ala Gln Ser Gln Leu Thr
1               5                   10                  15

Ser Leu Thr Val Lys Pro Glu Asp Pro Met Thr Gly Tyr Ser Arg Asp
```

```
                20                  25                  30
His Phe Pro His Trp Ile Ser Gln Gly Asn Gly Cys Asn Thr Arg Gln
            35                  40                  45
Ile Val Leu Gln Arg Asp Ala Asp Tyr Tyr Ser Gly Asn Cys Pro Val
 50                  55                  60
Thr Thr Gly Lys Trp Tyr Ser Tyr Phe Asp Gly Val Ile Val Tyr Ser
 65                  70                  75                  80
Pro Ser Glu Ile Asp Ile Asp His Ile Val Pro Leu Ala Glu Ala Trp
                85                  90                  95
Arg Ser Gly Ala Ser Ser Trp Thr Ala Glu Gln Arg Arg Asn Phe Ala
            100                 105                 110
Asn Asp Leu Asn Gly Pro Gln Leu Ile Ala Val Thr Ala Ser Val Asn
            115                 120                 125
Arg Ser Lys Gly Asp Gln Asp Pro Ser Thr Trp Gln Pro Pro Arg Thr
            130                 135                 140
Gly Ala Arg Cys Ala Tyr Ala Lys Trp Trp Ile Asn Thr Lys Tyr Arg
145                 150                 155                 160
Trp Gly Leu His Leu Gln Ser Ser Glu Lys Ser Ser Leu Gln Ser Met
                165                 170                 175
Leu Asn Gly Cys Ala Tyr
            180

<210> SEQ ID NO 15
<211> LENGTH: 185
<212> TYPE: PRT
<213> ORGANISM: Bacillus sp. 13395

<400> SEQUENCE: 15

Ala Ser Ala Phe Pro Pro Gly Thr Pro Ser Lys Ser Thr Ala Gln Ser
 1               5                  10                  15
Gln Leu Asn Ser Leu Pro Val Lys Ser Glu Gly Ser Met Asn Gly Tyr
            20                  25                  30
Ser Arg Asp Lys Phe Pro His Trp Ile Ser Gln Gly Asp Gly Cys Asp
            35                  40                  45
Thr Arg Gln Leu Val Leu Lys Arg Asp Gly Asp Tyr Tyr Ser Gly Ser
 50                  55                  60
Cys Pro Val Thr Ser Gly Lys Trp Tyr Ser Tyr Tyr Asp Gly Ile Thr
 65                  70                  75                  80
Val Tyr Ser Pro Ser Glu Ile Asp Ile Asp His Ile Val Pro Leu Ala
                85                  90                  95
Glu Ala Trp Arg Ser Gly Ala Ser Gly Trp Thr Thr Glu Lys Arg Gln
            100                 105                 110
Ser Phe Ala Asn Asp Leu Asn Gly Pro Gln Leu Ile Ala Val Thr Ala
            115                 120                 125
Ser Val Asn Arg Ser Lys Gly Asp Gln Asp Pro Ser Thr Trp Gln Pro
            130                 135                 140
Pro Arg Ser Gly Ser His Cys Ala Tyr Ala Lys Met Trp Val Asn Thr
145                 150                 155                 160
Lys Tyr Arg Trp Gly Leu His Leu Gln Ser Ala Glu Lys Ser Ala Leu
                165                 170                 175
Gln Ser Met Leu Asn Ala Cys Ser Tyr
            180                 185

<210> SEQ ID NO 16
<211> LENGTH: 185
```

<212> TYPE: PRT
<213> ORGANISM: Bacillus horneckiae

<400> SEQUENCE: 16

Ala Ser Ala Phe Pro Pro Gly Thr Pro Ser Lys Ser Thr Ala Gln Ser
1               5                   10                  15

Gln Leu Asn Ser Leu Thr Val Lys Ser Glu Gly Ser Met Thr Gly Tyr
            20                  25                  30

Ser Arg Asp Lys Phe Pro His Trp Ile Ser Gln Gly Asp Gly Cys Asp
        35                  40                  45

Thr Arg Gln Leu Val Leu Lys Arg Asp Gly Asp Tyr Tyr Ser Gly Asn
    50                  55                  60

Cys Pro Val Thr Ser Gly Lys Trp Tyr Ser Tyr Asp Gly Ile Thr
65                  70                  75                  80

Val Tyr Ser Pro Ser Glu Ile Asp Ile Asp His Ile Val Pro Leu Ala
                85                  90                  95

Glu Ala Trp Arg Ser Gly Ala Ser Gly Trp Thr Thr Glu Lys Arg Gln
            100                 105                 110

Ser Phe Ala Asn Asp Leu Asn Gly Pro Gln Leu Ile Ala Val Thr Ala
        115                 120                 125

Ser Val Asn Arg Ser Lys Gly Asp Gln Asp Pro Ser Thr Trp Gln Pro
    130                 135                 140

Pro Arg Ser Gly Ser His Cys Ala Tyr Ala Lys Met Trp Val Asn Thr
145                 150                 155                 160

Lys Tyr Arg Trp Gly Leu His Val Gln Ser Ala Glu Lys Ser Ala Leu
                165                 170                 175

Gln Ser Met Leu Asn Ala Cys Ser Tyr
            180                 185

<210> SEQ ID NO 17
<211> LENGTH: 182
<212> TYPE: PRT
<213> ORGANISM: Bacillus sp. 11238

<400> SEQUENCE: 17

Phe Pro Pro Glu Ile Pro Ser Lys Ser Thr Ala Gln Ser Gln Leu Asn
1               5                   10                  15

Ser Leu Thr Val Lys Ser Glu Asp Ala Met Thr Gly Tyr Ser Arg Asp
            20                  25                  30

Lys Phe Pro His Trp Ile Ser Gln Gly Asp Gly Cys Asp Thr Arg Gln
        35                  40                  45

Met Val Leu Lys Arg Asp Ala Asp Tyr Tyr Ser Gly Ser Cys Pro Val
    50                  55                  60

Thr Ser Gly Lys Trp Tyr Ser Tyr Tyr Asp Gly Ile Thr Val Tyr Ser
65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Lys Arg Arg Asn Phe Ala
            100                 105                 110

Asn Asp Leu Asn Gly Pro Gln Leu Ile Ala Val Thr Ala Ser Val Asn
        115                 120                 125

Arg Ser Lys Gly Asp Gln Asp Pro Ser Thr Trp Gln Pro Pro Arg Ser
    130                 135                 140

Gly Ala Arg Cys Ala Tyr Ala Lys Met Trp Val Asn Thr Lys Tyr Arg
145                 150                 155                 160

```
Trp Gly Leu His Leu Gln Ser Ala Glu Lys Ser Gly Leu Glu Ser Met
            165                 170                 175

Leu Asn Thr Cys Ser Tyr
            180

<210> SEQ ID NO 18
<211> LENGTH: 182
<212> TYPE: PRT
<213> ORGANISM: Bacillus cibi

<400> SEQUENCE: 18

Thr Pro Pro Gly Thr Pro Ser Lys Ser Ala Gln Ser Gln Leu Asn
1               5                  10                  15

Ala Leu Thr Val Lys Thr Glu Gly Ser Met Ser Gly Tyr Ser Arg Asp
            20                  25                  30

Leu Phe Pro His Trp Ile Ser Gln Gly Ser Gly Cys Asp Thr Arg Gln
            35                  40                  45

Val Val Leu Lys Arg Asp Ala Asp Ser Tyr Ser Gly Asn Cys Pro Val
        50                  55                  60

Thr Ser Gly Ser Trp Tyr Ser Tyr Tyr Asp Gly Val Thr Phe Thr Asn
65                  70                  75                  80

Pro Ser Asp Leu Asp Ile Asp His Ile Val Pro Leu Ala Glu Ala Trp
                85                  90                  95

Arg Ser Gly Ala Ser Ser Trp Thr Thr Ser Lys Arg Gln Asp Phe Ala
            100                 105                 110

Asn Asp Leu Ser Gly Pro Gln Leu Ile Ala Val Ser Ala Ser Thr Asn
        115                 120                 125

Arg Ser Lys Gly Asp Gln Asp Pro Ser Thr Trp Gln Pro Pro Arg Ser
    130                 135                 140

Gly Ala Ala Cys Gly Tyr Ser Lys Trp Trp Ile Ser Thr Lys Tyr Lys
145                 150                 155                 160

Trp Gly Leu Ser Leu Gln Ser Ser Glu Lys Thr Ala Leu Gln Gly Met
                165                 170                 175

Leu Asn Ser Cys Ser Tyr
            180

<210> SEQ ID NO 19
<211> LENGTH: 182
<212> TYPE: PRT
<213> ORGANISM: Bacillus sp. 18318

<400> SEQUENCE: 19

Phe Pro Pro Gly Thr Pro Ser Lys Ser Thr Ala Gln Ser Gln Leu Asn
1               5                  10                  15

Ser Leu Thr Val Lys Ser Glu Gly Ser Met Thr Gly Tyr Ser Arg Asp
            20                  25                  30

Lys Phe Pro His Trp Ile Gly Gln Gly Ser Gly Cys Asp Thr Arg Gln
            35                  40                  45

Leu Val Leu Gln Arg Asp Ala Asp Tyr Tyr Ser Gly Ser Cys Pro Val
        50                  55                  60

Thr Ser Gly Lys Trp Tyr Ser Tyr Tyr Asp Gly Val Thr Phe Tyr Asp
65                  70                  75                  80

Pro Ser Asp Leu Asp Ile Asp His Val Val Pro Leu Ala Glu Ala Trp
                85                  90                  95

Arg Ser Gly Ala Ser Ser Trp Ser Thr Gln Lys Arg Lys Asp Phe Ala
            100                 105                 110
```

```
Asn Asp Leu Ser Gly Pro Gln Leu Ile Ala Val Ser Ala Ser Ser Asn
            115                 120                 125

Arg Ser Lys Gly Asp Gln Asp Pro Ser Thr Trp Gln Pro Thr Arg Ser
        130                 135                 140

Gly Ala Ala Cys Gly Tyr Ser Lys Trp Trp Ile Ser Thr Lys His Lys
145                 150                 155                 160

Trp Gly Leu Ser Leu Gln Ser Ser Glu Lys Asn Ala Leu Gln Gly Met
                165                 170                 175

Leu Asn Ser Cys Val Tyr
            180

<210> SEQ ID NO 20
<211> LENGTH: 182
<212> TYPE: PRT
<213> ORGANISM: Bacillus idriensis

<400> SEQUENCE: 20

Leu Pro Pro Gly Thr Pro Ser Lys Ser Thr Ala Gln Ser Gln Leu Asn
1               5                   10                  15

Ala Leu Thr Val Gln Thr Glu Gly Ser Met Thr Gly Tyr Ser Arg Asp
            20                  25                  30

Lys Phe Pro His Trp Ile Ser Gln Gly Asn Gly Cys Asp Thr Arg Gln
        35                  40                  45

Val Val Leu Gln Arg Asp Ala Asp Tyr Tyr Ser Gly Thr Cys Pro Val
    50                  55                  60

Thr Ser Gly Lys Trp Tyr Ser Tyr Tyr Asp Gly Val Thr Leu Tyr Asn
65                  70                  75                  80

Pro Ser Asp Leu Asp Ile Asp His Val Val Ala Leu Ala Glu Ala Trp
                85                  90                  95

Arg Ser Gly Ala Ser Ser Trp Thr Thr Asp Lys Arg Glu Asp Phe Ala
            100                 105                 110

Asn Asp Leu Ser Gly Thr Gln Leu Ile Ala Val Ser Ala Ser Thr Asn
            115                 120                 125

Arg Ser Lys Gly Asp Gln Asp Pro Ser Thr Trp Gln Pro Pro Arg Ser
        130                 135                 140

Gly Ala Ala Cys Gly Tyr Ala Lys Trp Trp Ile Ser Thr Lys Tyr Lys
145                 150                 155                 160

Trp Asn Leu Asn Leu Gln Ser Ser Glu Lys Thr Ala Leu Gln Ser Met
                165                 170                 175

Leu Asn Ser Cys Ser Tyr
            180

<210> SEQ ID NO 21
<211> LENGTH: 182
<212> TYPE: PRT
<213> ORGANISM: Bacillus algicola

<400> SEQUENCE: 21

Phe Pro Pro Gly Thr Pro Ser Lys Ser Glu Ala Gln Ser Gln Leu Asn
1               5                   10                  15

Ser Leu Thr Val Gln Ser Glu Gly Ser Met Ser Gly Tyr Ser Arg Asp
            20                  25                  30

Lys Phe Pro His Trp Ile Gly Gln Gly Asn Gly Cys Asp Thr Arg Gln
        35                  40                  45

Leu Val Leu Gln Arg Asp Ala Asp Tyr Tyr Ser Gly Asp Cys Pro Val
    50                  55                  60
```

```
Thr Ser Gly Lys Trp Tyr Ser Tyr Phe Asp Gly Val Thr Val Tyr Asp
 65                  70                  75                  80

Pro Ser Asp Leu Asp Ile Asp His Met Val Pro Met Ala Glu Ala Trp
                 85                  90                  95

Arg Ser Gly Ala Ser Ser Trp Ser Thr Gln Lys Arg Glu Asp Phe Ala
            100                 105                 110

Asn Asp Leu Ser Gly Pro His Leu Ile Ala Val Thr Ala Ser Ser Asn
        115                 120                 125

Arg Ser Lys Gly Asp Gln Asp Pro Ser Thr Trp Lys Pro Thr Arg Tyr
    130                 135                 140

Gly Ala His Cys Gly Tyr Ala Lys Trp Trp Ile Asn Thr Lys Tyr Val
145                 150                 155                 160

Tyr Asp Leu Thr Leu Gln Ser Ser Glu Lys Thr Glu Leu Gln Ser Met
                165                 170                 175

Leu Asn Thr Cys Ser Tyr
            180
```

```
<210> SEQ ID NO 22
<211> LENGTH: 182
<212> TYPE: PRT
<213> ORGANISM: Unknown
<220> FEATURE:
<223> OTHER INFORMATION: Xanthan alkaline community J

<400> SEQUENCE: 22

Leu Pro Pro Asn Ile Pro Ser Lys Ala Asp Ala Leu Thr Lys Leu Asn
1               5                   10                  15

Ala Leu Thr Val Gln Thr Glu Gly Pro Met Thr Gly Tyr Ser Arg Asp
                20                  25                  30

Leu Phe Pro His Trp Ser Ser Gln Gly Asn Gly Cys Asn Thr Arg His
            35                  40                  45

Val Val Leu Lys Arg Asp Ala Asp Ser Val Val Asp Thr Cys Pro Val
        50                  55                  60

Thr Thr Gly Arg Trp Tyr Ser Tyr Tyr Asp Gly Leu Val Phe Thr Ser
 65                  70                  75                  80

Ala Ser Asp Ile Asp Ile Asp His Val Val Pro Leu Ala Glu Ala Trp
                 85                  90                  95

Arg Ser Gly Ala Ser Ser Trp Thr Ser Thr Lys Arg Gln Ser Phe Ala
            100                 105                 110

Asn Asp Leu Asn Gly Pro Gln Leu Ile Ala Val Ser Ala Thr Ser Asn
        115                 120                 125

Arg Ser Lys Gly Asp Gln Asp Pro Ser Thr Trp Gln Pro Pro Arg Ala
    130                 135                 140

Gly Ala Arg Cys Ala Tyr Ala Lys Met Trp Val Glu Thr Lys Ser Arg
145                 150                 155                 160

Trp Gly Leu Thr Leu Gln Ser Ser Glu Lys Ala Ala Leu Gln Thr Ala
                165                 170                 175

Ile Asn Ala Cys Ser Tyr
            180
```

```
<210> SEQ ID NO 23
<211> LENGTH: 182
<212> TYPE: PRT
<213> ORGANISM: Bacillus vietnamensis

<400> SEQUENCE: 23

Phe Pro Pro Gly Thr Pro Ser Lys Ser Thr Ala Gln Ser Gln Leu Asn
```

```
            1               5                  10                 15
Ala Leu Thr Val Lys Ser Glu Ser Ser Met Thr Gly Tyr Ser Arg Asp
            20                 25                 30

Lys Phe Pro His Trp Ile Gly Gln Arg Asn Gly Cys Asp Thr Arg Gln
            35                 40                 45

Leu Val Leu Gln Arg Asp Ala Asp Ser Tyr Ser Gly Ser Cys Pro Val
            50                 55                 60

Thr Ser Gly Ser Trp Tyr Ser Tyr Tyr Asp Gly Val Thr Phe Thr Asp
 65                 70                 75                 80

Pro Ser Asp Leu Asp Ile Asp His Val Val Pro Leu Ala Glu Ala Trp
            85                 90                 95

Arg Ser Gly Ala Ser Ser Trp Thr Thr Ala Lys Arg Glu Asp Phe Ala
            100                105                110

Asn Asp Leu Ser Gly Pro Gln Leu Ile Ala Val Ser Ala Ser Ser Asn
            115                120                125

Arg Ser Lys Gly Asp Gln Asp Pro Ser Thr Trp Gln Pro Pro Arg Ser
            130                135                140

Gly Ala Ala Cys Gly Tyr Ser Lys Trp Trp Ile Ser Thr Lys Tyr Lys
145                 150                155                160

Trp Gly Leu Ser Leu Gln Ser Ser Glu Lys Thr Ala Leu Gln Gly Met
            165                170                175

Leu Asn Ser Cys Ile Tyr
            180

<210> SEQ ID NO 24
<211> LENGTH: 182
<212> TYPE: PRT
<213> ORGANISM: Bacillus hwajinpoensis

<400> SEQUENCE: 24

Ile Pro Pro Gly Thr Pro Ser Lys Ser Ala Ala Gln Ser Gln Leu Asp
 1               5                  10                 15

Ser Leu Ala Val Gln Ser Glu Gly Ser Met Ser Gly Tyr Ser Arg Asp
            20                 25                 30

Lys Phe Pro His Trp Ile Gly Gln Gly Asn Gly Cys Asp Thr Arg Gln
            35                 40                 45

Leu Val Leu Gln Arg Asp Ala Asp Tyr Tyr Ser Gly Asp Cys Pro Val
            50                 55                 60

Thr Ser Gly Lys Trp Tyr Ser Tyr Phe Asp Gly Val Gln Val Tyr Asp
 65                 70                 75                 80

Pro Ser Tyr Leu Asp Ile Asp His Met Val Pro Leu Ala Glu Ala Trp
            85                 90                 95

Arg Ser Gly Ala Ser Ser Trp Ser Thr Gln Lys Arg Glu Asp Phe Ala
            100                105                110

Asn Asp Leu Asp Gly Pro His Leu Ile Ala Val Thr Ala Ser Ser Asn
            115                120                125

Arg Ser Lys Gly Asp Gln Asp Pro Ser Thr Trp Lys Pro Thr Arg Tyr
            130                135                140

Ser Ala His Cys Gly Tyr Ala Lys Trp Trp Ile Asn Thr Lys Tyr Val
145                 150                155                160

Tyr Asp Leu Asn Leu Gln Ser Ser Glu Lys Ser Ala Leu Gln Ser Met
            165                170                175

Leu Asn Thr Cys Ser Tyr
            180
```

<210> SEQ ID NO 25
<211> LENGTH: 182
<212> TYPE: PRT
<213> ORGANISM: Paenibacillus mucilaginosus

<400> SEQUENCE: 25

```
Leu Pro Pro Gly Thr Pro Ser Lys Ser Thr Ala Gln Ser Gln Leu Asn
1               5                   10                  15

Ser Leu Thr Val Lys Ser Glu Ser Thr Met Thr Gly Tyr Ser Arg Asp
            20                  25                  30

Lys Phe Pro His Trp Thr Ser Gln Gly Gly Cys Asp Thr Arg Gln
        35                  40                  45

Val Val Leu Lys Arg Asp Ala Asp Tyr Tyr Ser Gly Ser Cys Pro Val
    50                  55                  60

Thr Ser Gly Lys Trp Tyr Ser Tyr Tyr Asp Gly Ile Thr Val Tyr Ser
65                  70                  75                  80

Pro Ser Glu Ile Asp Ile Asp His Ile Val Pro Leu Ala Glu Ala Trp
                85                  90                  95

Arg Ser Gly Ala Ser Ser Trp Thr Thr Glu Lys Arg Gln Asn Phe Ala
            100                 105                 110

Asn Asp Leu Gly Gly Pro Gln Leu Ile Ala Val Thr Ala Ser Ser Asn
        115                 120                 125

Arg Ala Lys Gly Asp Gln Asp Pro Ser Thr Trp Lys Pro Thr Arg Ser
    130                 135                 140

Gly Ala His Cys Ala Tyr Ala Lys Trp Trp Ile Asn Thr Lys Tyr Arg
145                 150                 155                 160

Trp Gly Leu His Leu Gln Ser Ser Glu Lys Thr Ala Leu Gln Ser Met
                165                 170                 175

Leu Asn Thr Cys Ser Tyr
            180
```

<210> SEQ ID NO 26
<211> LENGTH: 182
<212> TYPE: PRT
<213> ORGANISM: Paenibacillus mucilaginosus

<400> SEQUENCE: 26

```
Thr Pro Pro Gly Thr Pro Ser Lys Ser Thr Ala Gln Thr Gln Leu Asn
1               5                   10                  15

Ala Leu Thr Val Lys Thr Glu Gly Ser Met Thr Gly Tyr Ser Arg Asp
            20                  25                  30

Leu Phe Pro His Trp Ile Ser Gln Gly Ser Gly Cys Asp Thr Arg Gln
        35                  40                  45

Val Val Leu Lys Arg Asp Ala Asp Tyr Tyr Ser Gly Ser Cys Pro Val
    50                  55                  60

Thr Ser Gly Lys Trp Tyr Ser Tyr Tyr Asp Gly Val Thr Phe Tyr Asp
65                  70                  75                  80

Pro Ser Asp Leu Asp Ile Asp His Ile Val Pro Leu Ala Glu Ala Trp
                85                  90                  95

Arg Ser Gly Ala Ser Ser Trp Thr Thr Ser Lys Arg Gln Asp Phe Ala
            100                 105                 110

Asn Asp Leu Ser Gly Pro Gln Leu Ile Ala Val Ser Ala Ser Thr Asn
        115                 120                 125

Arg Ser Lys Gly Asp Gln Asp Pro Ser Thr Trp Gln Pro Pro Arg Ala
    130                 135                 140
```

Gly Ala Ala Cys Gly Tyr Ser Lys Trp Trp Ile Ser Thr Lys Tyr Lys
145                 150                 155                 160

Trp Gly Leu Ser Leu Gln Ser Ser Glu Lys Thr Ala Leu Gln Gly Met
            165                 170                 175

Leu Asn Ser Cys Ser Tyr
            180

<210> SEQ ID NO 27
<211> LENGTH: 182
<212> TYPE: PRT
<213> ORGANISM: Bacillus marisflavi

<400> SEQUENCE: 27

Thr Pro Pro Val Thr Pro Ser Lys Ala Thr Ser Gln Ser Gln Leu Asn
1               5                   10                  15

Gly Leu Thr Val Lys Thr Glu Gly Ala Met Thr Gly Tyr Ser Arg Asp
            20                  25                  30

Lys Phe Pro His Trp Ser Ser Gln Gly Gly Cys Asp Thr Arg Gln
        35                  40                  45

Val Val Leu Lys Arg Asp Ala Asp Ser Tyr Ser Gly Asn Cys Pro Val
    50                  55                  60

Thr Ser Gly Ser Trp Tyr Ser Tyr Tyr Asp Gly Val Lys Phe Thr Asn
65                  70                  75                  80

Pro Ser Asp Leu Asp Ile Asp His Ile Val Pro Leu Ala Glu Ala Trp
            85                  90                  95

Arg Ser Gly Ala Ser Ser Trp Thr Thr Ala Gln Arg Glu Ala Phe Ala
            100                 105                 110

Asn Asp Leu Ser Gly Ser Gln Leu Ile Ala Val Ser Ala Ser Ser Asn
            115                 120                 125

Arg Ser Lys Gly Asp Gln Asp Pro Ser Thr Trp Gln Pro Pro Arg Ala
130                 135                 140

Gly Ala Lys Cys Gly Tyr Ala Lys Trp Trp Ile Ser Thr Lys Ser Lys
145                 150                 155                 160

Trp Asn Leu Ser Leu Gln Ser Ser Glu Lys Thr Ala Leu Gln Gly Met
            165                 170                 175

Leu Asn Ser Cys Val Tyr
            180

<210> SEQ ID NO 28
<211> LENGTH: 184
<212> TYPE: PRT
<213> ORGANISM: Bacillus luciferensis

<400> SEQUENCE: 28

Ala Ser Leu Pro Pro Gly Ile Pro Ser Leu Ser Thr Ala Gln Ser Gln
1               5                   10                  15

Leu Asn Ser Leu Thr Val Lys Ser Glu Gly Ser Leu Thr Gly Tyr Ser
            20                  25                  30

Arg Asp Val Phe Pro His Trp Ile Ser Gln Gly Ser Cys Asp Thr
        35                  40                  45

Arg Gln Val Val Leu Lys Arg Asp Ala Asp Tyr Tyr Ser Gly Asn Cys
    50                  55                  60

Pro Val Thr Ser Gly Lys Trp Tyr Ser Tyr Tyr Asp Gly Val Thr Val
65                  70                  75                  80

Tyr Ser Pro Ser Glu Ile Asp Ile Asp His Val Val Pro Leu Ala Glu
            85                  90                  95

```
Ala Trp Arg Ser Gly Ala Ser Ser Trp Thr Thr Glu Lys Arg Gln Asn
                100                 105                 110

Phe Ala Asn Asp Leu Asn Gly Pro Gln Leu Ile Ala Val Thr Ala Ser
            115                 120                 125

Ser Asn Arg Ser Lys Gly Asp Gln Asp Pro Ser Thr Trp Gln Pro Thr
        130                 135                 140

Arg Thr Gly Ala Arg Cys Ala Tyr Ala Lys Met Trp Ile Asn Thr Lys
145                 150                 155                 160

Tyr Arg Trp Gly Leu His Leu Gln Ser Ser Glu Lys Ser Ala Leu Gln
                165                 170                 175

Ser Met Leu Asn Thr Cys Ser Tyr
            180

<210> SEQ ID NO 29
<211> LENGTH: 182
<212> TYPE: PRT
<213> ORGANISM: Bacillus marisflavi

<400> SEQUENCE: 29

Thr Pro Pro Val Thr Pro Ser Lys Glu Thr Ser Gln Ser Gln Leu Asn
1               5                   10                  15

Gly Leu Thr Val Lys Thr Glu Gly Ala Met Thr Gly Tyr Ser Arg Asp
            20                  25                  30

Lys Phe Pro His Trp Ser Ser Gln Gly Gly Cys Asp Thr Arg Gln
        35                  40                  45

Val Val Leu Lys Arg Asp Ala Asp Ser Tyr Ser Gly Asn Cys Pro Val
    50                  55                  60

Thr Ser Gly Ser Trp Tyr Ser Tyr Tyr Asp Gly Val Lys Phe Thr His
65                  70                  75                  80

Pro Ser Asp Leu Asp Ile Asp His Ile Val Pro Leu Ala Glu Ala Trp
                85                  90                  95

Arg Ser Gly Ala Ser Ser Trp Thr Thr Ala Gln Arg Glu Ala Phe Ala
                100                 105                 110

Asn Asp Leu Ser Gly Ser Gln Leu Ile Ala Val Ser Ala Ser Ser Asn
            115                 120                 125

Arg Ser Lys Gly Asp Gln Asp Pro Ser Thr Trp Gln Pro Pro Arg Ala
        130                 135                 140

Gly Ala Lys Cys Gly Tyr Ala Lys Trp Trp Ile Ser Thr Lys Ser Lys
145                 150                 155                 160

Trp Asn Leu Ser Leu Gln Ser Ser Glu Lys Thr Ala Leu Gln Gly Met
                165                 170                 175

Leu Asn Ser Cys Val Tyr
            180

<210> SEQ ID NO 30
<211> LENGTH: 182
<212> TYPE: PRT
<213> ORGANISM: Bacillus sp. SA2-6

<400> SEQUENCE: 30

Leu Pro Ser Gly Ile Pro Ser Lys Ser Thr Ala Gln Ser Gln Leu Asn
1               5                   10                  15

Ser Leu Thr Val Lys Ser Glu Gly Ser Met Thr Gly Tyr Ser Arg Asp
            20                  25                  30

Lys Phe Pro His Trp Ile Ser Gln Gly Gly Gly Cys Asp Thr Arg Gln
        35                  40                  45
```

```
Val Val Leu Lys Arg Asp Ala Asp Tyr Tyr Ser Gly Asn Cys Pro Val
 50                  55                  60
Thr Ser Gly Lys Trp Tyr Ser Tyr Tyr Asp Gly Ile Ser Val Tyr Ser
 65                  70                  75                  80
Pro Ser Glu Ile Asp Ile Asp His Val Val Pro Leu Ala Glu Ala Trp
                 85                  90                  95
Arg Ser Gly Ala Ser Ser Trp Thr Thr Thr Lys Arg Gln Asn Phe Ala
            100                 105                 110
Asn Asp Leu Asn Gly Pro Gln Leu Ile Ala Val Thr Ala Ser Val Asn
        115                 120                 125
Arg Ser Lys Gly Asp Gln Asp Pro Ser Thr Trp Gln Pro Pro Arg Tyr
130                 135                 140
Gly Ala Arg Cys Ala Tyr Ala Lys Met Trp Ile Asn Thr Lys Tyr Arg
145                 150                 155                 160
Trp Asp Leu Asn Leu Gln Ser Ser Glu Lys Ser Ser Leu Gln Ser Met
                165                 170                 175
Leu Asp Thr Cys Ser Tyr
            180
```

<210> SEQ ID NO 31
<211> LENGTH: 191
<212> TYPE: PRT
<213> ORGANISM: Pyrenochaetopsis sp.

<400> SEQUENCE: 31

```
Leu Pro Ser Pro Leu Leu Ile Ala Arg Ser Pro Asn Ile Pro Ser
 1               5                  10                  15
Ala Thr Thr Ala Lys Thr Gln Leu Ala Gly Leu Thr Val Ala Pro Gln
                 20                  25                  30
Gly Pro Gln Thr Gly Tyr Ser Arg Asp Leu Phe Pro His Trp Ile Thr
             35                  40                  45
Gln Ser Gly Thr Cys Asn Thr Arg Glu Val Val Leu Lys Arg Asp Gly
         50                  55                  60
Thr Asn Val Val Thr Asn Ser Ala Cys Ala Ser Thr Ser Gly Ser Trp
 65                  70                  75                  80
Leu Ser Pro Tyr Asp Gly Lys Thr Trp Asp Ser Ala Ser Asp Ile Gln
                 85                  90                  95
Ile Asp His Leu Val Pro Leu Ser Asn Ala Trp Lys Ser Gly Ala Ala
            100                 105                 110
Ala Trp Thr Thr Ala Gln Arg Gln Ala Phe Ala Asn Asp Leu Thr His
        115                 120                 125
Pro Gln Leu Val Ala Val Thr Gly Ser Val Asn Glu Ser Lys Gly Asp
130                 135                 140
Asp Gly Pro Glu Asp Trp Lys Pro Pro Leu Ala Ser Tyr Tyr Cys Thr
145                 150                 155                 160
Tyr Ala Ser Met Trp Thr Ala Val Lys Ser Asn Tyr Lys Leu Thr Ile
                165                 170                 175
Thr Ser Ala Glu Lys Ser Ala Leu Thr Ser Met Leu Ala Thr Cys
            180                 185                 190
```

<210> SEQ ID NO 32
<211> LENGTH: 190
<212> TYPE: PRT
<213> ORGANISM: Vibrissea flavovirens

<400> SEQUENCE: 32

```
Thr Pro Leu Pro Ile Ala Arg Thr Pro Asn Ile Pro Thr Thr
1               5                   10                  15

Ala Thr Ala Lys Ser Gln Leu Ala Ala Leu Thr Val Ala Ala Gly
            20                  25                  30

Pro Gln Thr Gly Tyr Ser Arg Asp Leu Phe Pro Thr Trp Ile Thr Ile
                35                  40                  45

Ser Gly Thr Cys Asn Thr Arg Glu Thr Val Leu Lys Arg Asp Gly Thr
    50                  55                  60

Asn Val Val Asp Ser Ala Cys Val Ala Thr Ser Gly Ser Trp Tyr
65              70                  75                  80

Ser Pro Tyr Asp Gly Ala Thr Trp Thr Ala Ala Ser Asp Val Asp Ile
                85                  90                  95

Asp His Met Val Pro Leu Ser Asn Ala Trp Lys Ser Gly Ala Ser Ala
                100                 105                 110

Trp Thr Thr Ala Gln Arg Gln Thr Phe Ala Asn Asp Leu Thr Asn Pro
                115                 120                 125

Gln Leu Leu Ala Val Thr Asp Asn Val Asn Gln Ala Lys Gly Asp Ser
            130                 135                 140

Gly Pro Glu Asp Trp Lys Pro Ser Leu Thr Ser Tyr Trp Cys Thr Tyr
145                 150                 155                 160

Ala Lys Met Trp Val Lys Val Lys Thr Val Tyr Asp Leu Thr Ile Thr
                165                 170                 175

Ser Ala Glu Lys Thr Ala Leu Thr Thr Met Leu Asn Thr Cys
            180                 185                 190

<210> SEQ ID NO 33
<211> LENGTH: 192
<212> TYPE: PRT
<213> ORGANISM: Setosphaeria rostrata

<400> SEQUENCE: 33

Ala Pro Thr Ser Ser Pro Leu Val Ala Arg Ala Pro Asn Val Pro
1               5                   10                  15

Ser Lys Ala Glu Ala Thr Ser Gln Leu Ala Gly Leu Thr Val Ala Pro
            20                  25                  30

Gln Gly Pro Gln Thr Gly Tyr Ser Arg Asp Leu Phe Pro His Trp Ile
                35                  40                  45

Thr Gln Ser Gly Thr Cys Asn Thr Arg Glu Thr Val Leu Lys Arg Asp
    50                  55                  60

Gly Thr Asn Val Val Thr Asn Ser Ala Cys Ala Ser Thr Ser Gly Ser
65              70                  75                  80

Trp Phe Ser Pro Tyr Asp Gly Ala Thr Trp Thr Ala Ala Ser Asp Val
                85                  90                  95

Asp Ile Asp His Met Val Pro Leu Ser Asn Ala Trp Lys Ser Gly Ala
                100                 105                 110

Ala Ser Trp Thr Thr Ala Arg Arg Gln Ala Phe Ala Asn Asp Leu Thr
                115                 120                 125

Asn Pro Gln Leu Leu Ala Val Thr Asp Asn Val Asn Gln Ala Lys Gly
            130                 135                 140

Asp Lys Gly Pro Glu Asp Trp Lys Pro Leu Thr Ser Tyr Tyr Cys
145                 150                 155                 160

Thr Tyr Ser Lys Met Trp Ile Lys Val Lys Ser Val Trp Gly Leu Thr
                165                 170                 175

Ile Thr Ser Ala Glu Lys Ser Ala Leu Thr Ser Met Leu Ala Thr Cys
            180                 185                 190
```

<210> SEQ ID NO 34
<211> LENGTH: 192
<212> TYPE: PRT
<213> ORGANISM: Endophragmiella valdina

<400> SEQUENCE: 34

Ala Pro Val Pro Gly His Leu Met Pro Arg Ala Pro Asn Val Pro
1               5                   10                  15

Thr Thr Ala Ala Ala Lys Thr Ala Leu Ala Gly Leu Thr Val Gln Ala
            20                  25                  30

Gln Gly Ser Gln Thr Gly Tyr Ser Arg Asp Leu Phe Pro His Trp Ile
        35                  40                  45

Thr Gln Ser Gly Thr Cys Asn Thr Arg Glu Val Val Leu Lys Arg Asp
    50                  55                  60

Gly Thr Asn Val Val Thr Asp Ser Ala Cys Ala Ala Thr Ser Gly Thr
65                  70                  75                  80

Trp Val Ser Pro Tyr Asp Gly Ala Thr Trp Thr Ala Ala Ser Asp Val
                85                  90                  95

Asp Ile Asp His Met Val Pro Leu Ser Asn Ala Trp Lys Ser Gly Ala
            100                 105                 110

Ala Ser Trp Thr Thr Ala Gln Arg Gln Ala Phe Ala Asn Asp Leu Thr
        115                 120                 125

Asn Pro Gln Leu Leu Ala Val Thr Asp Asn Val Asn Gln Ser Lys Gly
    130                 135                 140

Asp Lys Gly Pro Glu Asp Trp Lys Pro Leu Thr Ser Tyr Tyr Cys
145                 150                 155                 160

Thr Tyr Ala Lys Met Trp Val Lys Val Lys Ser Val Tyr Ser Leu Thr
                165                 170                 175

Ile Thr Ser Ala Glu Lys Thr Ala Leu Thr Ser Met Leu Asn Thr Cys
            180                 185                 190

<210> SEQ ID NO 35
<211> LENGTH: 190
<212> TYPE: PRT
<213> ORGANISM: Corynespora cassiicola

<400> SEQUENCE: 35

Leu Pro Ala Pro Leu Val Pro Arg Ala Pro Gly Ile Pro Thr Thr
1               5                   10                  15

Ser Ala Ala Arg Ser Gln Leu Ala Gly Leu Thr Val Ala Ala Gln Gly
            20                  25                  30

Pro Gln Thr Gly Tyr Ser Arg Asp Leu Phe Pro His Trp Ile Thr Gln
        35                  40                  45

Ser Gly Ser Cys Asn Thr Arg Glu Val Val Leu Ala Arg Asp Gly Thr
    50                  55                  60

Gly Val Val Gln Asp Ser Ser Cys Ala Ala Thr Ser Gly Thr Trp Arg
65                  70                  75                  80

Ser Pro Phe Asp Gly Ala Thr Trp Thr Ala Ala Ser Asp Val Asp Ile
                85                  90                  95

Asp His Met Val Pro Leu Ser Asn Ala Trp Lys Ser Gly Ala Ala Ser
            100                 105                 110

Trp Thr Thr Ser Arg Arg Gln Ala Phe Ala Asn Asp Leu Thr Asn Pro
        115                 120                 125

Gln Leu Ile Ala Val Thr Asp Asn Val Asn Gln Ser Lys Gly Asp Lys
    130                 135                 140

Gly Pro Glu Asp Trp Lys Pro Leu Thr Ser Tyr Tyr Cys Thr Tyr
145                 150                 155                 160

Ala Lys Met Trp Val Arg Val Lys Ser Val Tyr Ser Leu Thr Ile Thr
            165                 170                 175

Ser Ala Glu Lys Ser Ala Leu Thr Ser Met Leu Asp Thr Cys
        180                 185                 190

<210> SEQ ID NO 36
<211> LENGTH: 192
<212> TYPE: PRT
<213> ORGANISM: Paraphoma sp. XZ1965

<400> SEQUENCE: 36

Ala Pro Ala Pro Val His Leu Val Ala Arg Ala Pro Asn Val Pro
1               5                   10                  15

Thr Ala Ala Gln Ala Gln Thr Gln Leu Ala Gly Leu Thr Val Ala Ala
            20                  25                  30

Gln Gly Pro Gln Thr Gly Tyr Ser Arg Asp Leu Phe Pro His Trp Ile
        35                  40                  45

Thr Gln Ser Gly Ala Cys Asn Thr Arg Glu Thr Val Leu Lys Arg Asp
50                  55                  60

Gly Thr Gly Val Val Gln Asp Ser Ala Cys Ala Ala Thr Ser Gly Thr
65                  70                  75                  80

Trp Lys Ser Pro Tyr Asp Gly Ala Thr Trp Thr Ala Ala Ser Asp Val
                85                  90                  95

Asp Ile Asp His Met Val Pro Leu Ser Asn Ala Trp Lys Ser Gly Ala
            100                 105                 110

Ala Ser Trp Thr Thr Ala Arg Arg Gln Ala Phe Ala Asn Asp Leu Thr
        115                 120                 125

Asn Pro Gln Leu Leu Ala Val Thr Asp Asn Val Asn Gln Ala Lys Gly
130                 135                 140

Asp Lys Gly Pro Glu Asp Trp Lys Pro Pro Leu Thr Ser Tyr Tyr Cys
145                 150                 155                 160

Ile Tyr Ala Arg Met Trp Ile Lys Val Lys Ser Val Tyr Ser Leu Thr
            165                 170                 175

Ile Thr Ser Ala Glu Lys Ser Ala Leu Thr Ser Met Leu Gly Thr Cys
        180                 185                 190

<210> SEQ ID NO 37
<211> LENGTH: 186
<212> TYPE: PRT
<213> ORGANISM: Monilinia fructicola

<400> SEQUENCE: 37

Thr Pro Val Pro Ala Pro Thr Gly Ile Pro Ser Thr Ser Val Ala Asn
1               5                   10                  15

Thr Gln Leu Ala Ala Leu Thr Val Ala Ala Gly Ser Gln Asp Gly
            20                  25                  30

Tyr Ser Arg Asp Leu Phe Pro His Trp Ile Thr Ile Ser Gly Ala Cys
        35                  40                  45

Asn Thr Arg Glu Thr Val Leu Lys Arg Asp Gly Thr Asn Val Val Val
50                  55                  60

Asn Ser Ala Cys Ala Ala Thr Ser Gly Thr Trp Val Ser Pro Tyr Asp
65                  70                  75                  80

Gly Ala Thr Trp Thr Ala Ala Ser Asp Val Asp Ile Asp His Leu Val
                85                  90                  95

```
Pro Leu Ser Asn Ala Trp Lys Ala Gly Ala Ser Ser Trp Thr Thr Ala
            100                 105                 110

Gln Arg Gln Ala Phe Ala Asn Asp Leu Val Asn Pro Gln Leu Leu Ala
            115                 120                 125

Val Thr Asp Ser Val Asn Gln Gly Lys Ser Asp Ser Gly Pro Glu Ala
            130                 135                 140

Trp Lys Pro Ser Leu Lys Ser Tyr Trp Cys Thr Tyr Ala Lys Met Trp
145                 150                 155                 160

Ile Lys Val Lys Tyr Val Tyr Asp Leu Thr Ile Thr Ser Ala Glu Lys
                165                 170                 175

Ser Ala Leu Val Thr Met Met Asp Thr Cys
            180                 185
```

<210> SEQ ID NO 38
<211> LENGTH: 190
<212> TYPE: PRT
<213> ORGANISM: Curvularia lunata

<400> SEQUENCE: 38

```
Ala Pro Ala Pro Leu Ser Ala Arg Ala Pro Asn Ile Pro Ser Lys
1               5                   10                  15

Ala Asp Ala Thr Ser Gln Leu Ala Gly Leu Thr Val Ala Ala Gln Gly
            20                  25                  30

Pro Gln Thr Gly Tyr Ser Arg Asp Leu Phe Pro His Trp Ile Thr Gln
            35                  40                  45

Ser Gly Thr Cys Asn Thr Arg Glu Thr Val Leu Lys Arg Asp Gly Thr
    50                  55                  60

Asn Val Val Thr Ser Ser Cys Ala Ala Thr Ser Gly Thr Trp Phe
65                  70                  75                  80

Ser Pro Tyr Asp Gly Ala Thr Trp Thr Ala Ala Ser Asp Val Asp Ile
                85                  90                  95

Asp His Val Val Pro Leu Ser Asn Ala Trp Lys Ser Gly Ala Ala Ser
            100                 105                 110

Trp Thr Thr Ala Arg Arg Gln Ala Phe Ala Asn Asp Leu Thr Asn Pro
            115                 120                 125

Gln Leu Ile Ala Val Thr Asp Ser Val Asn Gln Ala Lys Gly Asp Lys
            130                 135                 140

Gly Pro Glu Asp Trp Lys Pro Pro Leu Ser Ser Tyr Tyr Cys Thr Tyr
145                 150                 155                 160

Ser Lys Met Trp Ile Lys Val Lys Ser Val Tyr Gly Leu Thr Val Thr
                165                 170                 175

Ser Ala Glu Lys Ser Ala Leu Ser Ser Met Leu Ala Thr Cys
            180                 185                 190
```

<210> SEQ ID NO 39
<211> LENGTH: 191
<212> TYPE: PRT
<213> ORGANISM: Penicillium reticulisporum

<400> SEQUENCE: 39

```
Leu Pro Ala Pro Glu Ala Leu Pro Ala Pro Gly Val Pro Ser Ala
1               5                   10                  15

Ser Thr Ala Gln Ser Glu Leu Ala Ala Leu Thr Val Ala Ala Gln Gly
            20                  25                  30

Ser Gln Asp Gly Tyr Ser Arg Ser Lys Phe Pro His Trp Ile Thr Gln
            35                  40                  45
```

```
Ser Gly Ser Cys Asp Thr Arg Asp Val Val Leu Lys Arg Asp Gly Thr
 50                  55                  60

Asn Val Val Gln Ser Ala Ser Gly Cys Thr Ile Thr Ser Gly Lys Trp
 65                  70                  75                  80

Val Ser Pro Tyr Asp Gly Ala Thr Trp Thr Ala Ser Ser Asp Val Asp
                 85                  90                  95

Ile Asp His Leu Val Pro Leu Ser Asn Ala Trp Lys Ser Gly Ala Ser
                100                 105                 110

Gly Trp Thr Thr Ala Ala Arg Gln Ala Phe Ala Asn Asp Leu Thr Asn
                115                 120                 125

Pro Gln Leu Leu Val Val Thr Asp Asn Val Asn Glu Ser Lys Gly Asp
130                 135                 140

Lys Gly Pro Glu Glu Trp Lys Pro Pro Leu Thr Ser Tyr Tyr Cys Thr
145                 150                 155                 160

Tyr Ala Glu Met Trp Val Lys Val Lys Ser Val Tyr Lys Leu Thr Ile
                165                 170                 175

Thr Ser Ala Glu Lys Ser Ala Leu Thr Ser Met Leu Ser Thr Cys
                180                 185                 190
```

<210> SEQ ID NO 40
<211> LENGTH: 191
<212> TYPE: PRT
<213> ORGANISM: Penicillium quercetorum

<400> SEQUENCE: 40

```
Leu Pro Ala Pro Glu Pro Ala Pro Ser Pro Gly Ile Pro Ser Ala
 1               5                  10                  15

Ser Thr Ala Arg Ser Glu Leu Ala Ser Leu Thr Val Ala Pro Gln Gly
                 20                  25                  30

Ser Gln Asp Gly Tyr Ser Arg Ala Lys Phe Pro His Trp Ile Lys Gln
                 35                  40                  45

Ser Gly Ser Cys Asp Thr Arg Asp Val Val Leu Glu Arg Asp Gly Thr
 50                  55                  60

Asn Val Val Gln Ser Ser Thr Gly Cys Thr Ile Thr Gly Gly Thr Trp
 65                  70                  75                  80

Val Ser Pro Tyr Asp Gly Ala Thr Trp Thr Ala Ser Ser Asp Val Asp
                 85                  90                  95

Ile Asp His Leu Val Pro Leu Ser Asn Ala Trp Lys Ser Gly Ala Ser
                100                 105                 110

Ala Trp Thr Thr Ala Gln Arg Gln Ala Phe Ala Asn Asp Leu Thr Asn
                115                 120                 125

Pro Gln Leu Val Ala Val Thr Asp Asn Val Asn Glu Ala Lys Gly Asp
130                 135                 140

Lys Gly Pro Glu Glu Trp Lys Pro Pro Leu Thr Ser Tyr Tyr Cys Thr
145                 150                 155                 160

Tyr Ala Glu Met Trp Val Lys Val Lys Ser Val Tyr Lys Leu Thr Ile
                165                 170                 175

Thr Ser Ala Glu Lys Ser Ala Leu Ser Ser Met Leu Asn Thr Cys
                180                 185                 190
```

<210> SEQ ID NO 41
<211> LENGTH: 192
<212> TYPE: PRT
<213> ORGANISM: Setophaeosphaeria sp.

<400> SEQUENCE: 41

```
Leu Pro Ala Pro Val Thr Leu Glu Ala Arg Ala Pro Asn Ile Pro
1               5                  10                 15

Ser Thr Ala Ser Ala Asn Thr Leu Leu Ala Gly Leu Thr Val Ala Ala
              20                  25                 30

Gln Gly Ser Gln Thr Gly Tyr Ser Arg Asp Leu Phe Pro His Trp Ile
          35                  40                  45

Thr Gln Ser Gly Thr Cys Asn Thr Arg Glu Thr Val Leu Lys Arg Asp
      50                  55                  60

Gly Thr Gly Val Val Thr Asp Ser Ala Cys Ala Ser Thr Ser Gly Ser
65                  70                  75                  80

Trp Tyr Ser Val Tyr Asp Gly Ala Thr Trp Thr Ala Ala Ser Asp Val
              85                  90                  95

Asp Ile Asp His Val Val Pro Leu Ser Asn Ala Trp Lys Ser Gly Ala
          100                 105                 110

Ala Ser Trp Thr Thr Ala Arg Arg Gln Ser Phe Ala Asn Asp Leu Thr
      115                 120                 125

Asn Pro Gln Leu Ile Ala Val Thr Asp Asn Val Asn Gln Ala Lys Gly
  130                 135                 140

Asp Lys Gly Pro Glu Asp Trp Lys Pro Pro Leu Thr Ser Tyr Tyr Cys
145                 150                 155                 160

Thr Tyr Ala Lys Met Trp Val Lys Val Lys Ser Val Tyr Ser Leu Thr
              165                 170                 175

Ile Thr Ser Ala Glu Lys Thr Ala Leu Thr Ser Met Leu Asn Thr Cys
          180                 185                 190

<210> SEQ ID NO 42
<211> LENGTH: 192
<212> TYPE: PRT
<213> ORGANISM: Alternaria sp. XZ2545

<400> SEQUENCE: 42

Leu Pro Ala Pro Val Thr Leu Glu Ala Arg Ala Pro Asn Ile Pro
1               5                  10                 15

Thr Thr Ala Ala Ala Lys Thr Gln Leu Ala Gly Leu Thr Val Ala Ala
              20                  25                 30

Gln Gly Pro Gln Thr Gly Tyr Ser Arg Asp Leu Phe Pro His Trp Ile
          35                  40                  45

Thr Gln Ser Gly Thr Cys Asn Thr Arg Glu Thr Val Leu Lys Arg Asp
      50                  55                  60

Gly Thr Gly Val Val Thr Asp Ser Ala Cys Ala Ser Thr Ser Gly Ser
65                  70                  75                  80

Trp Phe Ser Val Tyr Asp Gly Ala Thr Trp Thr Ala Ala Ser Asp Val
              85                  90                  95

Asp Ile Asp His Val Val Pro Leu Ser Asn Ala Trp Lys Ser Gly Ala
          100                 105                 110

Ala Ser Trp Thr Thr Ala Arg Arg Gln Ser Phe Ala Asn Asp Leu Thr
      115                 120                 125

Asn Pro Gln Leu Ile Ala Val Thr Asp Asn Val Asn Gln Ala Lys Gly
  130                 135                 140

Asp Lys Gly Pro Glu Asp Trp Lys Pro Pro Leu Thr Ser Tyr Tyr Cys
145                 150                 155                 160

Thr Tyr Ala Lys Met Trp Val Lys Val Lys Ser Val Tyr Ala Leu Thr
              165                 170                 175

Ile Thr Ser Ala Glu Lys Thr Ala Leu Thr Ser Met Leu Asn Thr Cys
```

-continued

```
                 180                 185                 190

<210> SEQ ID NO 43
<211> LENGTH: 192
<212> TYPE: PRT
<213> ORGANISM: Alternaria sp.

<400> SEQUENCE: 43

Leu Pro Ala Pro Val Thr Leu Glu Ala Arg Ala Pro Asn Ile Pro
1               5                   10                  15

Thr Thr Ala Ala Ala Lys Thr Gln Leu Ala Gly Leu Thr Val Ala Ala
                20                  25                  30

Gln Gly Pro Gln Thr Gly Tyr Ser Arg Asp Leu Phe Pro His Trp Ile
            35                  40                  45

Thr Gln Ser Gly Ser Cys Asn Thr Arg Glu Val Val Leu Gln Arg Asp
        50                  55                  60

Gly Thr Gly Val Val Thr Asp Ser Ala Cys Ala Ala Thr Ser Gly Ser
65                  70                  75                  80

Trp Tyr Ser Val Tyr Asp Gly Ala Thr Trp Thr Ala Ala Ser Asp Val
                85                  90                  95

Asp Ile Asp His Met Val Pro Leu Ser Asn Ala Trp Lys Ser Gly Ala
            100                 105                 110

Ala Ser Trp Thr Thr Ala Arg Arg Gln Ala Phe Ala Asn Asp Leu Thr
        115                 120                 125

Asn Pro Gln Leu Leu Ala Val Thr Asp Asn Val Asn Gln Ala Lys Gly
    130                 135                 140

Asp Lys Gly Pro Glu Asp Trp Lys Pro Pro Leu Thr Ser Tyr Tyr Cys
145                 150                 155                 160

Thr Tyr Ala Lys Met Trp Val Lys Val Lys Ser Val Tyr Ala Leu Thr
                165                 170                 175

Ile Thr Ser Ala Glu Lys Thr Ala Leu Thr Ser Met Leu Asn Thr Cys
            180                 185                 190

<210> SEQ ID NO 44
<211> LENGTH: 186
<212> TYPE: PRT
<213> ORGANISM: Trichoderma reesei

<400> SEQUENCE: 44

Ala Pro Leu Pro Ala Pro Gly Ile Pro Ser Glu Asp Thr Ala Arg
1               5                   10                  15

Thr Gln Leu Ala Gly Leu Thr Val Ala Val Gly Ser Gly Thr Gly
                20                  25                  30

Tyr Ser Arg Asp Leu Phe Pro Thr Trp Asp Ala Ile Ser Gly Asn Cys
            35                  40                  45

Asn Ala Arg Glu Tyr Val Leu Lys Arg Asp Gly Glu Gly Val Gln Val
        50                  55                  60

Asn Asn Ala Cys Glu Ala Gln Ser Gly Ser Trp Ile Ser Pro Tyr Asp
65                  70                  75                  80

Asn Ala Ser Phe Thr Asn Ala Ser Ser Leu Asp Ile Asp His Met Val
                85                  90                  95

Pro Leu Lys Asn Ala Trp Ile Ser Gly Ala Ser Thr Trp Thr Thr Ala
            100                 105                 110

Gln Arg Glu Ala Leu Ala Asn Asp Val Ser Arg Pro Gln Leu Trp Ala
        115                 120                 125

Val Ser Ala Ser Ser Asn Arg Ser Lys Gly Asp Arg Ser Pro Asp Gln
```

```
                    130                 135                 140
Trp Lys Pro Pro Leu Thr Ser Phe Tyr Cys Thr Tyr Ala Lys Ser Trp
145                 150                 155                 160

Ile Asp Val Lys Ser Tyr Tyr Lys Leu Thr Ile Thr Ser Ala Glu Lys
                    165                 170                 175

Thr Ala Leu Ser Ser Met Leu Asp Thr Cys
                180                 185

<210> SEQ ID NO 45
<211> LENGTH: 188
<212> TYPE: PRT
<213> ORGANISM: Chaetomium thermophilum

<400> SEQUENCE: 45

Ala Pro Ala Pro Gln Pro Thr Pro Pro Gly Ile Pro Ser Arg Ser Thr
1               5                   10                  15

Ala Gln Ser Tyr Leu Asn Ser Leu Thr Val Ala Ala Ser Tyr Asp Asp
                20                  25                  30

Gly Asn Tyr Asn Arg Asp Leu Phe Pro His Trp Asn Thr Val Ser Gly
            35                  40                  45

Thr Cys Asn Thr Arg Glu Tyr Val Leu Lys Arg Asp Gly Ser Asn Val
50                  55                  60

Val Thr Asn Ser Ala Cys Gln Ala Thr Ser Gly Thr Trp Tyr Ser Pro
65                  70                  75                  80

Tyr Asp Gly Ala Thr Trp Thr Ala Ala Ser Asp Ile Asp Ile Asp His
                85                  90                  95

Met Val Pro Leu Lys Asn Ala Trp Ile Ser Gly Ala Asn Thr Trp Ser
            100                 105                 110

Ser Ser Lys Arg Ser Ser Phe Ala Asn Asp Ile Asn Ser Pro Gln Leu
        115                 120                 125

Trp Ala Val Thr Asp Ser Val Asn Gln Ser Lys Gly Asp Lys Ser Pro
130                 135                 140

Asp Lys Trp Lys Pro Pro Leu Thr Thr Phe Tyr Cys Thr Tyr Ala Lys
145                 150                 155                 160

Ser Trp Ile Thr Val Lys Tyr Asn Tyr Asn Leu Thr Ile Thr Ser Ala
                165                 170                 175

Glu Lys Ser Ala Leu Gln Asn Met Ile Asn Thr Cys
            180                 185

<210> SEQ ID NO 46
<211> LENGTH: 190
<212> TYPE: PRT
<213> ORGANISM: Scytalidium thermophilum

<400> SEQUENCE: 46

Leu Pro Ala Pro Ala Pro Met Pro Thr Pro Pro Gly Ile Pro Ser Lys
1               5                   10                  15

Ser Thr Ala Gln Ser Gln Leu Asn Ala Leu Thr Val Lys Ala Ser Tyr
                20                  25                  30

Asp Asp Gly Lys Tyr Lys Arg Asp Leu Phe Pro His Trp Asn Thr Val
            35                  40                  45

Ser Gly Thr Cys Asn Thr Arg Glu Tyr Val Leu Lys Arg Asp Gly Val
        50                  55                  60

Asn Val Val Thr Asn Ser Ala Cys Ala Ala Thr Ser Gly Thr Trp Tyr
65                  70                  75                  80

Ser Pro Phe Asp Gly Ala Thr Trp Thr Ala Ala Ser Asp Val Asp Ile
```

```
                    85                  90                  95
Asp His Met Val Pro Leu Lys Asn Ala Trp Ile Ser Gly Ala Asn Asn
            100                 105                 110

Trp Thr Ser Thr Lys Arg Thr Gln Phe Ala Asn Asp Ile Asn Leu Pro
        115                 120                 125

Gln Leu Trp Ala Val Thr Asp Val Asn Gln Ala Lys Gly Asp Lys
    130                 135                 140

Ser Pro Asp Lys Trp Lys Pro Leu Thr Ser Phe Tyr Cys Thr Tyr
145                 150                 155                 160

Ala Lys Ser Trp Ile Thr Val Lys Tyr Asn Tyr Gly Leu Ser Ile Thr
                165                 170                 175

Ser Ala Glu Lys Ser Ala Leu Thr Ser Met Ile Asn Thr Cys
            180                 185                 190

<210> SEQ ID NO 47
<211> LENGTH: 186
<212> TYPE: PRT
<213> ORGANISM: Metapochonia suchlasporia

<400> SEQUENCE: 47

Val Pro Val Pro Ala Pro Pro Gly Ile Pro Ser Thr Ser Thr Ala Lys
1               5                   10                  15

Thr Leu Leu Ala Gly Leu Lys Val Ala Val Pro Leu Ser Gly Asp Gly
            20                  25                  30

Tyr Ser Arg Glu Lys Phe Pro Leu Trp Glu Thr Ile Gln Gly Thr Cys
        35                  40                  45

Asn Ala Arg Glu Phe Val Leu Lys Arg Asp Gly Thr Asp Val Lys Thr
    50                  55                  60

Asn Asn Ala Cys Val Ala Glu Ser Gly Asn Trp Val Ser Pro Tyr Asp
65                  70                  75                  80

Gly Val Lys Phe Thr Ala Ala Arg Asp Leu Asp Ile Asp His Met Val
                85                  90                  95

Pro Leu Lys Asn Ala Trp Ile Ser Gly Ala Ser Gln Trp Thr Thr Glu
            100                 105                 110

Arg Arg Lys Ala Leu Ala Asn Asp Ile Thr Arg Pro Gln Leu Trp Ala
        115                 120                 125

Val Ser Ala His Ala Asn Arg Gly Lys Ser Asp Asp Ser Pro Asp Glu
    130                 135                 140

Trp Lys Pro Pro Leu Lys Thr Phe Trp Cys Thr Tyr Ala Lys Ser Trp
145                 150                 155                 160

Val Gln Val Lys Ser Phe Tyr Glu Leu Thr Ile Thr Asp Ala Glu Lys
                165                 170                 175

Gly Ala Leu Ala Gly Met Leu Asp Ser Cys
            180                 185

<210> SEQ ID NO 48
<211> LENGTH: 198
<212> TYPE: PRT
<213> ORGANISM: Daldinia fissa

<400> SEQUENCE: 48

Ala Pro Ala Pro Ile Pro Val Ala Glu Pro Ala Pro Met Pro Met Pro
1               5                   10                  15

Thr Pro Pro Gly Ile Pro Ser Ala Ser Ser Ala Lys Ser Gln Leu Ala
            20                  25                  30

Ser Leu Thr Val Lys Ala Ala Val Asp Asp Gly Gly Tyr Gln Arg Asp
```

```
                35                  40                  45
Leu Phe Pro Thr Trp Asp Thr Ile Thr Gly Thr Cys Asn Thr Arg Glu
 50                  55                  60

Tyr Val Leu Lys Arg Asp Gly Ala Asn Val Gln Val Gly Ser Asp Cys
 65                  70                  75                  80

Tyr Pro Thr Ser Gly Thr Trp Thr Ser Pro Tyr Asp Gly Gly Lys Trp
                 85                  90                  95

Thr Ser Pro Ser Asp Val Asp Ile Asp His Met Val Pro Leu Lys Asn
                100                 105                 110

Ala Trp Val Ser Gly Ala Asn Lys Trp Thr Thr Ala Lys Arg Glu Gln
                115                 120                 125

Phe Ala Asn Asp Val Asp Arg Pro Gln Leu Trp Ala Val Thr Asp Asn
130                 135                 140

Val Asn Ser Ser Lys Gly Asp Lys Ser Pro Asp Thr Trp Lys Pro Pro
145                 150                 155                 160

Leu Thr Ser Phe Tyr Cys Thr Tyr Ala Ser Ala Tyr Val Ala Val Lys
                165                 170                 175

Ser Tyr Trp Gly Leu Thr Ile Thr Ser Ala Glu Lys Ser Ala Leu Ser
                180                 185                 190

Asp Met Leu Gly Thr Cys
                195

<210> SEQ ID NO 49
<211> LENGTH: 188
<212> TYPE: PRT
<213> ORGANISM: Acremonium sp. XZ2007

<400> SEQUENCE: 49

Leu Pro Leu Gln Ser Arg Asp Pro Pro Gly Ile Pro Ser Thr Ala Thr
 1               5                  10                  15

Ala Lys Ser Leu Leu Asn Gly Leu Thr Val Lys Ala Trp Ser Asn Glu
                 20                  25                  30

Gly Thr Tyr Asp Arg Asp Leu Phe Pro His Trp Gln Thr Ile Glu Gly
                 35                  40                  45

Thr Cys Asn Ala Arg Glu Tyr Val Leu Lys Arg Asp Gly Gln Asn Val
 50                  55                  60

Val Val Asn Ser Ala Cys Thr Ala Gln Ser Gly Thr Trp Lys Ser Val
 65                  70                  75                  80

Tyr Asp Gly Glu Thr Thr Asn Ser Ala Ser Asp Leu Asp Ile Asp His
                 85                  90                  95

Met Ile Pro Leu Lys Asn Ala Trp Ile Ser Gly Ala Ala Thr Trp Thr
                100                 105                 110

Thr Ala Gln Arg Thr Ser Phe Ala Asn Asp Ile Ser Ser Pro Gln Leu
                115                 120                 125

Trp Ala Val Thr Ala Gly Val Asn Arg Ser Lys Ser Asp Arg Ser Pro
130                 135                 140

Asp Thr Trp Val Pro Pro Leu Ala Ser Phe His Cys Thr Tyr Gly Lys
145                 150                 155                 160

Ala Trp Val Gln Val Lys Ser Lys Trp Ala Leu Ser Ile Thr Ser Ala
                165                 170                 175

Glu Lys Ser Ala Leu Thr Gly Leu Leu Asn Lys Cys
                180                 185

<210> SEQ ID NO 50
<211> LENGTH: 182
```

<212> TYPE: PRT
<213> ORGANISM: Acremonium dichromosporum

<400> SEQUENCE: 50

Ile Pro Pro Gly Ile Pro Ser Glu Ala Thr Ala Arg Ser Leu Leu Ser
1               5                   10                  15

Ser Leu Thr Val Ala Pro Thr Val Asp Asp Gly Thr Tyr Asp Arg Asp
            20                  25                  30

Leu Phe Pro His Trp Ser Ser Val Glu Gly Asn Cys Asn Ala Arg Glu
        35                  40                  45

Phe Val Leu Arg Arg Asp Gly Asp Gly Val Ser Val Gly Asn Asp Cys
    50                  55                  60

Tyr Pro Thr Ala Gly Thr Trp Thr Cys Pro Tyr Asp Gly Lys Arg His
65                  70                  75                  80

Ser Val Pro Ser Asp Val Ser Ile Asp His Met Val Pro Leu His Asn
                85                  90                  95

Ala Trp Met Thr Gly Ala Ser Glu Trp Thr Thr Ala Glu Arg Glu Ala
            100                 105                 110

Phe Ala Asn Asp Ile Asp Gly Pro Gln Leu Trp Ala Val Thr Ser Thr
        115                 120                 125

Thr Asn Ser Gln Lys Gly Ser Asp Ala Pro Asp Glu Trp Gln Pro Pro
    130                 135                 140

Gln Thr Ser Ile His Cys Lys Tyr Ala Ala Ala Trp Ile Gln Val Lys
145                 150                 155                 160

Ser Thr Tyr Asp Leu Thr Val Ser Ser Ala Glu Gln Ala Ala Leu Glu
                165                 170                 175

Glu Met Leu Gly Arg Cys
            180

<210> SEQ ID NO 51
<211> LENGTH: 188
<212> TYPE: PRT
<213> ORGANISM: Sarocladium sp. XZ2014

<400> SEQUENCE: 51

Val Pro Ile Pro Leu Pro Asp Pro Pro Gly Ile Pro Ser Ser Ser Thr
1               5                   10                  15

Ala Asn Thr Leu Leu Ala Gly Leu Thr Val Arg Ala Ser Ser Asn Glu
            20                  25                  30

Asp Thr Tyr Asn Arg Asp Leu Phe Pro His Trp Val Ala Ile Ser Gly
        35                  40                  45

Asn Cys Asn Ala Arg Glu Tyr Val Leu Arg Arg Asp Gly Thr Asn Val
    50                  55                  60

Val Val Asn Thr Ala Cys Val Pro Gln Ser Gly Thr Trp Arg Ser Pro
65                  70                  75                  80

Tyr Asp Gly Glu Ser Thr Thr Asn Ala Ser Asp Leu Asp Ile Asp His
                85                  90                  95

Met Val Pro Leu Lys Asn Ala Trp Ile Ser Gly Ala Ala Ser Trp Thr
            100                 105                 110

Thr Ala Lys Arg Gln Asp Phe Ala Asn Asp Val Ser Gly Pro Gln Leu
        115                 120                 125

Trp Ala Val Thr Ala Gly Val Asn Arg Ser Lys Gly Asp Lys Ser Pro
    130                 135                 140

Asp Ser Trp Val Pro Pro Leu Ala Ser Phe His Cys Thr Tyr Ala Arg
145                 150                 155                 160

```
Ser Trp Ile Gln Val Lys Ser Trp Ala Leu Ser Val Thr Ser Ala
                165                 170                 175

Glu Lys Ala Ala Leu Thr Asp Leu Leu Ser Thr Cys
        180                 185
```

<210> SEQ ID NO 52
<211> LENGTH: 186
<212> TYPE: PRT
<213> ORGANISM: Metarhizium sp. HNA15-2

<400> SEQUENCE: 52

```
Val Pro Val Pro Ala Pro Pro Gly Ile Pro Thr Ala Ser Thr Ala Arg
1               5                   10                  15

Thr Leu Leu Ala Gly Leu Lys Val Ala Thr Pro Leu Ser Gly Asp Gly
            20                  25                  30

Tyr Ser Arg Thr Leu Phe Pro Thr Trp Glu Thr Ile Glu Gly Thr Cys
        35                  40                  45

Asn Ala Arg Glu Phe Val Leu Lys Arg Asp Gly Thr Asp Val Gln Thr
    50                  55                  60

Asn Thr Ala Cys Val Ala Gln Ser Gly Asn Trp Val Ser Pro Tyr Asp
65                  70                  75                  80

Gly Val Ala Phe Thr Ala Ala Ser Asp Leu Asp Ile Asp His Met Val
                85                  90                  95

Pro Leu Lys Asn Ala Trp Ile Ser Gly Ala Ser Gln Trp Thr Thr Asp
            100                 105                 110

Lys Arg Lys Gly Leu Ala Asn Asp Ile Thr Arg Pro Gln Leu Trp Ala
        115                 120                 125

Val Ser Ala His Ala Asn Arg Ala Lys Gly Asp Ser Ser Pro Asp Glu
    130                 135                 140

Trp Lys Pro Pro Leu Lys Thr Phe Trp Cys Thr Tyr Ala Arg Ser Trp
145                 150                 155                 160

Val Gln Val Lys Ser Tyr Tyr Ala Leu Thr Ile Thr Asp Ala Glu Lys
                165                 170                 175

Gly Ala Leu Ser Gly Met Leu Asp Ser Cys
            180                 185
```

<210> SEQ ID NO 53
<211> LENGTH: 188
<212> TYPE: PRT
<213> ORGANISM: Acremonium sp. XZ2414

<400> SEQUENCE: 53

```
Ala Pro Ile Ala Val Arg Asp Pro Pro Gly Ile Pro Ser Ala Ser Thr
1               5                   10                  15

Ala Asn Thr Leu Leu Ala Gly Leu Thr Val Arg Ala Ser Ser Asn Glu
            20                  25                  30

Asp Ser Tyr Asp Arg Asn Leu Phe Pro His Trp Ser Ala Ile Ser Gly
        35                  40                  45

Asn Cys Asn Ala Arg Glu Phe Val Leu Glu Arg Asp Gly Thr Asn Val
    50                  55                  60

Val Val Asn Asn Ala Cys Val Ala Gln Ser Gly Thr Trp Arg Ser Pro
65                  70                  75                  80

Tyr Asp Gly Glu Thr Thr Gly Asn Ala Ser Asp Leu Asp Ile Asp His
                85                  90                  95

Met Val Pro Leu Lys Asn Ala Trp Ile Ser Gly Ala Ser Ser Trp Ser
            100                 105                 110
```

Thr Thr Arg Arg Gln Glu Phe Ala Asn Asp Val Ser Gly Pro Gln Leu
            115                 120                 125

Trp Ala Val Thr Ala Gly Val Asn Arg Ser Lys Gly Asp Arg Ser Pro
        130                 135                 140

Asp Ser Trp Val Pro Pro Leu Ala Ser Phe His Cys Thr Tyr Ala Lys
145                 150                 155                 160

Ser Trp Val Gln Val Lys Ser Ser Trp Ser Leu Ser Val Thr Ser Ala
                165                 170                 175

Glu Lys Ala Ala Leu Ser Asp Leu Leu Gly Thr Cys
                180                 185

<210> SEQ ID NO 54
<211> LENGTH: 186
<212> TYPE: PRT
<213> ORGANISM: Isaria tenuipes

<400> SEQUENCE: 54

Ala Pro Val Pro Glu Pro Pro Gly Ile Pro Ser Thr Ser Thr Ala Gln
1               5                   10                  15

Ser Asp Leu Asn Ser Leu Gln Val Ala Ala Ser Gly Ser Gly Asp Gly
                20                  25                  30

Tyr Ser Arg Ala Glu Phe Pro His Trp Val Ser Val Glu Gly Ser Cys
            35                  40                  45

Asp Ser Arg Glu Tyr Val Leu Lys Arg Asp Gly Gln Asp Val Gln Ala
50                  55                  60

Asp Ser Ser Cys Lys Ile Thr Ser Gly Thr Trp Val Ser Pro Tyr Asp
65                  70                  75                  80

Ala Thr Thr Trp Thr Asn Ser Ser Lys Val Asp Ile Asp His Leu Val
                85                  90                  95

Pro Leu Lys Asn Ala Trp Ile Ser Gly Ala Ser Ser Trp Thr Lys Ala
            100                 105                 110

Gln Arg Gln Asp Phe Ala Asn Asp Ile Lys Arg Pro Gln Leu Tyr Ala
        115                 120                 125

Val Ser Glu Asn Ala Asn Arg Ser Lys Gly Asp Arg Ser Pro Asp Gly
    130                 135                 140

Trp Lys Pro Pro Leu Lys Ser Phe Tyr Cys Thr Tyr Ala Lys Ser Trp
145                 150                 155                 160

Val Ala Val Lys Ser Tyr Tyr Lys Leu Thr Ile Thr Ser Ala Glu Lys
                165                 170                 175

Ser Ala Leu Gly Asp Met Leu Asp Thr Cys
            180                 185

<210> SEQ ID NO 55
<211> LENGTH: 184
<212> TYPE: PRT
<213> ORGANISM: Scytalidium circinatum

<400> SEQUENCE: 55

Ala Pro Pro Gly Ile Pro Ser Ala Ser Thr Ala Ser Ser Leu Leu Gly
1               5                   10                  15

Glu Leu Ala Val Ala Glu Pro Val Asp Asp Gly Ser Tyr Asp Arg Asp
                20                  25                  30

Leu Phe Pro His Trp Glu Pro Ile Pro Gly Glu Thr Ala Cys Ser Ala
            35                  40                  45

Arg Glu Tyr Val Leu Arg Arg Asp Gly Thr Gly Val Glu Thr Gly Ser
50                  55                  60

```
Asp Cys Tyr Pro Thr Ser Gly Thr Trp Ser Ser Pro Tyr Asp Gly Gly
 65                  70                  75                  80

Ser Trp Thr Ala Pro Ser Asp Val Asp Ile Asp His Met Val Pro Leu
                 85                  90                  95

Lys Asn Ala Trp Ile Ser Gly Ala Ser Glu Trp Thr Thr Ala Glu Arg
            100                 105                 110

Glu Ala Phe Ala Asn Asp Ile Asp Gly Pro Gln Leu Trp Ala Val Thr
        115                 120                 125

Asp Glu Val Asn Gln Ser Lys Ser Asp Gln Ser Pro Asp Glu Trp Lys
    130                 135                 140

Pro Pro Leu Ser Ser Phe Tyr Cys Thr Tyr Ala Cys Ala Trp Ile Gln
145                 150                 155                 160

Val Lys Ser Thr Tyr Ser Leu Ser Ile Ser Ser Ala Glu Gln Ala Ala
                165                 170                 175

Leu Glu Asp Met Leu Gly Ser Cys
            180
```

<210> SEQ ID NO 56
<211> LENGTH: 186
<212> TYPE: PRT
<213> ORGANISM: Metarhizium lepidiotae

<400> SEQUENCE: 56

```
Val Pro Val Pro Ala Pro Pro Gly Ile Pro Thr Ala Ser Thr Ala Arg
  1               5                  10                  15

Thr Leu Leu Ala Gly Leu Lys Val Ala Thr Pro Leu Ser Gly Asp Gly
             20                  25                  30

Tyr Ser Arg Thr Leu Phe Pro Thr Trp Glu Thr Ile Glu Gly Thr Cys
         35                  40                  45

Asn Ala Arg Glu Phe Val Leu Lys Arg Asp Gly Thr Asp Val Gln Thr
     50                  55                  60

Asn Thr Ala Cys Val Ala Glu Ser Gly Asn Trp Val Ser Pro Tyr Asp
 65                  70                  75                  80

Gly Val Ser Phe Thr Ala Ala Ser Asp Leu Asp Ile Asp His Met Val
                 85                  90                  95

Pro Leu Lys Asn Ala Trp Ile Ser Gly Ala Ser Gln Trp Thr Thr Asp
            100                 105                 110

Lys Arg Lys Asp Leu Ala Asn Asp Ile Thr Arg Pro Gln Leu Trp Ala
        115                 120                 125

Val Ser Ala His Ala Asn Arg Ser Lys Gly Asp Ser Ser Pro Asp Glu
    130                 135                 140

Trp Lys Pro Pro Leu Gln Thr Phe Trp Cys Thr Tyr Ser Lys Ser Trp
145                 150                 155                 160

Ile Gln Val Lys Ser His Tyr Ser Leu Thr Ile Thr Asp Ala Glu Lys
                165                 170                 175

Gly Ala Leu Ser Gly Met Leu Asp Ser Cys
            180                 185
```

<210> SEQ ID NO 57
<211> LENGTH: 226
<212> TYPE: PRT
<213> ORGANISM: Thermobispora bispora

<400> SEQUENCE: 57

```
Leu Asp Ile Ala Asp Gly Arg Pro Ala Gly Gly Lys Ala Ala Glu Ala
  1               5                  10                  15
```

```
Ala Thr Gly Thr Ser Pro Leu Ala Asn Pro Asp Gly Thr Arg Pro Gly
            20                  25                  30

Leu Ala Ala Ile Thr Ser Ala Asp Glu Arg Ala Glu Ala Arg Ala Leu
        35                  40                  45

Ile Glu Arg Leu Arg Thr Lys Gly Arg Gly Pro Lys Thr Gly Tyr Glu
 50                  55                  60

Arg Glu Lys Phe Gly Tyr Ala Trp Ala Asp Ser Val Asp Gly Ile Pro
 65                  70                  75                  80

Phe Gly Arg Asn Gly Cys Asp Thr Arg Asn Asp Val Leu Lys Arg Asp
                85                  90                  95

Gly Gln Arg Leu Gln Phe Arg Ser Gly Ser Asp Cys Val Val Ile Ser
            100                 105                 110

Met Thr Leu Phe Asp Pro Tyr Thr Gly Lys Thr Ile Glu Trp Thr Lys
            115                 120                 125

Gln Asn Ala Ala Glu Val Gln Ile Asp His Val Val Pro Leu Ser Tyr
130                 135                 140

Ser Trp Gln Met Gly Ala Ser Arg Trp Ser Asp Glu Lys Arg Arg Gln
145                 150                 155                 160

Leu Ala Asn Asp Pro Leu Asn Leu Met Pro Val Asp Gly Ala Thr Asn
                165                 170                 175

Ser Arg Lys Gly Asp Ser Gly Pro Ala Ser Trp Leu Pro Pro Arg Arg
            180                 185                 190

Glu Ile Arg Cys Ala Tyr Val Val Arg Phe Ala Gln Val Ala Leu Lys
            195                 200                 205

Tyr Asp Leu Pro Val Thr Thr Ala Asp Lys Glu Thr Met Leu Gln Gln
210                 215                 220

Cys Ser
225

<210> SEQ ID NO 58
<211> LENGTH: 191
<212> TYPE: PRT
<213> ORGANISM: Sporormia fimetaria

<400> SEQUENCE: 58

Leu Pro Ala Pro Val Leu Glu Lys Arg Thr Pro Asn Ile Pro Ser
 1               5                  10                  15

Thr Ser Thr Ala Gln Ser Leu Leu Ser Gly Leu Thr Val Ala Pro Gln
            20                  25                  30

Gly Ser Gln Thr Gly Tyr Ser Arg Asp Leu Phe Pro His Trp Ile Thr
        35                  40                  45

Val Ser Gly Thr Cys Asn Thr Arg Glu Thr Val Leu Lys Arg Asp Gly
 50                  55                  60

Ser Asn Val Val Thr Asp Ser Ala Cys Ala Val Ser Gly Ser Trp
 65                  70                  75                  80

Tyr Ser Thr Tyr Asp Gly Ala Thr Trp Thr Ala Ala Ser Asp Val Asp
                85                  90                  95

Ile Asp His Val Val Pro Leu Ser Asn Ala Trp Lys Ser Gly Ala Ala
            100                 105                 110

Ser Trp Thr Thr Ala Arg Arg Gln Ala Phe Ala Asn Asp Leu Thr Asn
            115                 120                 125

Pro Gln Leu Ile Ala Val Thr Asp Asn Val Asn Gln Ala Lys Gly Asp
130                 135                 140

Gln Gly Pro Glu Ser Trp Lys Pro Pro Leu Thr Ser Tyr Tyr Cys Thr
145                 150                 155                 160
```

Tyr Ala Lys Met Trp Val Lys Val Lys Ser Val Tyr Ser Leu Thr Val
                165                 170                 175

Thr Ser Ala Glu Lys Ser Ala Leu Ser Ser Met Leu Gly Thr Cys
            180                 185                 190

<210> SEQ ID NO 59
<211> LENGTH: 193
<212> TYPE: PRT
<213> ORGANISM: Pycnidiophora dispera

<400> SEQUENCE: 59

Leu Pro Ala Pro Ala Pro Val Leu Val Ala Arg Glu Pro Pro Asn Ile
1               5                   10                  15

Pro Ser Thr Ser Ser Ala Gln Ser Met Leu Ser Gly Leu Thr Val Lys
            20                  25                  30

Ala Gln Gly Pro Gln Asp Gly Tyr Ser Arg Asp Leu Phe Pro His Trp
        35                  40                  45

Ile Thr Ile Ser Gly Thr Cys Asn Thr Arg Glu Thr Val Leu Lys Arg
    50                  55                  60

Asp Gly Thr Asn Val Val Thr Asn Ser Ala Cys Ala Ser Thr Ser Gly
65                  70                  75                  80

Ser Trp Tyr Ser Pro Tyr Asp Gly Ala Thr Trp Thr Ala Ala Ser Asp
                85                  90                  95

Val Asp Ile Asp His Ile Val Pro Leu Ser Asn Ala Trp Lys Ser Gly
            100                 105                 110

Ala Ala Ser Trp Thr Thr Ser Arg Arg Gln Gln Phe Ala Asn Asp Leu
        115                 120                 125

Thr Asn Pro Gln Leu Ile Ala Val Thr Asp Ser Val Asn Gln Ala Lys
    130                 135                 140

Gly Asp Lys Gly Pro Glu Asp Trp Lys Pro Ser Arg Thr Ser Tyr His
145                 150                 155                 160

Cys Thr Tyr Ala Lys Met Trp Ile Lys Val Lys Ser Val Tyr Ser Leu
                165                 170                 175

Thr Val Thr Ser Ala Glu Lys Ser Ala Leu Thr Thr Met Leu Asn Thr
            180                 185                 190

Cys

<210> SEQ ID NO 60
<211> LENGTH: 199
<212> TYPE: PRT
<213> ORGANISM: Unknown
<220> FEATURE:
<223> OTHER INFORMATION: Xanthan alkaline community D

<400> SEQUENCE: 60

Asp Thr Asp Pro Glu Pro Val Ala Gly Ser Ala Leu Glu Ala Leu Ala
1               5                   10                  15

Gly Leu Glu Val Lys Gly Pro Gly Pro Asp Thr Gly Tyr Glu Arg Ala
            20                  25                  30

Leu Phe Gly Pro Pro Trp Ala Asp Val Asp Gly Asn Gly Cys Asp Thr
        35                  40                  45

Arg Asn Asp Ile Leu Ala Arg Asp Leu Thr Asp Leu Thr Phe Ser Thr
    50                  55                  60

Arg Gly Asp Val Cys Glu Val Arg Thr Gly Thr Phe Asp Asp Pro Tyr
65                  70                  75                  80

Thr Gly Glu Thr Ile Asp Phe Arg Arg Gly Asn Ala Thr Ser Ala Ala

```
                    85                  90                  95
Val Gln Ile Asp His Val Val Pro Leu Leu Asp Ala Trp Arg Lys Gly
            100                 105                 110

Ala Arg Ala Trp Asp Asp Glu Thr Arg Arg Gln Phe Ala Asn Asp Pro
            115                 120                 125

Leu Asn Leu Leu Ala Ser Asp Gly Pro Ala Asn Gln Ser Lys Gly Ala
            130                 135                 140

Arg Asp Ala Ser Ala Trp Leu Pro Pro Asn His Ala Phe Arg Cys Pro
145                 150                 155                 160

Tyr Val Ala Arg Gln Ile Ala Val Lys Ala Ala Tyr Glu Leu Ser Val
                165                 170                 175

Thr Pro Ser Glu Ser Glu Ala Met Ala Arg Val Leu Ala Asp Cys Pro
            180                 185                 190

Ala Glu Pro Leu Pro Ala Gly
            195

<210> SEQ ID NO 61
<211> LENGTH: 199
<212> TYPE: PRT
<213> ORGANISM: Unknown
<220> FEATURE:
<223> OTHER INFORMATION: Xanthan alkaline community 0

<400> SEQUENCE: 61

Asp Asp Glu Pro Glu Pro Ala Arg Gly Ser Ala Leu Glu Ala Leu Ala
1               5                   10                  15

Arg Leu Glu Val Val Gly Pro Gly Pro Asp Thr Gly Tyr Glu Arg Glu
            20                  25                  30

Leu Phe Gly Pro Ala Trp Ala Asp Val Asp Gly Asn Gly Cys Asp Thr
            35                  40                  45

Arg Asn Asp Ile Leu Ala Arg Asp Leu Thr Asp Leu Thr Phe Ser Thr
50                  55                  60

Arg Gly Glu Val Cys Glu Val Arg Thr Gly Thr Phe Gln Asp Pro Tyr
65                  70                  75                  80

Thr Gly Glu Thr Ile Asp Phe Arg Arg Gly Asn Ala Thr Ser Met Ala
                85                  90                  95

Val Gln Ile Asp His Val Val Pro Leu Met Asp Ala Trp Arg Lys Gly
            100                 105                 110

Ala Arg Ala Trp Asp Asp Glu Thr Arg Arg Gln Phe Ala Asn Asp Pro
            115                 120                 125

Leu Asn Leu Leu Ala Ser Asp Gly Pro Ala Asn Gln Ser Lys Gly Ala
            130                 135                 140

Arg Asp Ala Ser Ala Trp Leu Pro Pro Asn His Ala Phe Arg Cys Pro
145                 150                 155                 160

Tyr Val Ala Arg Gln Ile Ala Val Lys Thr Ala Tyr Glu Leu Ser Val
                165                 170                 175

Thr Pro Ser Glu Ser Glu Ala Met Ala Arg Val Leu Ala Asp Cys Pro
            180                 185                 190

Ala Glu Pro Val Pro Ala Gly
            195

<210> SEQ ID NO 62
<211> LENGTH: 186
<212> TYPE: PRT
<213> ORGANISM: Clavicipitaceae sp. 70249

<400> SEQUENCE: 62
```

```
Val Pro Val Pro Ala Pro Pro Gly Ile Pro Ser Thr Ser Thr Ala Lys
1               5                   10                  15

Thr Leu Leu Ala Gly Leu Lys Val Ala Thr Pro Leu Ser Gly Asp Gly
                20                  25                  30

Tyr Ser Arg Asp Lys Phe Pro Thr Trp Glu Thr Ile Gln Gly Thr Cys
            35                  40                  45

Asn Ala Arg Glu Phe Val Ile Lys Arg Asp Gly Thr Asp Val Lys Thr
        50                  55                  60

Asn Ser Ala Cys Val Ala Glu Ser Gly Asn Trp Val Ser Pro Tyr Asp
65                  70                  75                  80

Gly Val Lys Phe Thr Ala Ala Arg Asp Leu Asp Ile Asp His Met Val
                85                  90                  95

Pro Leu Lys Asn Ala Trp Ile Ser Gly Ala Ser Gln Trp Thr Thr Glu
            100                 105                 110

Gln Arg Lys Ala Leu Ala Asn Asp Ile Thr Arg Pro Gln Leu Trp Ala
        115                 120                 125

Val Ser Ala His Ala Asn Arg Gly Lys Ser Asp Asp Ser Pro Asp Glu
130                 135                 140

Trp Lys Pro Pro Leu Lys Thr Phe Trp Cys Thr Tyr Ala Lys Ser Trp
145                 150                 155                 160

Val Gln Val Lys Ser Phe Tyr Lys Leu Thr Ile Thr Asp Thr Glu Lys
                165                 170                 175

Gly Ala Leu Ala Gly Met Leu Asp Thr Cys
                180                 185

<210> SEQ ID NO 63
<211> LENGTH: 187
<212> TYPE: PRT
<213> ORGANISM: Westerdykella sp. AS85-2

<400> SEQUENCE: 63

Phe Pro Ala Pro Ala Ser Val Leu Glu Ala Arg Ala Pro Pro Asn Ile
1               5                   10                  15

Pro Ser Ala Ser Thr Ala Gln Ser Leu Leu Val Gly Leu Thr Val Gln
                20                  25                  30

Pro Gln Gly Pro Gln Asp Gly Tyr Ser Arg Asp Leu Phe Pro His Trp
            35                  40                  45

Ile Thr Ile Ser Gly Thr Cys Asn Thr Arg Glu Thr Val Leu Lys Arg
        50                  55                  60

Asp Gly Ser Asn Val Val Thr Asn Ser Ala Cys Ala Ala Thr Ser Gly
65                  70                  75                  80

Thr Trp Tyr Ser Pro Tyr Asp Gly Ala Thr Trp Thr Ser Ala Ser Asp
                85                  90                  95

Val Asp Ile Asp His Leu Val Pro Leu Ser Asn Ala Trp Lys Ser Gly
            100                 105                 110

Ala Ala Ser Trp Thr Thr Ala Lys Arg Gln Gln Phe Ala Asn Asp Leu
        115                 120                 125

Thr Asn Pro Gln Leu Leu Ala Val Thr Asp Arg Val Asn Gln Ala Lys
130                 135                 140

Gly Asp Lys Gly Pro Glu Ala Trp Lys Pro Ser Leu Ala Ser Tyr His
145                 150                 155                 160

Cys Thr Tyr Ala Lys Met Trp Val Lys Val Lys Ser Lys Asp Val Arg
                165                 170                 175

Leu Thr Gly Asn Trp Thr Lys Asp Asp Gly Trp
```

180             185

<210> SEQ ID NO 64
<211> LENGTH: 194
<212> TYPE: PRT
<213> ORGANISM: Humicolopsis cephalosporioides

<400> SEQUENCE: 64

Ala Pro Thr Pro Ala Pro Val Glu Leu Glu Arg Arg Thr Pro Pro Asn
1               5                   10                  15

Ile Pro Thr Thr Ala Ser Ala Lys Ser Leu Leu Ala Gly Leu Thr Val
            20                  25                  30

Ala Ala Gln Gly Pro Gln Thr Gly Tyr Ser Arg Asp Leu Phe Pro His
        35                  40                  45

Trp Ile Thr Ile Ser Gly Ser Cys Asn Thr Arg Glu Thr Val Leu Lys
50                  55                  60

Arg Asp Gly Thr Gly Val Val Thr Asp Ser Ala Cys Ala Ser Thr Ala
65                  70                  75                  80

Gly Ser Trp Tyr Ser Pro Tyr Asp Gly Ala Thr Trp Thr Ala Ala Ser
                85                  90                  95

Asp Val Asp Ile Asp His Met Val Pro Leu Ser Asn Ala Trp Lys Ser
            100                 105                 110

Gly Ala Ala Gln Trp Thr Thr Ala Arg Arg Gln Asp Phe Ala Asn Asp
        115                 120                 125

Leu Thr Asn Pro Gln Leu Phe Ala Val Thr Asp Asn Val Asn Gln Glu
130                 135                 140

Lys Gly Asp Lys Gly Pro Glu Asp Trp Lys Pro Ser Leu Thr Ser Tyr
145                 150                 155                 160

Tyr Cys Thr Tyr Ala Lys Ala Trp Val Lys Val Lys Ser Val Trp Ala
                165                 170                 175

Leu Thr Ile Thr Ser Ala Glu Lys Ser Ala Leu Thr Thr Met Leu Asn
            180                 185                 190

Thr Cys

<210> SEQ ID NO 65
<211> LENGTH: 190
<212> TYPE: PRT
<213> ORGANISM: Neosartorya massa

<400> SEQUENCE: 65

Ile Pro Ala Pro Val Ala Leu Pro Thr Pro Gly Ile Pro Ser Ala
1               5                   10                  15

Ala Thr Ala Glu Ser Glu Leu Ala Ala Leu Thr Val Ala Ala Gln Gly
            20                  25                  30

Ser Ser Ser Gly Tyr Ser Arg Asp Leu Phe Pro His Trp Ile Ser Gln
        35                  40                  45

Gly Gly Ser Cys Asn Thr Arg Glu Val Val Leu Ala Arg Asp Gly Ser
50                  55                  60

Gly Val Val Lys Asp Ser Asn Cys Tyr Pro Thr Ser Gly Ser Trp Tyr
65                  70                  75                  80

Ser Pro Tyr Asp Gly Ala Thr Trp Thr Gln Ala Ser Asp Val Asp Ile
                85                  90                  95

Asp His Val Val Pro Leu Ala Asn Ala Trp Arg Ser Gly Ala Ser Lys
            100                 105                 110

Trp Thr Thr Ser Gln Arg Gln Ala Phe Ala Asn Asp Leu Thr Asn Pro
        115                 120                 125

```
Gln Leu Met Ala Val Thr Asp Asn Val Asn Gln Ala Lys Gly Asp Asp
    130                 135                 140

Gly Pro Glu Ala Trp Lys Pro Pro Leu Thr Ser Tyr Tyr Cys Thr Tyr
145                 150                 155                 160

Ala Lys Met Trp Val Arg Val Lys Tyr Val Tyr Asp Leu Thr Ile Thr
                165                 170                 175

Ser Ala Glu Lys Ser Ala Leu Val Ser Met Leu Asp Thr Cys
            180                 185                 190

<210> SEQ ID NO 66
<211> LENGTH: 191
<212> TYPE: PRT
<213> ORGANISM: Roussoella intermedia

<400> SEQUENCE: 66

Ala Pro Thr Pro Ala Leu Leu Pro Arg Ala Pro Asn Ile Pro Ser
1               5                   10                  15

Thr Ala Thr Ala Lys Ser Gln Leu Ala Ala Leu Thr Val Ala Ala Gln
                20                  25                  30

Gly Pro Gln Asp Gly Tyr Ser Arg Asp Leu Phe Pro His Trp Ile Thr
            35                  40                  45

Gln Ser Gly Ser Cys Asn Thr Arg Glu Val Val Leu Lys Arg Asp Gly
50                  55                  60

Thr Asn Val Val Gln Asp Ser Ser Cys Ala Ala Thr Ser Gly Thr Trp
65                  70                  75                  80

Val Ser Pro Phe Asp Gly Ala Thr Trp Thr Ala Ala Ser Asp Val Asp
                85                  90                  95

Ile Asp His Leu Val Pro Leu Ser Asn Ala Trp Lys Ser Gly Ala Ala
            100                 105                 110

Ser Trp Thr Thr Ala Arg Arg Gln Ser Phe Ala Asn Asp Leu Thr Asn
        115                 120                 125

Pro Gln Leu Leu Ala Val Thr Asp Glu Val Asn Gln Ala Lys Gly Asp
    130                 135                 140

Lys Gly Pro Glu Ala Trp Lys Pro Pro Leu Ala Ser Tyr His Cys Thr
145                 150                 155                 160

Tyr Ala Lys Met Trp Val Lys Val Lys Ser Thr Tyr Ser Leu Thr Ile
                165                 170                 175

Thr Ser Ala Glu Lys Ser Ala Leu Thr Thr Met Leu Asn Thr Cys
            180                 185                 190

<210> SEQ ID NO 67
<211> LENGTH: 191
<212> TYPE: PRT
<213> ORGANISM: Pleosporales sp.

<400> SEQUENCE: 67

Leu Pro Thr Pro Ser Leu Val Lys Arg Thr Pro Asn Ile Pro Ser
1               5                   10                  15

Thr Thr Ser Ala Lys Ser Leu Leu Ala Gly Leu Thr Val Ala Ala Gln
                20                  25                  30

Gly Pro Gln Asp Gly Tyr Ser Arg Asp Leu Phe Pro His Trp Ile Thr
            35                  40                  45

Ile Ser Gly Thr Cys Asn Thr Arg Glu Thr Val Leu Lys Arg Asp Gly
        50                  55                  60

Thr Asn Val Val Thr Asp Ser Ala Cys Ala Ser Thr Ser Gly Ser Trp
65                  70                  75                  80
```

```
Tyr Ser Thr Tyr Asp Gly Ala Thr Trp Thr Ala Ala Ser Asp Val Asp
                85                  90                  95

Ile Asp His Val Val Pro Leu Ser Asn Ala Trp Lys Ser Gly Ala Ala
            100                 105                 110

Ser Trp Thr Thr Ala Arg Arg Gln Ser Phe Ala Asn Asp Leu Thr Asn
        115                 120                 125

Pro Gln Leu Ile Ala Val Thr Asp Ser Val Asn Gln Ser Lys Gly Asp
    130                 135                 140

Lys Gly Pro Glu Ser Trp Lys Pro Pro Leu Thr Ser Tyr His Cys Thr
145                 150                 155                 160

Tyr Ala Lys Met Trp Val Lys Val Lys Asp Val Tyr Ser Leu Thr Val
                165                 170                 175

Thr Ser Ala Glu Lys Ser Ala Leu Thr Thr Met Leu Asn Thr Cys
            180                 185                 190

<210> SEQ ID NO 68
<211> LENGTH: 192
<212> TYPE: PRT
<213> ORGANISM: Phaeosphaeria sp.

<400> SEQUENCE: 68

Leu Pro Ala Pro Ile His Leu Thr Ala Arg Ala Pro Asn Ile Pro
1               5                   10                  15

Ser Ala Ser Glu Ala Arg Thr Gln Leu Ala Gly Leu Thr Val Ala Ala
                20                  25                  30

Gln Gly Pro Gln Asp Gly Tyr Ser Arg Asp Leu Phe Pro His Trp Ile
            35                  40                  45

Thr Gln Ser Gly Thr Cys Asn Thr Arg Glu Thr Val Leu Lys Arg Asp
        50                  55                  60

Gly Thr Asn Val Val Thr Asn Ser Ala Cys Ala Ser Thr Ser Gly Ser
65                  70                  75                  80

Trp Phe Ser Pro Tyr Asp Gly Ala Thr Trp Thr Ala Ala Ser Asp Val
                85                  90                  95

Asp Ile Asp His Met Val Pro Leu Ser Asn Ala Trp Lys Ser Gly Ala
            100                 105                 110

Ala Ser Trp Thr Thr Ala Arg Arg Gln Ala Phe Ala Asn Asp Leu Thr
        115                 120                 125

Asn Pro Gln Leu Leu Ala Val Thr Asp Asn Val Asn Gln Ala Lys Gly
    130                 135                 140

Asp Lys Gly Pro Glu Asp Trp Lys Pro Pro Leu Thr Ser Tyr Tyr Cys
145                 150                 155                 160

Thr Tyr Ala Arg Met Trp Val Lys Val Lys Ser Val Tyr Ala Leu Thr
                165                 170                 175

Val Thr Ser Ala Glu Lys Ser Ala Leu Thr Ser Met Leu Gly Thr Cys
            180                 185                 190

<210> SEQ ID NO 69
<211> LENGTH: 189
<212> TYPE: PRT
<213> ORGANISM: Didymosphaeria futilis

<400> SEQUENCE: 69

Leu Pro Thr Pro Asn Thr Leu Glu Ala Arg Ala Pro Asn Ile Pro
1               5                   10                  15

Ser Thr Ser Ala Ala Gln Ser Gln Leu Ser Ala Leu Thr Val Ala Ala
                20                  25                  30
```

```
Gln Gly Pro Gln Thr Gly Tyr Ser Arg Asp Leu Phe Pro His Trp Ile
        35                  40                  45

Thr Gln Ser Gly Thr Cys Asn Thr Arg Glu Thr Val Leu Lys Arg Asp
 50                  55                  60

Gly Thr Asn Val Leu Thr Asp Ser Ala Cys Ala Ser Thr Ser Gly Ser
 65                  70                  75                  80

Trp Lys Ser Pro Tyr Asp Gly Ala Thr Trp Thr Ala Ala Ser Asp Val
                85                  90                  95

Asp Ile Asp His Val Val Pro Leu Ser Asn Ala Trp Lys Ser Gly Ala
                100                 105                 110

Ala Ser Trp Thr Thr Ala Arg Arg Gln Ser Phe Ala Asn Asp Leu Thr
            115                 120                 125

Asn Pro Gln Leu Ile Ala Val Thr Asp Asn Val Asn Gln Ala Lys Gly
            130                 135                 140

Asp Lys Gly Pro Glu Asp Trp Lys Pro Pro Leu Thr Ser Tyr Tyr Cys
145                 150                 155                 160

Thr Tyr Ala Lys Met Trp Val Lys Val Lys Ser Val Tyr Ser Leu Thr
                165                 170                 175

Ile Thr Ser Ala Glu Lys Ser Ala Leu Thr Met Leu Ala
                180                 185

<210> SEQ ID NO 70
<211> LENGTH: 590
<212> TYPE: PRT
<213> ORGANISM: Preussia aemulans

<400> SEQUENCE: 70

Leu Ser Ile Ser Glu Ile Asn Gly Pro Lys Tyr Leu Ser Pro Tyr Ala
 1               5                  10                  15

Gly Gln Thr Val Ser Asn Val Ala Gly Ile Val Thr Ala Lys Gly Pro
                20                  25                  30

Ser Gly Ile Trp Ile Arg Ser Thr Thr Pro Asp Arg Asp Asp Lys Thr
            35                  40                  45

Ser Glu Ser Ile Tyr Val Phe Asn Lys Thr Phe Gly Ala Asn Leu Thr
 50                  55                  60

Val Gly Asp Ser Ile Val Ile Gly Gly Lys Val Glu Glu Tyr Arg Ser
 65                  70                  75                  80

Asn Lys Asp Tyr Val Tyr Leu Thr Glu Ile Ser Ser Pro Val Leu Glu
                85                  90                  95

Ser Lys Ile Ser Ser Gly Asn Ala Val Lys Pro Leu Val Ile Gly Lys
                100                 105                 110

Asp Thr Ser Lys Pro Pro Thr Glu Gln Phe Ser Ser Leu Asp Gly Gly
            115                 120                 125

Asp Val Phe Gly Val Pro Asn Asn Val Ser Leu Val Ser Val Ala Asn
            130                 135                 140

Pro Thr Leu Glu Pro Lys Lys Tyr Gly Met Asp Phe Trp Glu Ser Leu
145                 150                 155                 160

Ser Gly Glu Leu Val Thr Val Lys Lys Pro Thr Ala Leu Ser Lys Pro
                165                 170                 175

Ser Asn Phe Gly Asp Thr Trp Val Val Gly Asp Trp Lys Val Thr Gly
                180                 185                 190

Asp Asn Lys Arg Gly Gly Leu Thr Gln Thr Asp Lys Asp Ala Asn Pro
            195                 200                 205

Glu Thr Ile Ile Ile Gly Ser Pro Leu Asp Gly Ser Ser Asn Pro Leu
```

```
            210                 215                 220
Thr Val Lys Leu Gly Asp Glu Leu Ser Glu Ile Thr Gly Val Val Thr
225                 230                 235                 240

Tyr Ala Phe Gly Phe Tyr Arg Ile Leu Pro Thr Thr Ala Leu Lys Val
                245                 250                 255

Val Lys Ser Gln Gln Glu Leu Pro Ser Ala Thr Ser Leu Ile Ser
            260                 265                 270

Ser Gly Lys Cys Asp Gly Leu Thr Phe Gly Ala Tyr Asn Val Glu Asn
            275                 280                 285

Leu Phe Thr Gly Ser Lys His Met Pro Asn Ile Ser Ala His Ile Val
    290                 295                 300

Thr Tyr Leu Lys Ser Pro Asp Phe Ile Phe Ile Gln Glu Val Gln Asp
305                 310                 315                 320

Asp Asn Gly Pro Thr Asn Asp Gly Val Val Ser Ala Asn Ala Thr Leu
                325                 330                 335

Thr Ala Leu Thr Glu Ala Ile Val Ala Ala Gly Gly Pro Gln Tyr Thr
                340                 345                 350

Phe Thr Asp Ile Ala Pro Ser Ser Asn Gln Asp Gly Gly Ala Pro Gly
                355                 360                 365

Gly Asn Ile Arg Val Ala Tyr Leu Tyr Lys Ala Ser Leu Val Arg Leu
370                 375                 380

Tyr Lys Pro Asn Pro Gly Thr Ala Leu Asp Ala Asn Glu Val Leu Ala
385                 390                 395                 400

Gly Pro Thr Leu Lys Phe Asn Pro Gly Arg Ile Asp Pro Thr Asn Glu
                405                 410                 415

Ala Trp Thr Ala Ser Arg Lys Pro Leu Val Ala Glu Trp Glu Val Ile
                420                 425                 430

Ser Lys Asn Gly Lys Asp Gly Gly Lys Phe Phe Thr Val Asn Val His
            435                 440                 445

Phe Gly Ser Lys Gly Gly Ser Ser Ile Gln Gly Asp Ala Arg Pro
        450                 455                 460

Pro Val Asn Gly Gly Ile Glu Asp Arg Leu Ala Gln Ala Gln Leu Thr
465                 470                 475                 480

Ala Asn Phe Val Lys Ala Ile Leu Ala Lys Asp Arg Asn Ala Arg Ile
                485                 490                 495

Ile Thr Ala Gly Asp Phe Asn Glu Phe Ala Ser Val Glu Pro Met Glu
                500                 505                 510

Glu Tyr Val Lys Val Ser Gly Leu Lys Asp Leu Asp Glu Val Thr Lys
                515                 520                 525

Ile Lys Asp Val Glu Arg Tyr Thr Tyr Leu Phe Asp Met Asn Ala Gln
530                 535                 540

Gln Leu Asp His Met Tyr Ile Ser Pro Ala Leu Glu Lys Lys Ala Lys
545                 550                 555                 560

Tyr Glu His Ile His Ile Asn Thr Trp Val Asp Arg Ala Ala Gln Ile
                565                 570                 575

Ser Asp His Asp Pro Ser Val Ala Lys Leu Asp Val Cys Ser
            580                 585                 590

<210> SEQ ID NO 71
<211> LENGTH: 589
<212> TYPE: PRT
<213> ORGANISM: Colletotrichum circinans

<400> SEQUENCE: 71
```

```
Leu Thr Ile Ala Glu Ile Asn Gly Asn Lys Phe Leu Ser Pro Phe Lys
  1               5                  10                  15

Asp Gln Ser Val Thr Asn Val Thr Gly Leu Val Leu Ala Lys Gly Pro
            20                  25                  30

Ser Gly Ile Trp Ile Arg Ser Thr Pro Asp Asp Asp Ala Thr
        35                  40                  45

Ser Glu Ala Val Tyr Val Tyr Gly Ser Thr Val Gly Ala Asn Leu Thr
 50                  55                  60

Val Gly Asp Leu Ile Thr Leu Asp Gly Lys Ile Gln Glu Tyr Arg Ser
 65                  70                  75                  80

Ala Thr Asn Tyr Ile Tyr Leu Thr Glu Leu Ser Ser Pro Lys Asn Val
                85                  90                  95

Val Val Val Ser Lys Gly Asn Glu Val Val Pro Leu Val Ile Gly Val
                100                 105                 110

Asp Thr Leu Asn Pro Pro Thr Glu Gln Tyr Thr Ser Leu Asp Gly Gly
            115                 120                 125

Asp Ile Tyr Ala Val Pro Asn Ala Val Ala Asn Ile Ser Ala Val Asn
        130                 135                 140

Pro Val Leu Glu Pro Thr Leu Tyr Gly Leu Asp Phe Trp Glu Ser Leu
145                 150                 155                 160

Ser Gly Glu Leu Val Thr Val Lys Asn Pro Val Ser Ile Thr Arg Pro
                165                 170                 175

Asn Gln Tyr Gly Asp Thr Trp Val Leu Gly Asp Trp Pro Thr Thr Gly
            180                 185                 190

Arg Asn Thr His Gly Gly Ile Thr Met Thr Asp Lys Asp Ser Asn Pro
        195                 200                 205

Glu Ala Ile Ile Ile Gly Ser Pro Leu Asp Gly Thr Lys Asn Pro Glu
    210                 215                 220

Ser Lys Met Gly Asp Gln Leu Thr Glu Ile Thr Gly Val Val Thr Tyr
225                 230                 235                 240

Ala Phe Gly Phe Tyr Arg Ile Leu Pro Leu Thr Ala Val Ser Ile Ala
                245                 250                 255

Lys Asn Ala Thr Asn Asp Ala Pro Pro Thr Thr Leu Val Ser Arg Gly
            260                 265                 270

Asp Cys Arg Gly Ile Thr Ile Gly Asp Tyr Asn Val Glu Asn Leu Ala
        275                 280                 285

Pro Asn Ser Ala His Leu Pro Ala Val Ala Ala His Ile Val Asp Tyr
    290                 295                 300

Leu Lys Thr Pro Asp Leu Ile Phe Val Gln Glu Val Gln Asp Asn Thr
305                 310                 315                 320

Gly Ala Thr Asn Asn Gly Val Val Ser Ser Asn Val Thr Leu Ser Thr
                325                 330                 335

Leu Ala Ala Ala Ile Glu Ala Lys Ser Gly Val Phe Tyr Asp Phe Val
            340                 345                 350

Val Val Asp Pro Val Asp Gly Lys Asp Gly Gly Ala Pro Gly Gly Asn
        355                 360                 365

Ile Arg Val Ala Tyr Leu Tyr Lys Pro Asp Val Ile Glu Leu Trp Lys
370                 375                 380

Pro Asn Pro Gly Gly Ser Leu Asp Ala Asn Glu Val Leu Pro Gly Pro
385                 390                 395                 400

Gln Leu Lys Tyr Asn Pro Gly Arg Ile Ala Pro Thr Ser Ser Ala Trp
            405                 410                 415

Asp Ala Ser Arg Lys Pro Leu Val Ala Ala Trp Arg Ala Ile Lys Gly
```

```
            420                 425                 430
Pro Gln Asn Lys Ile Phe Phe Thr Val Asn Val His Phe Ala Ser Lys
            435                 440                 445
Gly Gly Ser Ser Ser Leu His Gly Asp Leu Arg Pro Pro Val Asn Gly
            450                 455                 460
Val Val Asn Pro Arg Ile Gln Gln Ala Glu Leu Thr Gly Asn Phe Ile
465                 470                 475                 480
Ala Glu Ile Leu Ala Ala Asp Pro Asn Ala Arg Ile Ile Ala Ala Gly
                485                 490                 495
Asp Phe Asn Glu Phe Ala Phe Val Glu Pro Leu Lys Ala Phe Thr Ala
                500                 505                 510
Lys Ser Gly Leu Ile Asp Leu Asp Glu Ala Val Gly Ile Pro Val Glu
                515                 520                 525
Glu Arg Tyr Thr Tyr Val Tyr Asp Met Asn Ala Gln Glu Leu Asp His
                530                 535                 540
Met Phe Val Ser Pro Ala Leu Ala His Lys Asn Gly Thr Lys Tyr Glu
545                 550                 555                 560
His Ile His Ile Asn Ser Trp Glu Leu Tyr Asp Asp Leu Val Ser Asp
                565                 570                 575
His Asp Pro Ser Val Ala Gln Phe Asn Val Cys Gly Cys
                580                 585

<210> SEQ ID NO 72
<211> LENGTH: 281
<212> TYPE: PRT
<213> ORGANISM: Preussia aemulans

<400> SEQUENCE: 72

Leu Ser Val Pro Arg Ala Ala Pro Ala Ser Ile Asp Leu Arg Pro Asn
1               5                   10                  15
Asp Leu Leu Lys Ser Thr Arg Gly Pro Tyr Gly Pro Asn Gly Arg Gly
                20                  25                  30
Arg Thr Gly Ser Thr Ser Ala Thr Ala Phe Asn Glu Leu Gln Leu Asn
            35                  40                  45
Leu Cys Asn Ser Gly Phe Ala Asn Cys Tyr Ala Asn Gly Asp Ser Ile
        50                  55                  60
Pro Glu Gly Gly Glu Leu Ile Tyr Ala Thr Gly Pro Asn Val Val Thr
65                  70                  75                  80
Ile Asn Glu Ile Cys Ser Asn Asp Val Ser Thr Leu Gln Ser Tyr Leu
                85                  90                  95
Gly Glu Ala Trp Pro Thr Asp Tyr Thr Tyr Ser Val Phe Met Pro Ala
            100                 105                 110
Ile Asp Arg Arg Thr Asn Gln Gln Tyr Lys Cys Lys Asn Gly Ala Gln
        115                 120                 125
Tyr Gly Ser Val Val Leu Gly Arg Val Pro Ser Ala Thr Trp Ser Gly
    130                 135                 140
Ile Asp Ala Tyr Gly Gly Lys Tyr Ser Thr Gln Asp Asp Ser Asn Glu
145                 150                 155                 160
Leu Arg Ile Phe Val Cys Val Ala Ala Arg Gly Asp His Phe Ala Cys
                165                 170                 175
Thr Thr His Leu Thr Ser Lys Ser Glu Pro Leu Ala Met Thr Gln Cys
            180                 185                 190
Lys Ala Leu Met Ser Asp Ala Ile Pro Tyr Leu Lys Ser Gln Ser Gly
        195                 200                 205
```

Ser Thr Thr Arg Thr Val Val Ala Gly Asp Phe Asn Leu Glu Tyr Asp
    210                 215                 220

Thr Gly Asp Ala Glu Asn Met Gln Lys Cys Val Pro Ser Gly Trp Thr
225                 230                 235                 240

Arg Lys Gly Asp Gly Ser Val Gln His Thr Ile Phe Asp Asn Thr Leu
                    245                 250                 255

Lys Phe Gly Ser Ser Lys Lys Tyr Gly Leu Ser Tyr Thr Asp His Asp
                260                 265                 270

Gly Trp Leu Val Lys Met Thr Val Gly
            275                 280

<210> SEQ ID NO 73
<211> LENGTH: 585
<212> TYPE: PRT
<213> ORGANISM: Trichurus spiralis

<400> SEQUENCE: 73

Leu Ser Ile Ala Glu Ile Asn Gly Asn Arg Phe Ile Ser Pro Tyr Asn
1               5                   10                  15

Gly Gln Thr Val Thr Asn Val Glu Gly Leu Val Thr Ala Val Ser Ser
                20                  25                  30

Ala Gly Phe Tyr Leu Arg Ser Thr Lys Ala Asp Arg Asp Ala Ala Thr
            35                  40                  45

Ser Glu Gly Leu Tyr Val Tyr Gly Ser Asn Ala Ala Lys Thr Val Thr
50                  55                  60

Val Gly Asp Ile Ile Thr Val Ser Gly Lys Val Ser Glu Tyr Arg Ser
65                  70                  75                  80

Asn Val Asp Tyr Leu Tyr Leu Thr Glu Leu Thr Ser Pro Gln Asn Ile
                85                  90                  95

Thr Ile Val Ser Ser Gly Ala Lys Val Lys Pro Leu Val Ile Gly Lys
            100                 105                 110

Asp Thr Tyr Ser Pro Pro Thr Ser Lys Phe Ser Ser Leu Asp Glu Gly
            115                 120                 125

Gly Leu Phe Gly Val Pro Asn Asn Val Ser Arg Ile Ser Val Ala Asn
130                 135                 140

Pro Lys Leu Gln Pro Lys Lys Tyr Gly Leu Asp Phe Trp Glu Ser Ile
145                 150                 155                 160

Val Gly Glu Leu Val Thr Ile Lys Glu Ala Tyr Gly Val Gly Arg Pro
                165                 170                 175

Asn Gln Tyr Gly Asp Val Trp Val Arg Gly Asn Trp Lys Val Thr Gly
            180                 185                 190

Lys Asn Lys Gln Gly Gly Leu Thr Met Thr Asp Gly Asp Ala Asn Pro
        195                 200                 205

Glu Thr Ile Ile Ile Gly Thr Pro Leu Asp Ala Ser Lys Asn Pro Thr
    210                 215                 220

Asp Thr Lys Met Gly Asp Tyr Tyr Gly Asp Ile Thr Gly Val Val Ser
225                 230                 235                 240

Tyr Ala Phe Gly Phe Tyr Arg Val Leu Pro Leu Thr His Ile Thr Pro
                245                 250                 255

Glu Arg Asn Ser Ser Ala Ala His Pro Pro Val Ser Phe Thr Ser Lys
            260                 265                 270

Gly Ser Cys Lys Gly Ile Thr Val Ala Asp Tyr Asn Ala Glu Asn Leu
            275                 280                 285

Ala Pro Thr Ser Thr His Leu Pro Gln Val Val Asp Gln Ile Ile Asn
290                 295                 300

Met Leu Lys Thr Pro Asp Leu Leu Phe Leu Gln Glu Val Gln Asp Asn
305                 310                 315                 320

Ser Gly Ser Lys Asn Asp Gly Val Val Ser Ala Asn Val Thr Leu Thr
            325                 330                 335

Thr Leu Val Asp Ser Leu Phe Glu Thr Ser Gly Val Gln Tyr Ala Phe
        340                 345                 350

Ala Glu Val Glu Pro Glu Asn Leu Lys Asp Gly Gln Pro Gly Gly
    355                 360                 365

Asn Ile Arg Val Ala Tyr Leu Tyr Arg Pro Asp Val Val Glu Leu Tyr
370                 375                 380

Lys Pro Asn Gln Gly Gly Ser Asn Asp Ala Asn Glu Val Leu Pro Gly
385                 390                 395                 400

Pro Leu Leu Lys Tyr Asn Pro Gly Arg Ile Asp Pro Ala Asn Ala Ala
                405                 410                 415

Trp Val Asp Ser Arg Lys Pro Leu Val Ala Met Trp Arg Ala Val Lys
            420                 425                 430

Gly Gly Lys Lys Pro Phe Phe Thr Val Asn Val His Phe Thr Ser Lys
            435                 440                 445

Gly Gly Ser Thr Ser Leu His Gly Asp Ala Arg Pro Pro Val Asn Leu
        450                 455                 460

Gly Val Asp Gln Arg Thr Met Gln Ala Glu Val Thr Ala Asp Phe Ile
465                 470                 475                 480

Ala Gln Ile Leu Glu Glu Asp Lys Lys Ala Tyr Val Ile Ala Ala Gly
                485                 490                 495

Asp Phe Asn Glu Phe Val Gln Val Gln Pro Leu Gln Thr Phe Ala Lys
            500                 505                 510

Lys Ser Gly Leu Thr Glu Leu Asp Glu Val Ala Lys Ile Ser Met Asn
515                 520                 525

Glu Arg Tyr Thr Tyr Leu Phe Asp Met Asn Ser Glu Ala Leu Asp His
                535                 540

Met Tyr Val Ser Lys Gly Ile Gly Lys Ser Val Lys Tyr Glu His Met
545                 550                 555                 560

Asn Leu Asn Thr Trp Gln Asn Tyr Asp Asp Gln Val Ser Asp His Asp
                565                 570                 575

Pro Ser Val Ala Arg Phe Asp Leu Cys
            580                 585

<210> SEQ ID NO 74
<211> LENGTH: 592
<212> TYPE: PRT
<213> ORGANISM: Pyrenochaetopsis sp.

<400> SEQUENCE: 74

Thr Thr Ile Ala Glu Ile Asn Gly Pro Ala Phe Leu Ser Pro Phe Lys
1               5                   10                  15

Gly Gln Thr Val Ala Asn Val Ser Gly Ile Ile Thr Ala Lys Gly Pro
            20                  25                  30

Asp Gly Leu Trp Ile Arg Ser Thr Leu Pro Asp Arg Asp Glu Arg Thr
        35                  40                  45

Ser Glu Ser Leu Tyr Val Phe Gly Ser Lys Phe Gly Ala Asn Leu Thr
    50                  55                  60

Val Gly Asp Ser Ile Ile Leu Gly Gly Lys Val Gln Glu Tyr Arg Ser
65                  70                  75                  80

Ser Lys Asp Tyr Ile Tyr Leu Thr Glu Leu Ser Ser Pro Val Leu Ala

```
                    85                  90                  95
Lys Lys Val Ser Ser Gly Asn Lys Val Asp Ala Leu Val Ile Gly Lys
                100                 105                 110

Asp Thr Arg Asp Pro Pro Thr Glu Gln Tyr Ser Ser Leu Asp Gly Gly
                115                 120                 125

Asp Val Phe Ala Val Pro Asn Asn Val Ser Gln Ile Ser Val Ala Asn
            130                 135                 140

Pro Glu Leu Gln Pro Lys Lys Tyr Gly Leu Asp Phe Trp Glu Ser Leu
145                 150                 155                 160

Ser Gly Glu Leu Val Thr Val Lys Lys Pro Thr Ala Leu Thr Lys Pro
                165                 170                 175

Asn Gln Tyr Gly Asp Thr Trp Val Val Gly Asn Trp Lys Val Thr Gly
            180                 185                 190

Arg Asn Asp Arg Asp Gly Leu Thr Leu Thr Asp Lys Ala Asn Pro
            195                 200                 205

Glu Ala Ile Ile Ile Gly Thr Pro Leu Asp Gly Thr Lys Asn Pro Thr
            210                 215                 220

Asp Thr Arg Met Gly Asp Ser Val Asp Glu Ile Thr Gly Val Ile Thr
225                 230                 235                 240

Tyr Ala Phe Gly Tyr Tyr Arg Ile Leu Pro Leu Thr Ala Ile Lys Val
                245                 250                 255

Thr Lys Ser Gln Lys Pro Ala Leu Pro Lys Pro Thr Lys Leu Glu Ser
                260                 265                 270

Lys Gly Lys Cys Asp Gly Ile Thr Phe Gly Asp Tyr Asn Val Glu Asn
            275                 280                 285

Leu Ala Ala Asn Ser Ser His Leu Pro Ser Ile Ala Ala His Ile Val
            290                 295                 300

Asn Tyr Met Lys Ser Pro Asp Val Leu Phe Val Gln Glu Ile Gln Asp
305                 310                 315                 320

Asp Asp Gly Pro Thr Asn Asp Ala Val Val Ser Ala Asn Leu Thr Leu
                325                 330                 335

Ser Thr Leu Val Ala Ala Ile Ser Ser Ala Gly Gly Pro Thr Tyr Ala
            340                 345                 350

Phe Ala Asp Ile Asp Pro Val Asp Asp Gln Asp Gly Gly Glu Pro Gly
            355                 360                 365

Gly Asn Ile Arg Val Ala Tyr Leu Tyr Lys Pro Ser Leu Ile Arg Leu
            370                 375                 380

Tyr Lys Pro Asn Pro Gly Gly Ser Leu Asp Ala Asn Ala Val Asn Asp
385                 390                 395                 400

Gly Pro Thr Leu Lys Tyr Asn Pro Gly Arg Ile Asp Pro Thr Asn Pro
                405                 410                 415

Ala Trp Thr Ala Ser Arg Lys Pro Leu Val Ala Gln Trp Glu Val Ile
                420                 425                 430

Gly Lys Ser Asn Ala Lys Lys Leu Asp Thr Phe Phe Thr Val Asn Val
            435                 440                 445

His Phe Gly Ser Lys Gly Gly Ser Ser Leu His Gly Asp Ala Arg
            450                 455                 460

Pro Pro Val Asn Gly Gly Val Glu Asp Arg Leu Ala Gln Ala Gln Leu
465                 470                 475                 480

Thr Ala Asn Phe Val Lys Asp Ile Leu Ser Lys Asp Lys Asp Ala Arg
            485                 490                 495

Ile Ile Thr Ser Gly Asp Met Asn Glu Phe Ala Phe Val Glu Pro Leu
            500                 505                 510
```

```
Glu Gln Leu Lys Asp Ile Ser Gly Leu Lys Asp Leu Asp Val Glu Ala
            515                 520                 525

Gly Ile Asp Lys Leu Glu Arg Tyr Thr Tyr Leu Phe Asp Met Asn Ala
        530                 535                 540

Gln Gln Leu Asp His Thr Phe Val Ser Lys Ala Ile Ala Lys Glu Asp
545                 550                 555                 560

Pro Lys Tyr Glu His Ile His Ile Asn Thr Trp Val Asp Tyr Ala Asp
                565                 570                 575

Gln Ile Ser Asp His Asp Pro Ser Val Ala Arg Leu Ser Val Cys Ala
            580                 585                 590
```

<210> SEQ ID NO 75
<211> LENGTH: 589
<212> TYPE: PRT
<213> ORGANISM: Aspergillus sydowii

<400> SEQUENCE: 75

```
Val Thr Ile Ser Glu Ile Asn Gly Asn Thr Tyr Leu Ser Pro Phe Lys
1               5                   10                  15

Gly Glu Ser Val Ser Asp Val Glu Gly Leu Val Thr Ala Ile Gly Glu
            20                  25                  30

Asp Gly Phe Tyr Leu Arg Ser Thr Pro Asp Ser Asp Ala Thr
        35                  40                  45

Ser Glu Ser Ile Tyr Val Tyr Gly Ser Ser Ala Val Ser Glu Val Thr
    50                  55                  60

Val Gly Asp Ile Ile Ala Leu Ser Gly Glu Val Ser Glu Tyr Arg Ser
65                  70                  75                  80

Gln Ala Ala Tyr Leu Tyr Leu Thr Glu Ile Thr Ser Pro Ser Ser Ile
                85                  90                  95

Val Val Lys Ser Ser Gly Asn Glu Val Ala Pro Val Ile Gly Lys
            100                 105                 110

Asp Arg Ser Pro Pro Thr Glu Val Tyr Ser Gly Leu Asp Gly Ala Asp
        115                 120                 125

Gly Asp Val Tyr Ala Leu Pro Asn Asn Ala Ser Gln Ile Ser Ala Glu
    130                 135                 140

Asn Pro Val Leu Lys Pro Glu Leu Tyr Gly Met Asp Phe Trp Glu Ser
145                 150                 155                 160

Leu Ser Gly Glu Leu Val Ser Leu Thr Gly Leu Thr Ile Ile Thr Lys
                165                 170                 175

Pro Asn Gln Tyr Gly Asp Val Phe Val Arg Gly Asp Trp Ala Val Ser
            180                 185                 190

Gly Leu Asn Glu Asn Gly Gly Leu Thr Met Ser Ala Asn Asp Ser Asn
        195                 200                 205

Pro Glu Ala Ile Lys Ile Gly Thr Pro Leu Asp Gly Thr Asn Asn Ser
    210                 215                 220

Asp Ser Ser Lys Val Gly Asp Thr Val Glu Asp Val Thr Gly Val Val
225                 230                 235                 240

Gln Trp Lys Phe Gly Gln Tyr Met Val Leu Pro Leu Thr Ala Leu Thr
                245                 250                 255

Val Thr Gly Ser Asn Asp Thr Val Ala Gly Pro Ser Thr Leu Thr Gly
            260                 265                 270

Asp Gly Thr Cys Lys Ser Leu Ser Ile Gly Ala Tyr Asn Val Glu Asn
        275                 280                 285

Leu Thr Pro Thr Ser Thr His Ile Ser Lys Ile Ala Asp His Ile Ala
```

```
            290                 295                 300
Asn Tyr Leu Asn Gly Pro Ala Ile Met Cys Leu Gln Glu Ile Gln Asp
305                 310                 315                 320

Asn Asn Gly Ala Thr Asp Asp Gly Thr Val Thr Ala Asn Leu Thr Leu
                325                 330                 335

Thr Lys Leu Thr Gly Leu Ile Ser Ala Ala Gly Gly Pro Asp Tyr Asn
            340                 345                 350

Phe Thr Glu Ile Pro Pro Val Asn Asn Ala Asp Gly Gly Pro Gly
        355                 360                 365

Gly Asn Ile Arg Val Ala Tyr Leu Tyr Asn Pro Ser Ile Val Arg Leu
    370                 375                 380

His Asn Ala Asn Pro Gly Thr Ser Ala Asp Ala Asn Glu Val Leu Val
385                 390                 395                 400

Ser His Gly Pro Glu Leu Lys Phe Asn Pro Gly Leu Ile Asp Pro Asp
                405                 410                 415

Ser Glu Ala Trp Asp Ala Ser Arg Lys Pro Leu Ala Ala Ala Trp Glu
            420                 425                 430

Thr Val Asp Gly Glu Asn Lys Phe Phe Thr Val Asn Val His Leu Ser
        435                 440                 445

Ser Lys Gly Gly Gly Ser Ala Ile Gln Gly Asp Ala Arg Pro Pro Val
    450                 455                 460

Asn Gly Gly Val Glu Gln Arg Thr Ala Gln Ala Glu Val Ile Ala Ser
465                 470                 475                 480

Phe Val Ser Asp Ile Leu Ala Ala Asp Ala Asn Ala Lys Ile Leu Thr
                485                 490                 495

Thr Gly Asp Phe Asn Glu Phe Ser Phe Val Ser Pro Leu Glu Thr Phe
            500                 505                 510

Val Glu Lys Ser Gly Leu Arg Glu Leu Asp Asp Val Val Gly Ile Pro
        515                 520                 525

Ala Thr Glu Arg Tyr Thr Tyr Ile Tyr Asp Ser Asn His Gln Gln Leu
    530                 535                 540

Asp His Met Phe Val Ser Asp Gly Leu Ala Lys Asn Ala Gln Leu Glu
545                 550                 555                 560

His Val His Val Asn Thr Trp Leu Asn Tyr Asp Asp Ala Ala Ser Asp
                565                 570                 575

His Asp Pro Ser Val Ala Leu Phe Asp Val Cys Glu Leu
            580                 585

<210> SEQ ID NO 76
<211> LENGTH: 597
<212> TYPE: PRT
<213> ORGANISM: Cladosporium cladosporioides

<400> SEQUENCE: 76

Val Thr Ile Ala Ala Ile Asn Gly Asp Arg Phe Leu Ser Pro Leu Asn
1               5                   10                  15

Gly Thr Gly Val Gln Asp Val Ala Gly Leu Val Thr Ala Lys Gly Pro
                20                  25                  30

Asn Gly Phe Trp Ile Arg Ser Pro Glu Pro Asp Thr His Asp Arg Thr
            35                  40                  45

Ser Glu Ser Val Tyr Val Phe Gly Arg Asn Ala Leu Gly Asn Val Thr
        50                  55                  60

Val Gly Asp Leu Ile Ser Val Asp Gly Asn Val Thr Glu Tyr Arg Ser
65                  70                  75                  80
```

```
Ser Lys Asp Tyr Ala Tyr Leu Thr Glu Ile Asn Pro Arg Asn Ile
                85                  90                  95

Arg Val Val Ser Ser Gly Asn Glu Val Lys Pro Val Ile Gly Ser
            100                 105                 110

Lys Thr Ser Gly Ile Ile Gly Lys Arg Asp Val Gln Pro Pro Arg Glu
            115                 120                 125

Gln Phe Ser Gly Leu Asp Asn Gly Asp Val Phe Ala Val Pro Asn Asn
            130                 135                 140

Gln Ser Leu Ile Ser Gln Ala Asn Pro Arg Leu Glu Pro Asn Leu Tyr
145                 150                 155                 160

Gly Met Asp Phe Trp Glu Ser Leu Ser Gly Glu Leu Val Thr Ile Lys
            165                 170                 175

Gly Val Thr Ala Leu Gly Arg Gln Ala Asn Thr Phe Gly Asp Gln Trp
            180                 185                 190

Val Arg Gly Asp Trp Lys Ser Ser Gly Lys Asn Ser Arg Gly Gly Leu
            195                 200                 205

Thr Val Thr Asp Arg Asp Ser Asn Pro Glu Ser Ile Ile Ile Gly Ala
            210                 215                 220

Pro Leu Asp Gly Ser Ser Asn Ser Lys Glu Thr Lys Leu Gly Asp Glu
225                 230                 235                 240

Leu Glu Asp Ile Thr Gly Ile Val Thr Tyr Val Phe Gly Phe Tyr Ala
            245                 250                 255

Ile Phe Pro Gln Thr Gly Thr Lys Val Lys Arg Ser Ile Asp Ala Phe
            260                 265                 270

Pro Pro Pro Ser Ser Ile Val Ser Asn Gly Lys Cys Ser Gly Leu Thr
            275                 280                 285

Phe Gly Gln Tyr Asn Ile Glu Asn Phe Ala Pro Asn Asn Ser Arg Val
            290                 295                 300

Pro Leu Ile Ala Glu His Ile Val Asp Tyr Leu Asn Thr Pro Ser Val
305                 310                 315                 320

Met Phe Leu Gln Glu Val Gln Asp Asn Ser Gly Glu Ala Asn Asp Gly
            325                 330                 335

Val Val Asn Ser Asn Leu Thr Leu Ala Ser Leu Ser Gln Ala Ile Ser
            340                 345                 350

Glu Ile Ser Gly Val Asp Tyr Leu Trp Val Asn Val Asp Pro Val Asn
            355                 360                 365

Asn Gln Asp Gly Gly Ala Pro Gly Gly Asn Ile Gln Thr Pro Tyr Leu
            370                 375                 380

Tyr Asn Pro Leu Gln Val Arg Leu Leu Asn Ala Asn Pro Gly Gly Pro
385                 390                 395                 400

Asn Asp Arg Asn Glu Val Leu Pro Gly Pro Thr Leu Arg Phe Asn Pro
            405                 410                 415

Gly Arg Ile Asp Asp Gly Val Thr Phe Ser Asn Ser Arg Lys Pro Ile
            420                 425                 430

Val Ala His Trp Glu Met Val Asp Gly Ser Gly Thr Phe Phe Thr Val
            435                 440                 445

Asn Asn His Trp Thr Ser Lys Gly Gly Ser Thr Ser Leu Gln Gly Asp
            450                 455                 460

Ala Arg Pro Pro Val Asn Gly Gly Val Asp Arg Arg Ile Arg Gln Ala
465                 470                 475                 480

Glu Val Thr Gly Ser Phe Ile Ala Glu Ile Leu Lys Gln Asp Lys Asn
            485                 490                 495

Ala Ala Ile Ile Val Ala Gly Asp Leu Asn Glu Phe Ala Thr Val Ala
```

```
            500                 505                 510
Pro Leu Arg Arg Phe Val Glu Val Ser Gly Leu Lys Asp Leu Asp Val
        515                 520                 525

Val Ala Lys Ile Pro Glu Leu Glu Arg Tyr Ser Tyr Thr Phe Gly Ala
    530                 535                 540

Ser Gln Gln Gln Leu Asp His Val Tyr Ala Ser Ala Trp Ala Ser Arg
545                 550                 555                 560

Lys Val Gly Lys Gly Asp Phe Glu His Val His Val Asn Thr Trp Val
                565                 570                 575

Ala Glu Glu Asp Val Gly Ser Asp His Asp Pro Ala Val Ala Arg Leu
            580                 585                 590

Asn Val Cys Ser Thr
            595

<210> SEQ ID NO 77
<211> LENGTH: 600
<212> TYPE: PRT
<213> ORGANISM: Rhinocladiella sp.

<400> SEQUENCE: 77

Leu Thr Ile Ala Glu Ile Asn Gly Asn Lys Tyr Leu Ser Pro Tyr Ala
1               5                   10                  15

Gly Gln Ala Val Thr Asn Ile Ser Gly Leu Val Thr Ala Lys Gly Pro
            20                  25                  30

Ser Gly Ile Phe Ile Arg Ser Thr Pro Asp Ser Asp Pro Ala Thr
        35                  40                  45

Ser Glu Ser Val Tyr Val Phe Gly Ser Asn Ala Gly Arg Asn Val Thr
    50                  55                  60

Val Gly Asp Val Ile Thr Leu Asp Gly Thr Val Thr Glu Phe Arg Ser
65                  70                  75                  80

Thr Ser Asn Pro Thr Tyr Leu Phe Leu Thr Glu Ile Thr Ser Pro Arg
                85                  90                  95

Asn Val Lys Thr Val Ser Ser Gly Asn His Val Ala Pro Leu Val Ile
            100                 105                 110

Gly Lys Asp Thr Ser Ala Pro Pro Thr Gln Gln Phe Ser Gly Leu Asp
        115                 120                 125

Asp Gly Asp Ala Leu Gly Val Pro Asn Asn Ala Ser Leu Ile Ser Val
    130                 135                 140

Thr Asn Pro Glu Leu Lys Pro Ser Glu Phe Gly Met Asp Phe Trp Glu
145                 150                 155                 160

Ser Leu Ser Gly Glu Leu Val Thr Ile Lys Gly Ala Lys Ala Ile Ser
                165                 170                 175

Lys Pro Asn Asn Phe Gly Asp Thr Trp Val Thr Gly Asp Trp Lys Val
            180                 185                 190

Thr Gly Arg Asn Ala Arg Gly Gly Leu Thr Met Thr Lys Asn Asp Ser
        195                 200                 205

Asn Pro Glu Ala Ile Ile Ile Gly Thr Pro Leu Asp Gly Thr Arg Asn
    210                 215                 220

Ala Asn Gly Thr Lys Leu Gly Asp Ser Leu Glu Asp Ile Thr Gly Val
225                 230                 235                 240

Ile Thr Tyr Gly Phe Gly Phe Tyr Arg Ile Leu Pro Val Thr Gly Ile
                245                 250                 255

Lys Val Thr Gly Ser Ala Gln Pro Ala Leu Pro Pro Ser Thr Thr Leu
            260                 265                 270
```

```
Lys Ala Gly Lys Ser Cys Arg Asp Leu Thr Phe Gly Ser Tyr Asn Val
            275                 280                 285

Glu Asn Leu Ser Pro Thr Lys Ser Ile Leu Pro Ser Ile Ala Ser His
        290                 295                 300

Ile Ala Asn Val Met Lys Ala Pro Ser Leu Val Phe Leu Gln Glu Ile
305                 310                 315                 320

Gln Asp Asn Asn Gly Ala Val Asn Asp Ala Val Val Asp Ala Asn Leu
                325                 330                 335

Thr Leu Ser Thr Leu Ala Ala Glu Val Asn Arg Leu Ser Gly Val Asn
            340                 345                 350

Tyr Ala Tyr Val Asp Val Asp Pro Val Asp Gln Asp Gly Gly Glu
        355                 360                 365

Pro Gly Gly Asn Ile Arg Thr Ala Tyr Phe Tyr Asp Pro Thr Val Leu
    370                 375                 380

Arg Leu Arg Asn Pro Asn Pro Gly Ser Pro Thr Asp Ala Asn Glu Val
385                 390                 395                 400

Leu Gln Gly Asp Val Leu Arg Gly Pro Glu Leu Lys Tyr Asn Pro Gly
                405                 410                 415

Arg Ile Asp Pro Thr Asn Ala Ala Trp Glu Arg Ser Arg Lys Pro Leu
            420                 425                 430

Thr Ala Val Trp Glu Thr Leu Asp Gly Arg Asn Lys Phe Phe Thr Ile
        435                 440                 445

Asn Val His Phe Ala Ser Lys Gly Gly Ser Ser Val Gln Gly Asp
    450                 455                 460

Pro Arg Pro Pro Ile Asn Gly Val Ile Asp Val Arg Thr Gln Gln Ala
465                 470                 475                 480

Gln Ile Thr Ala Glu Phe Ile Arg Asp Ile Leu Arg Lys Asp Pro Thr
                485                 490                 495

Ser Ser Val Ile Ile Ala Gly Asp Phe Asn Glu Phe Ala Phe Val Gln
            500                 505                 510

Pro Leu Glu Gly Phe Ser Lys Thr Ser Trp Met Gln Asp Leu Asp Ala
        515                 520                 525

Val Ala Gly Ile Lys Pro Glu Glu Arg Tyr Thr Tyr Leu Phe Asp Met
    530                 535                 540

Asn Cys Gln Gln Leu Asp His Met Tyr Val Ser Pro Val Leu Ala Ala
545                 550                 555                 560

Lys Lys Tyr Ile Gly Arg Val Lys Tyr Glu His Ile His Ile Asn Thr
                565                 570                 575

Trp Glu Thr Arg Ala Gly Gln Ile Ser Asp His Asp Pro Ser Val Ala
            580                 585                 590

Gln Leu Asp Val Cys Arg Leu Phe
        595                 600

<210> SEQ ID NO 78
<211> LENGTH: 588
<212> TYPE: PRT
<213> ORGANISM: Pyronema domesticum

<400> SEQUENCE: 78

Val Ser Ile Ala Glu Ile Asn Gly Pro Ala Phe Leu Ser Pro Tyr Ala
1               5                   10                  15

Gly Lys Ser Val Thr Asp Ile Thr Gly Leu Val Thr Ala Val Gly Pro
            20                  25                  30

Ser Gly Phe Phe Leu Arg Asp Val Ala Ser Thr Ser Ser Arg Leu Arg
        35                  40                  45
```

```
Arg Asn Gln Ser Gly Ser Gln Ala Val Tyr Val Phe Asn Ser Ala Ala
    50                  55                  60

Ala Lys Asn Val Thr Ala Gly Asp Ile Ile Asn Ile Asn Ser Ala Ser
65                  70                  75                  80

Val Val Glu Tyr Gln Asn Asn Gln Ala Tyr Ile Pro Leu Thr Glu Ile
                    85                  90                  95

Thr Asn Pro Ser Ala Ile Gln Ile Val Ser Lys Gly His Glu Val Ile
                100                 105                 110

Pro Ile Pro Leu Gly Arg Asn Gly Leu Gln Pro Pro Thr Gly Gln Phe
            115                 120                 125

Ser Ala Leu Asp Asn Gly Asp Ile Phe Gly Leu Pro Asn Gly Ala Ser
        130                 135                 140

Lys Ile Ser Ser Thr Asn Ala Thr Leu Val Pro Thr Lys Phe Gly Leu
145                 150                 155                 160

Asp Phe Trp Glu Ser Leu Ser Gly Glu Phe Val Gly Ile Ser Ser Pro
                165                 170                 175

Thr Ala Leu Gly Pro Thr Ser Arg Tyr Gly Asp Ile Trp Ile Arg Gly
            180                 185                 190

Asp Trp Glu Val Thr Gly Leu Asn Ser Ala Gly Gly Leu Thr Ile Thr
        195                 200                 205

Thr Gly Thr Ser Ser Asp Ala Asn Pro Glu Thr Ile Ile Ile Gly Ser
    210                 215                 220

Pro Leu Asp Gly Thr Lys Asn Pro Ser Val Lys Leu Gly Asp Ile Leu
225                 230                 235                 240

Asn Pro Ile Gln Gly Val Ile Thr Tyr Gly Phe Gly Phe Tyr Arg Leu
                245                 250                 255

Leu Pro Thr Thr Ala Ile Ser Ile Lys Ser Ala Arg Asn Ala Thr Thr
            260                 265                 270

Pro Val Thr Thr Leu Lys Ser Glu Lys Ser Cys Lys Ala Val Thr Ile
        275                 280                 285

Gly Gln Tyr Asn Val Glu Asn Leu Ser Pro Ser Ser Ser His Leu Asn
    290                 295                 300

Ala Ile Ala Asp His Ile Gly Tyr Asn Met Gly Ser Pro Asp Leu Ile
305                 310                 315                 320

Tyr Val Gln Glu Leu Gln Asp Asn Ser Gly Ala Thr Asn Asp Gly Ile
                325                 330                 335

Thr Ser Gly Asn Met Thr Leu Ala Ala Leu Ala Tyr Ala Ile Glu Gly
            340                 345                 350

Ile Ser Gly Ile Gln Tyr His Trp Ala Glu Val Asp Pro Glu Asp Asn
        355                 360                 365

Leu Asp Gly Gly Gln Pro Gly Asn Ile Arg Val Ala Tyr Leu Tyr
    370                 375                 380

Asn Pro Ser Val Phe Ser Ile Ser Gly Thr Pro Gly Thr Ala Ser Glu
385                 390                 395                 400

Ala Thr Thr Val Gln Pro Gly Pro Ser Leu Ser Leu Asn Pro Gly Arg
                405                 410                 415

Ile Asp Pro Gln Asn Val Ala Phe Thr Asn Ser Arg Lys Pro Leu Val
            420                 425                 430

Ala Gln Phe Ser Val Glu Gly Thr Gln Lys Pro Phe Phe Ala Ile Asn
        435                 440                 445

Val His Ser Gly Ser Lys Gly Gly Ser Ser Ser Leu His Gly Asp Ala
    450                 455                 460
```

```
Arg Pro Pro Met Asn Gly Gly Ile Glu Asp Arg Ile Ala Gln His Glu
465                 470                 475                 480

Ala Ile Ala Ser Phe Ile Gln Ala Leu Lys Lys Glu Asp Glu Asn Val
            485                 490                 495

Asn Ile Leu Ala Ala Gly Asp Phe Asn Glu Phe Ser Gly Val Ala Pro
        500                 505                 510

Met Glu Val Phe Arg Asp Leu Met Trp Asp Val Asp Glu Val Val Asp
    515                 520                 525

Val Ser Lys Glu Glu Arg Tyr Thr Tyr Asn Tyr Asp Met Asn Cys Gln
530                 535                 540

Gln Leu Asp His Thr Leu Ile Ser Ala Gly Leu Lys Glu Lys Val Ser
545                 550                 555                 560

Gly Tyr Gln His Leu His Val Asn Thr Trp Ser Glu Val Glu Thr Ser
                565                 570                 575

Asp His Asp Pro Ser Val Gly Val Tyr Asp Leu Cys
                580                 585

<210> SEQ ID NO 79
<211> LENGTH: 585
<212> TYPE: PRT
<213> ORGANISM: Aspergillus niger

<400> SEQUENCE: 79

Val Thr Ile Pro Glu Ile Asn Gly Asp Arg Tyr Val Ser Ser Tyr Gln
1               5                   10                  15

Gly Lys Arg Val Ser Gly Leu Lys Gly Leu Val Thr Ala Lys Gly Ser
                20                  25                  30

Ser Gly Phe Tyr Ile Arg Ala Thr Asp Ala Asp Ser Asp Ser Arg Thr
            35                  40                  45

Ser Asn Ser Ile Tyr Val Tyr Gly Ser Ser Gly Val Ser Gln Val Thr
    50                  55                  60

Val Gly Asp Ile Val Thr Leu Ser Gly Lys Val Thr Glu Tyr Arg Ser
65                  70                  75                  80

Ser Ser Ser Tyr Val Tyr Ser Thr Glu Ile Glu Ser Pro Ser Asp Ile
                85                  90                  95

Gln Val Leu Ser Ser Asp Asn Ile Val Thr Pro Val Ile Gly Lys
                100                 105                 110

Asp Asn Leu Asp Pro Pro Thr Glu Gln Tyr Ser Ser Leu Asp Asn Gly
            115                 120                 125

Asp Val Phe Ser Leu Pro Gly Asn Ser Ser Arg Leu Ser Thr Ala Asn
    130                 135                 140

Pro Val Leu Glu Pro Thr Glu Tyr Gly Met Asp Phe Trp Gln Ser Leu
145                 150                 155                 160

Ser Gly Glu Leu Ala Thr Leu Thr Gly Leu Thr Ala Ile Ser Lys Ala
                165                 170                 175

Asn Ser Tyr Gly Asp Thr Trp Val Ile Gly Asp Trp Pro Val Thr Gly
            180                 185                 190

Lys Asn Asp Arg Gly Gly Leu Thr Met Arg Ala Asn Asp Ser Asn Pro
    195                 200                 205

Glu Ser Ile Val Ile Gly Ser Pro Leu Asp Gly Thr Lys Asn Pro Thr
210                 215                 220

Asp Thr Lys Leu Gly Asp Thr Leu Glu Asp Ile Thr Gly Ile Ile Thr
225                 230                 235                 240

Gln Ala Tyr Gly Phe Tyr Thr Leu Leu Pro Leu Thr Ala Leu Thr Lys
                245                 250                 255
```

```
Thr Gly Ser Asn Thr Thr Glu Ala Thr Ala Thr Leu Gln Ala Asp
            260                 265                 270

Gly Thr Cys Ser Ser Ile Thr Ile Gly Asp Tyr Asn Val Asp Asn Phe
        275                 280                 285

Ser Pro Gln Ser Ser Thr Met Ser Gly Ile Gly Glu His Ile Ala Lys
    290                 295                 300

Tyr Leu Asn Ser Pro Thr Val Leu Phe Leu Gln Glu Ile Gln Asp Asn
305                 310                 315                 320

Ser Gly Ala Thr Asp Asp Gly Val Val Ser Ala Asn Glu Thr Leu Ser
                325                 330                 335

Lys Leu Ala Ser Ala Val Lys Glu His Gly Gly Val Ala Tyr Asn Tyr
            340                 345                 350

Thr Asp Ile Asp Pro Glu Asn Asp Thr Asn Gly Gly Glu Arg Gly Gly
        355                 360                 365

Asn Ile Arg Pro Ala Tyr Leu Phe Asp Pro Ser Val Val Arg Leu Arg
    370                 375                 380

Asn Tyr Asn Pro Gly Ser Ser Thr Asp Ser Thr Ser Val Leu Ser Asp
385                 390                 395                 400

Gly Ser Leu Ser Tyr Asn Pro Gly Leu Ile Asp Pro Ser Asn Glu Ala
                405                 410                 415

Trp Asp Asp Ser Arg Lys Pro Leu Val Ala Gln Trp Glu Thr Leu Asp
            420                 425                 430

Gly Lys Asn Thr Phe Tyr Thr Ile Asn Val His Phe Thr Ser Lys Tyr
        435                 440                 445

Asp Ser Thr Ser Leu Glu Gly Asp Pro Arg Pro Val Asn Gly Trp
    450                 455                 460

Val Glu Asn Arg Val Asp Gln Ala Lys Val Val Ala Lys Phe Val Thr
465                 470                 475                 480

Ser Ile Leu Asp Val Asn Ser Asp Ala Lys Ile Ile Thr Ala Gly Asp
                485                 490                 495

Phe Asn Glu Tyr Ala Phe Val Glu Pro Leu Glu Val Phe Val Ser Glu
            500                 505                 510

Ser Lys Leu Gln Asp Leu Glu Glu Val Thr Gly Ile Pro Ala Thr Glu
        515                 520                 525

Arg Tyr Thr Tyr Leu Tyr Asn Gln Asn Cys Glu Ser Leu Asp His Met
    530                 535                 540

Tyr Val Ser Ser Ala Leu Thr Ser Gly Ala Lys Met Glu His Ile His
545                 550                 555                 560

Val Asn Ser Trp Val Ser Thr Asp Glu Leu Ser Asp His Asp Pro
                565                 570                 575

Thr Val Ala Leu Phe Asn Met Cys Glu
            580                 585

<210> SEQ ID NO 80
<211> LENGTH: 587
<212> TYPE: PRT
<213> ORGANISM: Phialophora geniculata

<400> SEQUENCE: 80

Ala Thr Ile Ala Glu Ile Asn Gly Asn Arg Phe Met Ser Pro Leu Gln
1               5                   10                  15

Gly Glu Val Val Thr Gly Val Glu Gly Leu Val Leu Ala Lys Gly Pro
            20                  25                  30

Asn Gly Ile Trp Leu Arg Ser Thr Val Pro Asp Asp Asp Leu Thr
```

```
            35                  40                  45
Ser Glu Ala Val Tyr Val Phe Asp Arg Asn Ile Ile Ala Arg Leu Ser
 50                  55                  60

Val Gly Asp Ile Val Lys Leu Asp Gly Thr Ile Leu Glu Tyr Arg Ala
 65                  70                  75                  80

Gln Ala Ala His Met Tyr Leu Thr Glu Ile Thr Ala Thr Ser Asn Leu
                 85                  90                  95

Glu Ile Leu Ser Ser Asn Asn Thr Val Thr Ala Tyr Val Ile Gly Glu
            100                 105                 110

Asp Thr Gly Ala Pro Pro Thr Glu Gln Tyr Ser Ser Leu Asp Glu Gly
            115                 120                 125

Asp Ile Phe Ala Val Pro Asn Asn Val Tyr Arg Val Ser Glu Glu Asn
        130                 135                 140

Pro Val Leu Glu Pro Ser Lys Tyr Gly Met Asp Tyr Trp Arg Ala Ile
145                 150                 155                 160

Asn Gly Glu Leu Val Thr Ile Lys Thr Pro Val Gly Val Ser Arg Pro
                165                 170                 175

Asn Gln Phe Gly Asp Thr Trp Val Val Gly Thr Trp Pro Thr Thr Gly
            180                 185                 190

Arg Asn Ser Gln Gly Gly Leu Thr Leu Arg Asp Lys Asp Ala Asn Pro
        195                 200                 205

Glu Ala Ile Ile Ile Gly Ser Pro Leu Asp Gly Thr Arg Asn Pro Glu
210                 215                 220

Thr Lys Met Gly Asp Lys Phe Ala Glu Ile Thr Gly Val Val Thr Tyr
225                 230                 235                 240

Ala Phe Gly Phe Tyr Arg Ile Leu Pro Leu Thr Ala Ile Glu Val Glu
                245                 250                 255

Glu Glu Ala Thr Ile Glu Val Ser Pro Thr Thr Leu Glu Ser Arg Gly
            260                 265                 270

Asp Cys Arg Gly Leu Thr Phe Ala Ser Tyr Asn Ile Glu Asn Leu Trp
        275                 280                 285

Ala Glu Ser Glu His Leu Pro Glu Val Ala Ala His Ile Val Glu Tyr
        290                 295                 300

Leu Lys Thr Pro Asp Phe Leu Phe Leu Gln Glu Val Gln Asp Asn Asn
305                 310                 315                 320

Gly Pro Thr Asn Asn Gly Val Val Ser Ala Asn Ile Thr Leu Ser Asn
                325                 330                 335

Leu Ala Ala Glu Ile Glu Ala Gln Ser Gly Ile Val Tyr Glu Phe Ala
            340                 345                 350

Glu Val Glu Pro Val Asn Asn Gln Asp Gly Gln Pro Gly Gly Asn
        355                 360                 365

Ile Arg Asn Ala Tyr Leu Tyr Arg Pro Asp Val Ile Glu Leu Tyr Glu
        370                 375                 380

Pro Asn Gln Gly Gly Ser Thr Asp Gln Ala Glu Val Val Asp Gly Pro
385                 390                 395                 400

Ala Leu Ser Phe Asn Pro Gly Arg Ile Asp Ile Ser Asn Ser Ala Trp
                405                 410                 415

Asp Ala Ser Arg Lys Pro Leu Val Ala Gln Trp Arg Ala Val Arg Gly
            420                 425                 430

Pro Arg Ser Lys Thr Phe Phe Thr Val Asn Val His Asn Gly Ser Lys
        435                 440                 445

Gly Gly Ser Ser Thr Leu His Gly Asp Phe Arg Pro Pro Val Asn Asn
450                 455                 460
```

```
Gly Val Glu Lys Arg Thr Gln Gln Thr Glu Ser Val Gly Ala Phe Val
465                 470                 475                 480

Asp Ala Ile Leu Ala Gln Asp Pro Lys Ala Arg Ile Ile Ala Gly
            485                 490                 495

Asp Trp Asn Glu Phe Gln Phe Val Gln Pro Gln Arg Val Ile Ala Glu
                500                 505                 510

Lys His Asn Met Thr Asp Leu Ser Val Leu Ala Leu Asp Glu Ile Glu
            515                 520                 525

Gln Tyr Asn Tyr Val Phe Asp Met Asn Ala Gln Gln Leu Asp His Ile
            530                 535                 540

Leu Val Ser Pro Ala Leu Ala Thr Asp Ala Ala Lys Ile Glu His Leu
545                 550                 555                 560

His Leu Ala Ala Trp Leu Arg Tyr Pro Asp Leu Thr Ser Asp His Asp
                565                 570                 575

Pro Leu Val Ser Tyr Leu Asn Val Cys Gly Cys
                580                 585

<210> SEQ ID NO 81
<211> LENGTH: 592
<212> TYPE: PRT
<213> ORGANISM: Paradendryphiella salina

<400> SEQUENCE: 81

Leu Ser Ile Ala Glu Ile Asn Gly Pro Lys Phe Leu Ser Pro Tyr Arg
1               5                   10                  15

Asp Gln Thr Val Ser Asn Ile Ser Gly Ile Val Thr Ala Lys Gly Pro
            20                  25                  30

Asn Gly Leu Trp Leu Arg Ser Pro Thr Pro Asp Arg Asp Glu Arg Thr
        35                  40                  45

Ser Glu Ser Leu Tyr Val Tyr Gly Ser Thr Phe Gly Ala Asn Leu Thr
    50                  55                  60

Val Gly Asp Ile Ile Val Gly Gly Arg Val Thr Glu Tyr Gln Ser
65                  70                  75                  80

Ser Lys Asp Tyr Ile Pro Leu Thr Glu Leu Ser Ala Pro Val Leu Glu
                85                  90                  95

Lys Lys Leu Ser Ser Gly Ala Asn Val Gln Pro Leu Val Ile Gly Val
            100                 105                 110

Asp Thr Arg Asp Pro Pro Asn Lys Gln Tyr Ser Ser Leu Asp Gly Gly
        115                 120                 125

Asp Val Phe Ala Val Pro Asn Asn Val Ser Gln Ile Ser Val Ala Asn
130                 135                 140

Pro Ala Leu Gln Pro Lys Glu Phe Gly Leu Asp Phe Trp Glu Ser Leu
145                 150                 155                 160

Met Gly Glu Leu Val Thr Val Lys Asn Pro Thr Ala Leu Thr Lys Pro
                165                 170                 175

Asn Gln Tyr Gly Asp Thr Trp Val Ala Gly Asp Trp Lys Val Ser Gly
            180                 185                 190

Arg Asn Lys Arg Gly Gly Leu Thr Met Thr Asp Lys Asp Ala Asn Pro
        195                 200                 205

Glu Ala Ile Ile Ile Gly Ser Pro Leu Asp Gly Thr Arg Asn Pro Thr
    210                 215                 220

Asp Thr Arg Met Gly Asp Ser Val Glu Glu Ile Thr Gly Val Val Thr
225                 230                 235                 240

Tyr Ala Phe Gly Phe Tyr Arg Ile Leu Pro Thr Thr Ala Ile Thr Val
```

```
            245                 250                 255
Thr Lys Ser Gln Thr Pro Asp Leu Pro Pro Ala Ser Thr Leu Val Ser
            260                 265                 270

Ser Gly Thr Cys Asp Gly Ile Thr Phe Gly Val Tyr Asn Val Glu Asn
        275                 280                 285

Leu Ala Pro Ser Ser Asp His His Pro Asp Leu Ala Asn His Ile Val
    290                 295                 300

Asn Tyr Met Asn Ser Pro Asp Ile Ile Phe Val Gln Glu Val Gln Asp
305                 310                 315                 320

Asp Asn Gly Pro Thr Asn Asp Gln Val Val Ser Ala Asn Leu Thr Leu
                325                 330                 335

Ser Thr Leu Ser Ala Ala Ile Ala Thr Ala Gly Gly Pro Asn Tyr Ala
            340                 345                 350

Phe Thr Glu Ile Val Pro Val Asp Asp Gln Asp Gly Gly Gln Pro Gly
        355                 360                 365

Gly Asn Ile Arg Asn Ala Tyr Leu Tyr Lys Pro Asn Val Leu Arg Leu
    370                 375                 380

Tyr Lys Pro Asn Leu Gly Gly Ser Leu Asp Ala Thr Glu Val Val Ala
385                 390                 395                 400

Gly Pro Thr Leu Ser Tyr Asn Pro Gly Arg Ile Glu Pro Glu Asn Glu
                405                 410                 415

Ala Trp Thr Asn Ser Arg Lys Pro Leu Ala Ala Gln Trp Glu Val Ile
            420                 425                 430

Gly Lys Arg Gly Ala Lys Lys Pro Asn Val Phe Phe Thr Val Asn Val
        435                 440                 445

His Phe Gly Ser Lys Gly Gly Ser Ser Ser Leu His Gly Asp Ala Arg
    450                 455                 460

Pro Pro Val Asn Gly Gly Val Asp Asp Arg Leu Glu Gln Ala Leu Leu
465                 470                 475                 480

Thr Ala Asn Phe Val Lys Asp Ile Leu Ser Gln Asp Lys Asn Ala Arg
                485                 490                 495

Ile Val Thr Ala Gly Asp Phe Asn Glu Phe Ala Phe Val Gln Pro Leu
            500                 505                 510

Glu Glu Tyr Thr Lys Ile Ser Gly Leu Lys Asp Leu Asp Glu Val Val
        515                 520                 525

Lys Leu Asp Lys Leu Glu Arg Tyr Thr Tyr Leu Tyr Asp Met Asn Thr
    530                 535                 540

Gln Glu Leu Asp His Met Phe Val Ser Pro Ser Leu Ala Lys Ser Arg
545                 550                 555                 560

Ala Lys Phe Glu His Ile His Val Asn Thr Trp Pro Glu Tyr Asp Ala
                565                 570                 575

Gln Val Ser Asp His Asp Pro Ser Val Ala Arg Leu Asp Val Cys Ala
            580                 585                 590

<210> SEQ ID NO 82
<211> LENGTH: 594
<212> TYPE: PRT
<213> ORGANISM: Aspergillus insuetus

<400> SEQUENCE: 82

Ala Val Thr Ile Ala Glu Ile Asn Gly Asn Ala Tyr Leu Ser Pro Leu
1               5                   10                  15

Lys Gly Glu Ser Val Ser Gly Val Glu Gly Leu Val Thr Ala Ile Gly
            20                  25                  30
```

-continued

Glu Ser Gly Phe Phe Leu Arg Ser Thr Thr Pro Asp Ser Asp Asp Ala
         35                  40                  45

Thr Ser Glu Ser Ile Tyr Val Tyr Gly Ser Ser Val Ser Lys Val
 50                  55                  60

Thr Val Gly Asp Ile Ile Thr Leu Ser Gly Lys Val Ser Glu Tyr Arg
 65                  70                  75                  80

Ser Gln Asp Thr Tyr Leu His Leu Thr Glu Ile Thr Ser Pro Ser Ser
                 85                  90                  95

Ile Val Val Lys Ser Ser Gly Asn Glu Val Thr Pro Val Ile Gly
             100                 105                 110

Lys Asp Arg Ser Pro Pro Thr Glu Val Tyr Ser Ser Leu Asp Ile Gly
             115                 120                 125

Asp Ile Tyr Ala Leu Pro Asn Asn Ile Ser Arg Ile Ser Glu Glu Asn
 130                 135                 140

Ser Ala Leu Lys Pro Asp Val Asn Gly Leu Asp Phe Trp Glu Ser Leu
145                 150                 155                 160

Ser Gly Glu Leu Val Ser Leu Thr Asp Leu Thr Ile Ile Thr Lys Pro
                165                 170                 175

Asn Gln Tyr Gly Asp Val Phe Val Arg Gly Asn Trp Ala Val Ser Gly
            180                 185                 190

Leu Asn Glu His Gly Gly Leu Thr Met Thr Ala Lys Asp Ser Asn Pro
    195                 200                 205

Glu Ala Ile Lys Ile Gly Thr Pro Leu Asp Gly Thr Arg Asn Arg Asp
    210                 215                 220

Asp Ser Lys Val Gly Asp Ile Val Glu Asp Val Thr Gly Val Val Gln
225                 230                 235                 240

Trp Val Phe Gly Gln Tyr Met Val Leu Pro Thr Thr Ala Leu Lys Val
                245                 250                 255

Thr Ala Ser Asn Asp Thr Ala Ala Pro Ala Ser Thr Leu Val Gly Asp
            260                 265                 270

Gly Thr Cys Lys Ser Leu Ser Ile Gly Ser Tyr Asn Val Glu Asn Leu
    275                 280                 285

Thr Pro Thr Ala Ser Asn Ile Glu Gly Ile Ala Asn His Ile Ala Asn
    290                 295                 300

Tyr Leu Asn Gly Pro Ala Leu Val Ala Leu Gln Glu Ile Gln Asp Asn
305                 310                 315                 320

Ser Gly Ala Thr Asp Asp Gly Val Val Ser Ala Asn Val Thr Leu Ser
                325                 330                 335

Thr Leu Ala Asn Leu Ile Ala Ala Ala Gly Gly Pro Asp Tyr Glu Phe
            340                 345                 350

Thr Glu Ile Val Pro Val Asn Asn Ala Asp Gly Gly Gln Pro Gly Gly
    355                 360                 365

Asn Ile Arg Val Ala Tyr Leu Tyr Asp Pro Thr Ile Ile Arg Leu Arg
    370                 375                 380

Asn Glu Asn Ile Gly Ser Ser Thr Asp Ala Asn Glu Val Leu Ala Gly
385                 390                 395                 400

Ala Glu Leu Lys Tyr Asn Pro Gly Leu Ile Asp Pro Ser Asn Ala Ala
                405                 410                 415

Trp Asp Ala Ser Arg Lys Pro Leu Ala Ala Trp Glu Thr Leu Asp
            420                 425                 430

Gly Lys Asn Lys Phe Phe Thr Val Asn Val His Phe Ser Ser Lys Gly
    435                 440                 445

Gly Gly Thr Thr Leu Gln Gly Asp Val Arg Pro Pro Val Asn Gly Ala

```
                450             455             460
Val Asp Gln Arg Ile Ala Gln Ala Glu Val Val Ala Ser Phe Ile Ala
465                 470                 475                 480

Ser Ile Leu Glu Lys Asp Pro Lys Ala Lys Ile Leu Ala Thr Gly Asp
                485                 490                 495

Phe Asn Glu Phe Ala Phe Val Glu Pro Leu Thr Thr Phe Val Ala Lys
                500                 505                 510

Ser Ser Leu Val Asp Leu Asp Glu Val Val Gly Ile Pro Glu Thr Glu
                515                 520                 525

Arg Tyr Thr Tyr Ile Tyr Asp Ser Asn His Gln Gln Leu Asp His Met
                530                 535                 540

Phe Val Ser Glu Ala Leu Gly Lys Gly Ala Lys Met Glu His Val His
545                 550                 555                 560

Val Asn Thr Trp Leu Asn Tyr Asp Asp Ala Ser Ser Asp His Asp Pro
                565                 570                 575

Ser Val Ala Val Phe Asn Val Cys Gly Lys Lys Ser Thr Cys Lys Pro
                580                 585                 590

Lys Tyr

<210> SEQ ID NO 83
<211> LENGTH: 588
<212> TYPE: PRT
<213> ORGANISM: Purpureocillium lilacinum

<400> SEQUENCE: 83

Val Ala Ile Ala Glu Ile Asn Gly Asp Arg Phe Leu Ser Pro Phe Gln
1               5                   10                  15

Asp Lys Asp Val Ala Asn Val Thr Gly Leu Val Thr Ala Thr Ser Lys
                20                  25                  30

Thr Gly Ile Tyr Leu Arg Ser Thr Ala Pro Asp Asp Ser Pro Ala Thr
            35                  40                  45

Ser Glu Gly Leu Phe Val Phe Ser Ser Ser Leu Val Lys Thr Ala Lys
        50                  55                  60

Val Gly Asp Val Val Thr Leu Ser Gly Leu Val Lys Glu Tyr Arg Ser
65                  70                  75                  80

Asn Lys Asp Tyr Ile Tyr Leu Thr Glu Leu Thr Asn Pro Thr Asn Val
                85                  90                  95

Val Val Val Ser Ser Gly Asn Ala Val Ala Pro Leu Val Val Gly Lys
                100                 105                 110

Asp Thr Leu Pro Pro Pro Thr Arg Asp Phe Ser Ser Leu Asp Ala Gly
            115                 120                 125

Gly Val Phe Gly Val Pro Asn Ala Ala Gly Thr Val Ser Gly Ala Asn
        130                 135                 140

Pro Lys Leu Asp Pro Thr Ala Tyr Gly Leu Asp Phe Trp Glu Ser Leu
145                 150                 155                 160

Val Gly Glu Leu Val Thr Val Lys Asp Ala Tyr Leu Thr Ser Arg Pro
                165                 170                 175

Asn Gln Tyr Gly Asp Val Trp Val Arg Gly Asp Trp Ala Val Thr Gly
            180                 185                 190

Val Asn Gly His Gly Gly Val Thr Met Leu Asp Gly Asp Ala Asn Pro
        195                 200                 205

Glu Thr Ile Val Val Gly Thr Pro Leu Asp Gly Ser Ala Asn Pro Thr
    210                 215                 220

Asp Thr Lys Met Gly Asp Phe Val Gly Asp Val Thr Gly Val Val Ser
```

```
            225                 230                 235                 240
Asn Ala Phe Gly Phe Tyr Arg Ile Leu Pro Leu Thr Arg Leu Val Pro
                245                 250                 255

Gln Arg Asn Ala Ser Ala Glu Phe Pro Ala Thr Ser Leu Ala Ser Arg
                260                 265                 270

Gly Ser Cys Arg Gly Ile Thr Val Ala Asp Tyr Asn Ala Glu Asn Leu
                275                 280                 285

Ala Pro Asp Ser Ala His Leu Pro Arg Val Val Asp Gln Ile Val Asn
                290                 295                 300

Glu Leu Arg Leu Pro Asp Leu Val Phe Leu Gln Glu Val Gln Asp Asn
305                 310                 315                 320

Ser Gly Ala Ala Asn Asp Gly Val Val Ser Ala Asn Leu Thr Leu Ser
                325                 330                 335

Thr Leu Thr Arg Gly Ile Glu Ala Ala Ser Gly Val Ala Tyr Ala Phe
                340                 345                 350

Ala Glu Val Glu Pro Gln Asp Gly Lys Asp Gly Gly Gln Pro Gly Gly
                355                 360                 365

Asn Ile Arg Cys Ala Tyr Leu Tyr Arg Pro Asp Val Val Glu Leu His
                370                 375                 380

Glu Pro Arg Gln Gly Gly Ser Leu Asp Ala Asn Glu Val Leu Pro Gly
385                 390                 395                 400

Pro Ala Leu Lys Phe Asn Pro Gly Arg Ile Gln Pro Ala Asn Ala Ala
                405                 410                 415

Phe Asp Asp Ser Arg Lys Pro Val Ala Ala Trp Arg Thr Val Lys
                420                 425                 430

Gly Thr His Lys Thr Phe Phe Thr Val Asn Val His Phe Gly Ser Lys
                435                 440                 445

Gly Gly Ser Thr Thr Leu His Gly Asp Ala Arg Pro Pro Val Asn Lys
                450                 455                 460

Gly Val Glu Lys Arg Thr Glu Gln Ala Thr Ile Thr Ala Asp Phe Ile
465                 470                 475                 480

Ala Ala Ile Leu Lys Gln Asp Pro Arg Ala Arg Val Ile Ala Ala Gly
                485                 490                 495

Asp Phe Asn Glu Phe Thr Gln Val Gln Pro Met Arg Val Phe Ala Glu
                500                 505                 510

Arg Ser Gly Leu Arg Asp Leu Asp Glu Leu Ala Gly Leu Ala Pro Glu
                515                 520                 525

Glu Arg Tyr Thr Tyr Leu Phe Asp Met Asn Ser Gln Ala Leu Asp His
                530                 535                 540

Met Tyr Val Ser Pro Ala Leu Gly Arg Gly Ala Arg Val Glu His Leu
545                 550                 555                 560

His Val Asn Thr Trp Gln Asn Phe Lys Gly Gln Thr Ser Asp His Asp
                565                 570                 575

Pro Ser Val Ala Leu Leu Asn Val Cys Gly Cys Ala
                580                 585

<210> SEQ ID NO 84
<211> LENGTH: 586
<212> TYPE: PRT
<213> ORGANISM: Warcupiella spinulosa

<400> SEQUENCE: 84

Ile Thr Ile Ala Glu Ile Asn Ser Asn Lys Tyr Leu Ser Pro Tyr Lys
1               5                   10                  15
```

```
Gly Gln Thr Ile Ser Gly Ile Glu Gly Leu Val Thr Ala Lys Gly Ser
            20                  25                  30

Ala Gly Phe Tyr Leu Arg Ser Thr Thr Pro Asp Asp Asp Ala Thr
        35                  40                  45

Ser Glu Ser Ile Tyr Val Tyr Gly Ser Ser Ala Val Ser Lys Val Ala
    50                  55                  60

Val Gly Asp Ile Ile Thr Leu Thr Gly Lys Val Ala Glu Tyr Arg Ser
65                  70                  75                  80

Ser Ser Ser Ser Tyr Val Tyr Leu Thr Glu Leu Thr Ser Pro Ser Asn
                85                  90                  95

Ile Val Val Ser Ser Ser Gly Asn Thr Val Thr Pro Val Ile Gly
            100                 105                 110

Gln Arg Gly Leu Ile Pro Pro Thr Glu Gln Phe Ser Ala Leu Asp Gly
            115                 120                 125

Gly Asp Val Phe Gly Val Pro Asn Asn Asp Ser Gln Ile Ser Leu Val
        130                 135                 140

Asn Pro Thr Leu Lys Pro Glu Lys Tyr Gly Met Asp Phe Trp Glu Ser
145                 150                 155                 160

Leu Ser Gly Glu Leu Ala Thr Val Lys Gly Val Arg Ala Val Ser Lys
                165                 170                 175

Pro Asn Arg Tyr Gly Asp Thr Trp Val Val Gly Asp Trp Lys Ser Thr
            180                 185                 190

Gly Met Asn Glu Arg Gly Gly Leu Thr Met Thr Asp Lys Asp Gly Asn
            195                 200                 205

Pro Glu Ala Ile Val Ile Gly Ser Pro Leu Asp Gly Ser Ser Asn Pro
    210                 215                 220

Asp Asn Thr Lys Leu Gly Asp Tyr Leu Asp Asp Ile Thr Gly Val Ile
225                 230                 235                 240

Thr Gln Ala Tyr Gly Tyr Tyr Ala Leu Leu Pro Leu Thr Ala Leu Thr
                245                 250                 255

Val Arg Glu Ser Asn Ser Thr Asn Ala Thr Ala Thr Arg Leu Ala Ala
            260                 265                 270

Asp Gly Asn Cys Ser Ala Ile Thr Val Gly Asp Tyr Asn Val Asn Asn
            275                 280                 285

Leu Ser Pro Ser Ser Thr Thr Leu Ser His Ile Ala Asn His Ile Ala
    290                 295                 300

Asn Tyr Leu Lys Ser Pro Thr Val Met Phe Val Gln Glu Ile Gln Asp
305                 310                 315                 320

Asp Asn Gly Ala Thr Asn Asp Gly Val Val Ser Ala Asn Leu Thr Leu
                325                 330                 335

Ser Thr Leu Val Arg Glu Ile Lys Ser Ala Gly Gly Ile Ala Tyr Ser
            340                 345                 350

Phe Val Asp Ile Asp Pro Ile Asp Asp Gln Asp Gly Gly Gln Pro Gly
        355                 360                 365

Gly Asn Ile Arg Asn Ala Tyr Leu Tyr Asp Ser Ile Val Arg Leu
    370                 375                 380

Arg Asn Leu Asn Pro Gly Ser Ser Gln Ala Gln Asp Val Phe Pro
385                 390                 395                 400

Gly Ala Glu Leu Lys Tyr Asn Pro Gly Leu Ile Asp Pro Thr His Pro
                405                 410                 415

Ala Trp Asp Ser Ser Arg Lys Pro Ile Ser Ala Val Trp Glu Thr Leu
            420                 425                 430

Asp Gly Lys Asn Lys Phe Phe Thr Val Asn Val His Phe Thr Ser Lys
```

-continued

```
                435                 440                 445
Gly Gly Gly Ser Ser Ile Glu Gly Asp Leu Arg Pro Pro Ala Asn Gly
        450                 455                 460

Gly Ile Glu Lys Arg Thr Glu Gln Ala Ser Ile Val Ala Asn Phe Thr
465                 470                 475                 480

Ser Thr Leu Leu Asn Thr Asp Pro Ser Ala Lys Ile Ile Val Ser Gly
                485                 490                 495

Asp Phe Asn Glu Phe Thr Phe Val Gln Pro Leu Glu Val Phe Ala Ala
                500                 505                 510

Glu Ser Gly Leu Thr Asp Leu Asp Asp Val Val Gly Thr Lys Gly Glu
                515                 520                 525

Glu Arg Tyr Thr Tyr Ile Tyr Asp Met Asn Cys Gln Ala Leu Asp His
                530                 535                 540

Met Phe Val Ser Gly Gly Leu Lys Ile Gly Ala Gln Phe Glu His Val
545                 550                 555                 560

His Leu Asn Thr Trp Val Ser Tyr Asp Glu Gln Ala Ser Asp His Asp
                565                 570                 575

Pro Ser Val Ala Arg Phe Asp Val Cys Glu
                580                 585

<210> SEQ ID NO 85
<211> LENGTH: 590
<212> TYPE: PRT
<213> ORGANISM: Stenocarpella maydis

<400> SEQUENCE: 85

Leu Ser Ile Ser Gln Ile Asn Gly Asn Arg Phe Leu Ser Pro Tyr Asp
1               5                   10                  15

Gly Gln Thr Leu Thr Asn Ile Ser Gly Leu Val Thr Ala Lys Gly Pro
                20                  25                  30

Thr Gly Val Phe Val Arg Ser Thr Ala Pro Asp Asn Asp Thr Ala Thr
            35                  40                  45

Ser Asp Ser Ala Phe Ile Tyr Ser Ser Ser Val Gly Ser Ser Leu Asn
        50                  55                  60

Val Gly Asp Ile Val Thr Phe Ser Ala Lys Val Ala Glu Phe Arg Ser
65                  70                  75                  80

Arg Gly Ser Thr Tyr Leu Tyr Leu Thr Glu Leu Thr Ser Pro Ala Asp
                85                  90                  95

Val Val Val Val Ser Arg Asn Asn Thr Val Ala Pro Leu Val Val Gly
                100                 105                 110

Glu Asp Thr Pro Tyr Pro Pro Thr Glu Lys Phe Ser Ser Leu Asp Gly
            115                 120                 125

Gly Asp Val Tyr Arg Ile Pro Asn Ala Val Ala Asn Ile Ser Ala Val
        130                 135                 140

Asn Pro Val Leu Asp Pro Ala Asn Tyr Gly Leu Asp Phe Trp Glu Ser
145                 150                 155                 160

Leu Ser Ala Glu Leu Val Thr Ile Arg Asn Val Thr Val Ile Ser Arg
                165                 170                 175

Pro Asn Ser Tyr Gly Glu Thr Trp Val Thr Gly Gly Trp Pro Val Thr
            180                 185                 190

Gly Arg Ser Ala Arg Gly Ser Leu Thr Met Thr Ala Leu Asp Ser Asn
        195                 200                 205

Pro Glu Val Ile Lys Ile Asp Glu Pro Leu Asp Gly Thr Ser Asn Pro
    210                 215                 220
```

```
Ala Ser Pro Lys Ile Gly Asp Lys Ala Thr Asp Ile Thr Gly Val Val
225                 230                 235                 240

Tyr Gln Gln Phe Gly Phe Tyr Tyr Ile Ile Pro Leu Thr Ala Tyr Glu
            245                 250                 255

Leu Thr Thr Leu Ala Asp Gly Thr Ala Pro Pro Thr Thr Leu Glu Ser
        260                 265                 270

Thr Arg Ser Cys Glu Gly Ile Thr Val Gly Asp Tyr Asn Val Glu Asn
    275                 280                 285

Leu Ser Pro Ala Ser Ala Asn Ile Glu Gly Arg Ala Asp His Ile Val
290                 295                 300

Asn Tyr Leu Gly Ala Pro Asp Leu Val Phe Val Gln Glu Ile Gln Asp
305                 310                 315                 320

Gly Ser Gly Pro Ala Asn Asp Gly Val Val Asp Ala Ser Ala Thr Leu
            325                 330                 335

Thr Ala Leu Val Asp Ala Ile Ala Ala Gly Asn Val Thr Tyr Ser
        340                 345                 350

Phe Val Glu Ile Ala Pro Glu Asp Gly Lys Asp Gly Gly Gln Pro Gly
            355                 360                 365

Gly Asn Ile Arg Val Ala Tyr Leu Tyr Arg Pro Glu Val Val Ser Leu
370                 375                 380

Tyr Lys Pro Ser Pro Gly Asp Ser Thr Thr Ala Thr Arg Val Val Ala
385                 390                 395                 400

Gly Glu Ser Gly Pro Glu Leu Thr Leu Asn Pro Gly Arg Ile Asp Pro
            405                 410                 415

Ala Asn Pro Cys Trp Val Ala Thr Arg Lys Pro Leu Val Ala Ala Trp
            420                 425                 430

Leu Ala Glu Gly Ala Thr Lys Pro Phe Phe Thr Val Asn Val His Trp
        435                 440                 445

Ser Ser Lys Gly Gly Ser Ser Leu Gln Gly Asp Met Arg Pro Pro
450                 455                 460

Val Asn Gly Val Val Gly Asn Arg Leu Ala Gln Ala Asn Val Thr Gly
465                 470                 475                 480

Gln Phe Ile Ser Glu Ile Leu Ala Ile Asp Pro Ser Ala Ala Val Ile
            485                 490                 495

Ala Ala Gly Asp Phe Asn Glu Phe Ala Phe Val Glu Pro Leu Thr Ala
            500                 505                 510

Phe Ala Asp Ile Ser Gly Leu Thr Glu Leu Asp Glu Val Val Gly Ile
            515                 520                 525

Pro Pro Glu Glu Arg Tyr Thr Tyr Thr Phe Asp Met Asn Thr Gln Ala
530                 535                 540

Leu Asp His Met Tyr Val Ser Pro Val Leu Glu Glu Gly Ala Gly Tyr
545                 550                 555                 560

Glu His Ile His Val Asn Thr Trp Ala Ala Glu Glu Asp Val Val Ser
            565                 570                 575

Asp His Asp Pro Ser Val Ala Leu Phe Gly Val Cys Gly Ala
            580                 585                 590

<210> SEQ ID NO 86
<211> LENGTH: 596
<212> TYPE: PRT
<213> ORGANISM: Acrophialophora fusispora

<400> SEQUENCE: 86

Leu Thr Ile Ala Glu Ile Asn Gly Asn Lys Phe Ile Ser Ser Tyr Asn
1               5                   10                  15
```

```
Gly Gln Ala Val Thr Asn Ile Thr Gly Leu Leu Ile Ala Lys Gly Pro
             20                  25                  30

Asn Gly Val Trp Ile Arg Ser Thr Pro Asp Asp Gln Ala Thr
         35                  40                  45

Ser Glu Ala Ile Tyr Val Phe Ser Ser Val Gly Ala Asn Leu Thr
 50                  55                  60

Val Gly Asp Ile Ile Ser Leu Asp Gly Lys Val Ser Glu Tyr Arg Ser
 65                  70                  75                  80

Ser Ser Asn Tyr Met Tyr Leu Thr Glu Ile Thr Ser Pro Lys Asn Val
                 85                  90                  95

Lys Val Val Ser Ser Gly Asn Thr Val Thr Pro Leu Val Ile Gly Gln
             100                 105                 110

Asp Thr Leu Ser Pro Pro Thr Val Gln Tyr Ser Ser Leu Asp Asn Gly
             115                 120                 125

Asp Ile Tyr Asn Leu Pro Asn Gly Val Ala Asn Val Ser Ala Ala Asn
 130                 135                 140

Pro Val Leu Asp Pro Thr Lys Tyr Gly Leu Asp Phe Trp Glu Ser Leu
145                 150                 155                 160

Ser Gly Glu Leu Val Thr Val Lys Lys Pro Thr Ala Ile Lys Thr Pro
                 165                 170                 175

Asn Gln Tyr Gly Asp Thr Trp Val Ile Gly Asp Trp Ala Val Thr Gly
             180                 185                 190

Arg Asn His His Gly Gly Val Thr Met Ser Asp Lys Asp Ser Asn Pro
             195                 200                 205

Glu Ala Ile Ile Ile Gly Ser Pro Leu Asp Arg Thr Lys Asn Pro Thr
             210                 215                 220

Thr Ser Lys Met Gly Asp Gln Phe Glu Asp Ile Thr Gly Val Val Gln
225                 230                 235                 240

His Ala Phe Gly Phe Tyr Ser Ile Leu Pro Leu Thr Ala Ile Lys Thr
                 245                 250                 255

Thr Thr Ala Ala Ser Ala Ala Ala Pro Pro Thr Thr Leu Leu Ser Gln
             260                 265                 270

Gly Lys Cys Lys Ala Ile Thr Val Gly Ser Tyr Asn Val Glu Asn Leu
             275                 280                 285

Ala Pro Asn Ser Thr His Leu Pro Lys Val Ala His Ile Val Asp
             290                 295                 300

Tyr Leu Lys Thr Pro Asp Leu Ile Phe Val Gln Glu Val Gln Asp Asn
305                 310                 315                 320

Ser Gly Pro Thr Asp Asp Gly Val Val Ser Ala Asn Thr Thr Leu Thr
                 325                 330                 335

Thr Leu Val Asp Ala Ile His Ser Leu Ser Gly Val Thr Tyr Ala Phe
             340                 345                 350

Ala Asp Val Asp Pro Val Ser Asn Ala Asp Gly Gly Gln Pro Gly Gly
             355                 360                 365

Asn Ile Arg Gln Ala Tyr Leu Tyr Arg Pro Glu Val Val Ser Leu Tyr
             370                 375                 380

Lys Pro Asn Gln Gly Gly Ser Asn Asp Ala Thr Glu Val Val Pro Gly
385                 390                 395                 400

Lys Gly Asn Gly Leu Ala Gly Val Pro Thr Leu Ser Phe Asn Pro Gly
             405                 410                 415

Arg Ile Glu Pro Gly Asn Ala Ala Trp Lys Ala Ser Arg Lys Pro Leu
             420                 425                 430
```

```
Ala Ala Val Trp Lys Ala Lys Gly Ala Lys Arg Pro Phe Tyr Thr Val
        435                 440                 445

Asn Val His Trp Ser Ser Lys Gly Gly Thr Ser Leu His Gly Asp
450                 455                 460

Arg Arg Pro Pro Val Asn Gly Ala Val Asp Ala Arg Met Ala Gln Ala
465                 470                 475                 480

Asn Val Thr Gly Thr Phe Ile Ala Gln Ile Leu Ser Leu Asp Pro Ala
                485                 490                 495

Ala Asn Val Ile Ala Ala Gly Asp Phe Asn Glu Phe Ala Phe Val Gln
                500                 505                 510

Pro Met Lys Thr Phe Ser Ala Ile Ser Thr Met Val Asp Leu Asp Glu
        515                 520                 525

Ala Ala Gly Ile Pro Val Glu Glu Arg Tyr Thr Tyr Ala Tyr Asp Met
    530                 535                 540

Asn Ala Gln Ala Leu Asp His Met Tyr Val Ser Pro Ala Leu Ala His
545                 550                 555                 560

Lys Lys Ser Thr Arg Phe Glu His Leu His Val Asn Ser Trp Ala Ser
                565                 570                 575

Tyr Asp Asp Val Val Ser Asp His Asp Pro Ser Ile Ala Leu Phe Asp
                580                 585                 590

Val Cys Gly Cys
        595

<210> SEQ ID NO 87
<211> LENGTH: 598
<212> TYPE: PRT
<213> ORGANISM: Chaetomium luteum

<400> SEQUENCE: 87

Leu Thr Ile Ser Glu Ile Asn Gly Asn Lys Phe Ile Ser Pro Tyr Ser
1               5                   10                  15

Gly Lys Ser Val Thr Asn Val Thr Gly Leu Leu Ile Ala Lys Gly Pro
            20                  25                  30

Asn Gly Ile Trp Ile Arg Ser Thr Thr Pro Asp Asp Asp Lys Thr Thr
        35                  40                  45

Ser Glu Ala Val Tyr Val Phe Ser Ser Ser Val Gly Ile Asn Leu Thr
    50                  55                  60

Val Gly Asp Ile Ile Ser Leu Asp Gly Lys Val Ser Glu Tyr Arg Ser
65                  70                  75                  80

Ser Ser Ser Tyr Ile Tyr Leu Thr Glu Ile Thr Ser Pro Lys Asn Val
                85                  90                  95

His Ile Leu Ser Ser Gly Asn Thr Val Thr Pro Leu Ile Ile Gly Lys
            100                 105                 110

Asp Thr Leu Ser Pro Pro Thr Val Gln Tyr Ser Asn Leu Asp Gly Gly
        115                 120                 125

Asp Ile Tyr Ser Leu Pro Asn Ala Val Ala Asn Ile Ser Glu Val Asn
    130                 135                 140

Pro Val Leu Asp Pro Ala Lys Tyr Gly Leu Asp Phe Trp Glu Ser Leu
145                 150                 155                 160

Ser Gly Glu Leu Val Thr Ile Asn Lys Pro Gln Ala Ile Lys Thr Pro
                165                 170                 175

Asn Glu Tyr Gly Asp Thr Trp Val Val Gly Asp Trp Ala Val Thr Gly
            180                 185                 190

Lys Asn Lys His Gly Gly Leu Thr Met Ser Asp Lys Asp Ser Asn Pro
        195                 200                 205
```

Glu Ala Ile Ile Ile Gly Thr Pro Leu Asp Gly Thr Lys Asn Pro Thr
210                 215                 220

Ile Ser Lys Met Gly Asp Gln Phe Glu Asp Ile Thr Gly Ile Val Gln
225                 230                 235                 240

Gln Thr Phe Gly Phe Tyr Asn Ile Leu Pro Leu Thr Ala Leu Lys Thr
                245                 250                 255

Thr Ser Ser Ala Ser Ala Ser Val Ser Pro Thr Phe Leu Leu Ser His
                260                 265                 270

Gly Lys Cys Lys Ala Leu Thr Val Gly Ser Tyr Asn Val Glu Asn Met
                275                 280                 285

Ala Pro Thr Ser Ser His Leu Pro Lys Val Ala His Ile Val Asp
290                 295                 300

Tyr Leu Lys Thr Pro Asp Leu Met Phe Val Gln Glu Ile Gln Asp Asn
305                 310                 315                 320

Ser Gly Pro Thr Asn Asp Gly Ile Val Ser Ala Asn Ala Thr Ile Thr
                325                 330                 335

Ala Leu Val Lys Ala Ile Lys Thr Leu Ser Gly Val Thr Tyr Ala Trp
                340                 345                 350

Thr Asp Ile Asp Pro Val Ser Asn Glu Asp Gly Gly Gln Pro Gly Gly
                355                 360                 365

Asn Ile Arg Gln Ala Tyr Leu Tyr Arg Pro Glu Val Leu Ser Leu Tyr
370                 375                 380

Glu Ala Asn Pro Gly Gly Ser Asn Asp Ala Thr Glu Val Val Pro Ala
385                 390                 395                 400

Glu Gly Lys Gly Lys Gly Phe Gly Gly Ala Pro Thr Leu Ser Phe Asn
                405                 410                 415

Pro Gly Arg Ile Asp Pro Ala Asn Ala Ala Trp Lys Asn Ser Arg Lys
                420                 425                 430

Pro Leu Ala Ala Val Trp Lys Ala Lys Gly Ala Lys Arg Pro Phe Tyr
                435                 440                 445

Thr Val Asn Val His Trp Ser Ser Lys Gly Gly Thr Ser Leu His
450                 455                 460

Gly Asp Val Arg Pro Pro Ile Asn Gly Ala Val Glu Ala Arg Met Ala
465                 470                 475                 480

Gln Ala Asn Val Thr Gly Ser Phe Ile Ala Lys Ile Leu Ala Leu Asp
                485                 490                 495

Pro Thr Ala Asn Ile Ile Ala Ala Gly Asp Phe Asn Glu Phe Ser Phe
                500                 505                 510

Val Gln Pro Leu Lys Met Phe Ser Thr Ile Ser Lys Met Val Asp Ile
                515                 520                 525

Asp Glu Ala Thr Glu Val Pro Ala Glu Glu Arg Tyr Thr Tyr Ala Tyr
530                 535                 540

Asp Met Asn Ala Gln Ala Leu Asp His Ile Phe Ile Ser Pro Ala Leu
545                 550                 555                 560

Ala Leu Ser Lys Thr Thr Arg Val Asp His Leu His Leu Asn Ser Trp
                565                 570                 575

Ala Ala Tyr Asp Asp Val Val Ser Asp His Asp Pro Ser Ile Ala Leu
                580                 585                 590

Leu Asp Val Cys Gly Cys
        595

<210> SEQ ID NO 88
<211> LENGTH: 592

<212> TYPE: PRT
<213> ORGANISM: Arthrinium arundinis

<400> SEQUENCE: 88

```
Leu Thr Ile Gly Glu Ile Asn Gly Asn Arg Phe Leu Ser Pro Tyr Asn
1               5                   10                  15

Gly Gln Asp Val Ser Asn Val Thr Gly Ile Val Thr Ala Lys Gly Pro
            20                  25                  30

Asp Gly Leu Trp Val Arg Ser Val Arg Lys Gly Cys Asp Arg Arg Val
        35                  40                  45

Ser Asp Ala Val Tyr Ile Tyr Gly Ser Ala Leu Ala Thr Asn Ala Ser
    50                  55                  60

Ile Ser Thr Gly Asp Val Val Leu Ser Gly Lys Val Ser Glu Tyr
65                  70                  75                  80

Arg Ser Asn Lys Asp Tyr Leu Tyr Met Thr Gln Ile Thr Ser Pro Lys
                85                  90                  95

Val Ala Ala Ile Leu Glu His Gly Lys Gln Val Pro Lys Val Ile
            100                 105                 110

Gly Lys Asp Thr Tyr Ser Pro Pro Thr Val Gln Tyr Thr Ser Leu Asp
        115                 120                 125

Glu Gly Asp Ile Phe Ala Val Pro Asn Asn Lys Ser Leu Val Ser Val
130                 135                 140

Ala Asn Pro Val Leu Glu Pro Glu Lys Tyr Gly Leu Asp Phe Trp Glu
145                 150                 155                 160

Ser Leu Ser Gly Gln Leu Val Thr Val Lys Ser Pro Arg Ala Ile Gly
                165                 170                 175

Arg Pro Asn Lys Tyr Gly Asp Thr Trp Val Val Gly Asp Trp Lys Thr
            180                 185                 190

Ser Gly Glu Asn Gly Arg Gly Gly Leu Thr Thr Met Ser Met Asp Ser
        195                 200                 205

Asn Pro Glu Gly Ile Val Ile Gly Ser Pro Leu Asp Gly Ser Lys Asn
    210                 215                 220

Pro Asn Asp Thr Lys Leu Gly Asp Thr Leu Glu Asp Ile Thr Gly Val
225                 230                 235                 240

Val Tyr Gln Ala Phe Gly Phe Tyr Arg Ile Leu Pro Leu Thr Lys Val
                245                 250                 255

Ala Val Val Ala Ser Gln Glu Pro Ala Met Pro Pro Thr Ser Leu
            260                 265                 270

Thr Ser Asp Gly Val Cys Ser Gly Leu Thr Ile Gly Ser Tyr Asn Ile
        275                 280                 285

Glu Asn Phe Trp Pro Gly Asp Thr Ala His Val Gln Ala Val Ala His
    290                 295                 300

His Ile Val Asp Tyr Leu Lys Thr Pro Asp Leu Val Phe Leu Gln Glu
305                 310                 315                 320

Val Gln Asp Asp Asn Gly Ala Thr Asp Gly Thr Val Ser Ser Asp
                325                 330                 335

Leu Thr Leu Ser Thr Leu Ala Ala Ile Glu Lys Ala Ser Gly Gly
            340                 345                 350

Ile Gly Tyr Asn Phe Thr Tyr Val Ala Pro Ile Asn Lys Lys Asp Gly
        355                 360                 365

Gly Ala Pro Gly Gly Asn Ile Arg Thr Ala Tyr Leu Phe Arg Arg Asp
    370                 375                 380

Val Leu Thr Leu Arg Asp Pro Asn Pro Ala Asp Ser Thr Thr Ala Asn
385                 390                 395                 400
```

```
Glu Val Leu Ser Gly Gly Ala Leu Lys Tyr Asn Pro Gly Leu Ile Asp
                405                 410                 415

Pro Thr Asn Ala Ala Phe Thr Asn Ser Arg Lys Pro Leu Thr Ala Ala
            420                 425                 430

Trp Gln Thr Leu Asp Gly Asn Ser Thr Phe Tyr Thr Val Asn Val His
        435                 440                 445

Trp Gly Ser Lys Gly Ser Ser Ser Ile His Gly Asp Ala Arg Pro
450                 455                 460

Pro Val Asn Gly Gly Val Lys Asp Arg Ile Ala Gln Ala Ala Val Thr
465                 470                 475                 480

Ala Asn Phe Ile Ala Ala Ile Leu Ala Glu Asp Pro Glu Ala His Ile
                485                 490                 495

Ile Thr Ser Gly Asp Phe Asn Glu Tyr Pro Phe Val Lys Pro Ile Thr
            500                 505                 510

Asp Phe Glu Ser Arg Ser Lys Met Glu Asp Leu Asp Val Val Ala Gly
        515                 520                 525

Ile Asp Pro Val Glu Arg Tyr Ser Tyr Leu Tyr Asp Met Asn Thr Gln
    530                 535                 540

Glu Leu Asp His Met Phe Val Ser Pro Ala Leu Ala Lys Thr Lys Pro
545                 550                 555                 560

Gln Phe Glu His Ile His Val Asn Thr Trp Ile Ala Tyr Asp Asp Met
                565                 570                 575

Val Ser Asp His Asp Pro Ser Val Ala Lys Met Asn Leu Cys Lys Tyr
            580                 585                 590

<210> SEQ ID NO 89
<211> LENGTH: 766
<212> TYPE: PRT
<213> ORGANISM: Phialophora geniculata

<400> SEQUENCE: 89

Gln Ser Ile His Ala Ile Asn Gly Lys Asn Phe Leu Ser Pro Tyr Asn
1               5                   10                  15

Gly Ala Leu Val Thr Asn Val Thr Gly Ile Val Thr Ala Lys Ala Ser
                20                  25                  30

Asn Gly Leu Tyr Leu Arg Ser Pro Lys Pro Ala Cys Asp Val Arg Ile
            35                  40                  45

Gly Asn Gly Leu Val Val Tyr Asp Ser Thr Ile Gly Lys Asn Glu Ser
        50                  55                  60

Ile Ala Val Gly Asp Thr Leu Val Leu Ser Gly Lys Ile Thr Glu Tyr
65                  70                  75                  80

Arg Ser Thr Ala Thr Tyr Leu Tyr Leu Thr Glu Leu Glu Ser Pro Val
                85                  90                  95

Val Gln Ser Trp Val Lys Gly Glu Thr Ala Pro Lys Pro Arg Val Ile
            100                 105                 110

Gly Thr Asp Thr Met Ser Pro Pro Thr Glu His Phe Thr Gly Leu Asp
        115                 120                 125

Asn Gly Asp Val Phe Gly Ile Pro Asn Asp Ser Arg Ile Ser Val
    130                 135                 140

Val Asn Pro Glu Leu Gln Pro Asp Lys Tyr Gly Leu Asp Phe Trp Lys
145                 150                 155                 160

Ser Leu Asn Gly Glu Leu Val Thr Met Ala Asn Pro Val Ala Ile Ser
                165                 170                 175

Lys Ile Thr Thr Tyr Gly Glu Thr Trp Met Val Gly Ser Trp Pro Thr
```

```
            180                 185                 190
Thr Gly Gln Asn Lys Arg Gly Gly Leu Thr Leu Gly Asp Lys Asp Gly
            195                 200                 205
Asn Pro Glu Ala Ile Ile Val Gly Ala Pro Leu Asp Gly Ser Arg Ala
            210                 215                 220
Val Asp Ser Tyr Arg Ile Gly Asp Thr Phe Gln Asn Ile Thr Gly Val
225                 230                 235                 240
Ile Arg Tyr Gln Phe Gly Phe Tyr Tyr Leu Leu Pro Leu Thr Ser Pro
                        245                 250                 255
Val Leu Val Ser Ser Pro Ser Ala Leu Pro Pro Thr Ser Leu
                260                 265                 270
Ile Ser Thr Gly Glu Cys Ser Gly Leu Thr Phe Gly Asp Tyr Asn Ile
                275                 280                 285
Glu Asn Phe Ala Pro Ser Asp Met Ala His Ala Asn Asp Val Ala Ala
            290                 295                 300
His Ile Val Asn Tyr Leu Lys Ser Pro Asp Val Leu Phe Val Gln Glu
305                 310                 315                 320
Val Gln Asp Asn Ser Gly Pro Thr Asn Asn Gly Val Val Asp Ser Ser
                        325                 330                 335
Val Thr Leu Ser Val Leu Ala Ser Val Ile Ala Asn Met Gly Gly Pro
                340                 345                 350
Lys Tyr Ser Tyr Thr Trp Ile Asn Pro Ile Asn Asn Ala Asp Gly Gly
                355                 360                 365
Gln Asn Gly Gly Asn Ile Arg Val Ala Tyr Leu Tyr Asn Ala Asp Leu
            370                 375                 380
Val Gln Leu Ser Asn Gly Ser Pro Gly Gly Ser Leu Asp Ala Asn Ala
385                 390                 395                 400
Val Leu Glu Asp Lys Asn Gly Arg Pro Thr Leu Lys Tyr Asn Pro Gly
                        405                 410                 415
Leu Ile Asp Pro Thr Asn Ala Ala Trp Ala Ala Thr Arg Lys Pro Leu
                420                 425                 430
Val Ala Gln Trp Gln Thr Val Val Gly Asn His Val Phe Phe Thr Val
            435                 440                 445
Asn Val His Trp Ser Ser Lys Gly Gly Ser Ser Leu Gln Gly Asp
            450                 455                 460
Pro Arg Pro Pro Ile Asn Ser Pro Ile Glu Lys Arg Ile Gln Gln Ala
465                 470                 475                 480
Asn Val Thr Ala Ser Phe Ile Ala Gln Ile Val Glu Ser Asp Ala Asp
                        485                 490                 495
Ala Arg Ile Ile Leu Ala Gly Asp Leu Asn Glu Phe Ala Phe Val Glu
                500                 505                 510
Pro Val Lys Thr Phe Ala Ala Val Ser Ser Met Val Asp Leu Asn Asp
            515                 520                 525
Ala Ala Asn Ile Pro Val Glu Glu Arg Tyr Thr Tyr Thr Phe Gly Ala
            530                 535                 540
Asn Met Gln Glu Ile Asp His Met Phe Val Ser Pro Ala Ile Ala Asn
545                 550                 555                 560
Leu Ser Pro Leu Gln Glu His Ile His Val Asn Thr Trp Val Ser Val
                        565                 570                 575
Lys Asp Gln Val Ser Asp His Asp Pro Thr Val Ala Lys Leu Asn Val
                580                 585                 590
Cys Gly Ile Asn Ile Gly Pro Asn Val Thr Ser Thr Thr Thr Thr Ser
                595                 600                 605
```

```
Thr Ala Thr Ile Thr Ser Ser Thr Ser Thr Val Thr Gly Val Val Thr
    610                 615                 620

Thr Thr Thr Leu Thr Thr Ser Thr Thr Thr Ser Thr Ala Ala Pro Ile
625                 630                 635                 640

Ala Ser Gly Thr Ala Leu Ser Gly Arg Gly Gln Phe Gln Val Thr Ser
                645                 650                 655

Pro Gly Val Ser Ser Gly Gly Ser Leu Ile Thr Ala Gly Thr Trp Tyr
            660                 665                 670

Arg Gly Gly Gly Thr Pro Ala Thr Tyr Thr Ala Thr Pro Asn Ala Asp
        675                 680                 685

Gly Lys Thr Phe Thr Leu Ala Thr Ser Arg Gly Lys Cys Ala Val Leu
    690                 695                 700

Ala Asp Thr Ser Phe Ser Cys Gly Thr Gly Ile Thr Thr Ala Ser Ser
705                 710                 715                 720

Phe Gly Phe Asp Gly Thr Tyr Leu Thr Phe Ser Gly Ser Asn Val Phe
                725                 730                 735

His Ala Ala Ala Val Pro Ser Gly Thr Thr Gln Gly Thr Ile Phe Thr
            740                 745                 750

Ser Glu Gln Ala Val Thr Leu Gln Ala Ile Trp Lys Pro Leu
        755                 760                 765

<210> SEQ ID NO 90
<211> LENGTH: 122
<212> TYPE: PRT
<213> ORGANISM: Paenibacillus sp. 62212

<400> SEQUENCE: 90

Glu Thr Glu Pro Thr Thr Gln Gln Ala Ala Gly Ser Thr Ser Ala Glu
1               5                   10                  15

Thr Ile Thr Leu Tyr Phe Pro Gln Asp Arg Phe Pro Glu Thr Gly Lys
            20                  25                  30

His Ile Lys Asn Ala Ile Ala Ser Gly Glu Ser Ile Cys Thr Ile
        35                  40                  45

Asp Arg Lys Gln Ala Glu Glu Asn Arg Lys His Ser Leu Lys Gly Ile
    50                  55                  60

Pro Thr Lys Lys Gly Tyr Asp Arg Asp Glu Trp Pro Met Ala Met Cys
65                  70                  75                  80

Ala Glu Gly Gly Thr Gly Ala Asp Ile Ala Tyr Ile Ser Pro Ser Asp
                85                  90                  95

Asn Arg Gly Ala Gly Ser Trp Val Ser Asn Gln Leu Glu Lys Tyr Glu
            100                 105                 110

Asp Gly Thr Lys Ile Leu Phe Ile Val Lys
        115                 120

<210> SEQ ID NO 91
<211> LENGTH: 118
<212> TYPE: PRT
<213> ORGANISM: Paenibacillus sp. 62605

<400> SEQUENCE: 91

Asn Asp Thr Ser Val Thr Thr Ser Thr Glu Ala Asp Val Lys Ile
1               5                   10                  15

Val Phe Pro Ser Asp Arg Phe Pro Glu Thr Ala Lys His Ile Lys Asp
            20                  25                  30

Ala Ile Ala Ala Gly Glu Ser Pro Ile Cys Thr Ile Asp Arg Asp Gly
        35                  40                  45
```

Ala Glu Glu Asn Arg Lys Ser Leu Lys Gly Ile Ala Thr Lys Lys
            50                  55                  60

Gly Tyr Asp Arg Asp Glu Trp Pro Met Ala Met Cys Ala Glu Gly Gly
 65                  70                  75                  80

Ala Gly Ala Asp Ile Ala Tyr Ile Thr Pro Ser Asp Asn Arg Gly Ala
                 85                  90                  95

Gly Ser Trp Val Gly Asn Gln Leu Glu Lys Tyr Thr Asp Gly Thr Arg
            100                 105                 110

Val Glu Phe Val Val Glu
            115

<210> SEQ ID NO 92
<211> LENGTH: 115
<212> TYPE: PRT
<213> ORGANISM: Bacillus sp. 62738

<400> SEQUENCE: 92

Ser Glu Thr Ala Asp Ser Lys Gly Tyr Asp Gln Val Val Glu Leu Pro
  1               5                  10                  15

Ala Asp Lys Tyr Pro Glu Thr Ala Ala His Ile Lys Asn Ala Ile Ala
             20                  25                  30

Lys Gly Lys Thr Asp Met Cys Thr Ile Asp Arg Lys Gly Ala Lys Asp
         35                  40                  45

Arg Arg Lys Gln Ser Leu Ala His Ile Pro Thr Lys Lys Gly Tyr Asp
        50                   55                  60

Arg Asp Glu Phe Pro Met Ala Phe Cys Lys Glu Gly Gly Ser Gly Ala
 65                  70                  75                  80

Asp Ile Glu Tyr Ile Ser Pro Glu Asp Asn Arg Gly Ala Gly Ser Tyr
                 85                  90                  95

Ile Gly Asn Lys Val Glu Asn Leu Lys Asp Gly Thr Arg Val Lys Ile
            100                 105                 110

Ala Val Asn
        115

<210> SEQ ID NO 93
<211> LENGTH: 120
<212> TYPE: PRT
<213> ORGANISM: Bacillus pumilus

<400> SEQUENCE: 93

Gln Leu Glu Gln Ser Lys Gln Glu Thr Thr Asn Ser Ser Tyr Asp Lys
  1               5                  10                  15

Thr Ile His Phe Pro Ser Asp Arg Tyr Pro Glu Thr Ala Lys His Ile
             20                  25                  30

Glu Glu Ala Ile Asp Glu Gly His Ser Ser Val Cys Thr Ile Asp Arg
         35                  40                  45

Lys His Ser Asp Glu Gln Arg Asp Gln Ser Leu His Gly Ile Pro Thr
        50                   55                  60

Lys Arg Gly Tyr Asp Arg Asp Glu Trp Pro Met Ala Met Cys Lys Glu
 65                  70                  75                  80

Gly Gly Thr Gly Ala Ser Val Lys Tyr Ile Ser Pro Ser Asp Asn Arg
                 85                  90                  95

Gly Ala Gly Ser Trp Val Gly His Gln Leu Ser Asp Asp Pro Asp Gly
            100                 105                 110

Thr Arg Ile Gln Phe Ile Ile Asp
        115                 120

<210> SEQ ID NO 94
<211> LENGTH: 249
<212> TYPE: PRT
<213> ORGANISM: Bacillus horikoshii

<400> SEQUENCE: 94

```
Val Glu Asp Gly Ser Ser Thr Gln Leu Ala Asn Asn Ser Thr Asn His
1               5                   10                  15

Glu Pro Ser Ile Lys Val Arg Glu Thr Thr Asn Ile Glu Glu
            20                  25                  30

Asn His Glu Phe Pro Arg Thr Glu Val Pro Leu Ile Arg Val Ile Asp
        35                  40                  45

Gly Asp Thr Ile Lys Val Lys Ile Asp Gly Lys Glu Glu Asn Val Arg
    50                  55                  60

Phe Leu Leu Val Asp Thr Pro Glu Thr Ser His Pro Arg Met Asn Gly
65                  70                  75                  80

Pro Gln Pro Phe Gly Pro Glu Ala Lys Glu Phe Met Glu Glu Phe Ala
                85                  90                  95

Ala Thr Gly Lys Leu Glu Leu Glu Leu Asp Val Ser Glu Arg Asp Arg
            100                 105                 110

Tyr Gly Arg Val Leu Ala Tyr Val Tyr Val Asn Gly Val Ser Ala Gln
        115                 120                 125

Glu Glu Leu Leu Lys Arg Gly Leu Ala Arg Val Ala Tyr Ile Tyr Pro
    130                 135                 140

Pro Asn Thr Arg Tyr Val Asp His Tyr Gln Ala Leu Gln Glu Lys Ala
145                 150                 155                 160

Gln Ala Asp Gly Val Gly Ile Trp Ser Val Glu Asn Tyr Ala Gln Asp
                165                 170                 175

Asp Gly Phe Tyr Pro Glu Tyr Val Glu Asp Pro Asp Leu Lys Glu Ser
            180                 185                 190

Thr Glu Lys Gln Pro Val Thr Glu Asn Cys Pro Val Lys Gly Asn Ile
        195                 200                 205

Ser Ser Ser Gly Glu Lys Ile Tyr His Val Lys Thr Gly Ala Phe Tyr
    210                 215                 220

Glu Arg Thr Ile Pro Glu Glu Cys Phe Asn Thr Glu Glu Ala Met
225                 230                 235                 240

Lys Ala Gly Tyr Arg Lys Ser Lys Arg
                245
```

<210> SEQ ID NO 95
<211> LENGTH: 245
<212> TYPE: PRT
<213> ORGANISM: Bacillus sp. 62490

<400> SEQUENCE: 95

```
Ser Thr Tyr Glu Glu Thr Lys Pro Ser Ser Thr Val Glu Thr Asp Glu
1               5                   10                  15

Ile Glu Val Asp Glu Thr Gln Lys Glu Glu Ile Ile Glu Glu Thr Ser
            20                  25                  30

Glu Ser Phe Ile Gln Ala Thr Val Val Arg Val Asp Gly Asp Thr
        35                  40                  45

Val Ile Val Lys Leu Pro Asn Asn Gln Glu Glu Arg Val Arg Leu Leu
    50                  55                  60

Leu Val Asp Thr Pro Glu Ser Val His Pro Thr Lys Pro Val Gln Pro
65                  70                  75                  80
```

```
Phe Gly Ile Glu Ser Ser Glu Phe Ala Lys Gln Leu Met Tyr Pro Gly
                85                  90                  95

Lys Thr Val Glu Leu Glu Leu Asp Ile Asn Glu Arg Asp Lys Tyr Gly
            100                 105                 110

Arg Leu Leu Ala Tyr Val Trp Val Gly Glu Lys Met Leu Asn Glu Leu
            115                 120                 125

Leu Leu Glu Lys Gly Leu Ala Arg Val Ala Tyr Ile Phe Ala Pro Asn
        130                 135                 140

Thr Arg His Val Asp Arg Phe Leu Glu Ile Gln Lys Lys Ala Gln Gln
145                 150                 155                 160

Gln Glu Leu Gly Ile Trp Ser Ile Glu Asn Tyr Ala Thr Glu Ser Gly
                165                 170                 175

Phe Ala Glu Glu Ala Val Leu Glu Lys Gln Glu Pro Thr Lys Leu Thr
            180                 185                 190

Lys Ala Cys Asp Asp Pro Lys Ile Lys Gly Asn His Ser Ser Ser Gly
            195                 200                 205

Glu Leu Ile Tyr His Ile Pro Gly Gly Gln Tyr Tyr Glu Lys Thr Asn
        210                 215                 220

Pro Glu Glu Met Phe Cys Thr Glu Asp Glu Ala Leu Glu Ala Gly Tyr
225                 230                 235                 240

Arg Lys Ser Met Arg
                245

<210> SEQ ID NO 96
<211> LENGTH: 223
<212> TYPE: PRT
<213> ORGANISM: Bacillus sp. 13390

<400> SEQUENCE: 96

Lys Glu Ser Asn Ser Lys Glu Ala Val Glu Gln Arg Phe Ile Gln Ala
1               5                   10                  15

Ser Val Val Arg Val Val Asp Gly Asp Thr Leu Ile Val Lys Leu Asp
            20                  25                  30

His Lys Lys Glu Glu Arg Val Arg Leu Leu Leu Ile Asp Thr Pro Glu
        35                  40                  45

Ser Val His Pro Asp Lys Pro Val Gln Pro Phe Gly Ile Glu Ala Ser
    50                  55                  60

Glu Met Val Lys Glu Leu Met Lys Pro Gly Asp Leu Ile His Leu Glu
65                  70                  75                  80

Leu Asp Val Ser Glu Arg Asp Lys Tyr Gly Arg Leu Leu Ala Tyr Val
                85                  90                  95

Trp Ile Glu Asp Lys Met Val Asn Glu Leu Leu Leu Glu Lys Gly Phe
            100                 105                 110

Ala Arg Val Ala Tyr Val Tyr Ala Pro Asn Thr Lys Tyr Val Asp Gln
        115                 120                 125

Phe Tyr Asp Ile Gln Lys Gln Ala Gln Glu Arg Gly Ile Gly Ile Trp
    130                 135                 140

Ser Leu Glu Asn Tyr Val Val Asp Arg Gly Phe Asn Glu Glu Val Tyr
145                 150                 155                 160

Leu Glu Lys Asp Asn Pro Ser His Ser Asp Leu Ser Cys Ser Asn Pro
                165                 170                 175

Met Ile Lys Gly Asn His Ser Ser Arg Gly Asp Phe Ile Tyr His Val
            180                 185                 190

Pro Glu Gly Gln Tyr Tyr Asp Gln Thr Asn Ala Glu Glu Met Phe Cys
```

```
                195                 200                 205
Thr Glu Glu Glu Ala Lys Ala Ala Gly Tyr Arg Lys Ser Met Lys
    210                 215                 220
```

<210> SEQ ID NO 97
<211> LENGTH: 210
<212> TYPE: PRT
<213> ORGANISM: Jeotgalibacillus sp. 13376

<400> SEQUENCE: 97

```
Asp Lys Pro Glu Arg Leu Asn Ala Val Val Thr Asn Val Val Asp Gly
1               5                   10                  15

Asp Thr Ile Asp Val Lys Thr Glu Asp Gly Ser Ile Glu Arg Val Arg
            20                  25                  30

Leu Leu Leu Ile Asp Thr Pro Glu Thr Lys His Pro Gln Met Gly Val
        35                  40                  45

Gln Pro Phe Gly His Glu Ala Ser Ile Tyr Thr Glu Ser Ala Leu Leu
    50                  55                  60

Gly Glu Lys Ile Gln Leu Glu Phe Asp Val Ser Glu Arg Asp Arg Tyr
65                  70                  75                  80

Gly Arg Val Leu Ala Tyr Ile Trp His Gln Asp Glu Leu Phe Asn Gln
                85                  90                  95

Thr Leu Ile Glu Lys Gly Leu Ala Arg Val Ser Ile Tyr Pro Pro Asp
            100                 105                 110

Ile Lys Tyr Val Asp Glu Phe Glu Lys Ile Gln Glu Ala Arg Lys
        115                 120                 125

Ser Glu Leu Gly Ile Trp Ser Leu Gln Asn Tyr Val Thr Lys Lys Gly
    130                 135                 140

Tyr Glu Arg Lys Leu Asp Gln Ser Lys Asp Glu Glu Ile Ile Gln Pro
145                 150                 155                 160

Asp Gly Cys Thr Ile Lys Gly Asn Ile Asn Ser Lys Gly Glu Lys Ile
                165                 170                 175

Tyr His Asp Thr Asn Ser Arg Ser Tyr Ser Gln Thr Ile Pro Glu Glu
            180                 185                 190

Trp Phe Cys Thr Ile Glu Glu Ala Lys Ala Ala Gly Phe Arg Ala Pro
        195                 200                 205

Arg Asn
    210
```

<210> SEQ ID NO 98
<211> LENGTH: 231
<212> TYPE: PRT
<213> ORGANISM: Bacillus sp. 62738

<400> SEQUENCE: 98

```
Ser Thr Asn Lys Gln Glu Pro Ser Gln Ala Thr Thr Lys Gln Glu Ser
1               5                   10                  15

Asn Gln Thr Gln Asn Lys Thr Ser Asn Gly Gln Gln Ser Tyr Asn
            20                  25                  30

Ile Glu Asp Ile Ala Lys Asn Tyr Lys Gly Gln Lys Val Val Glu Ile
        35                  40                  45

Asn Gly Asn Lys Ala Asp Phe Thr Gln Asp Gln Leu Asp Lys Val Gln
    50                  55                  60

Leu Lys Asn Thr Asn Pro Thr Trp Gln Glu Phe Ser Asn Leu Asp Ser
65                  70                  75                  80

Lys Asn Arg Val Gly Val Ala Thr Ala Leu Ile Gly Lys Glu Ile Gln
```

```
                    85                  90                  95
Pro Lys Glu Lys Arg Asp Glu Arg Leu Asn Thr Lys Pro Thr Gly Trp
                100                 105                 110
His Gln Lys Lys Leu Ser Asp Gly Ser Thr Leu Phe Asp Arg Ser His
                115                 120                 125
Leu Ile Gly Tyr Gln Leu Thr Gly Gln Asn Asp Asn Pro Lys Asn Leu
            130                 135                 140
Met Thr Gly Thr Lys Asp Phe Asn Arg His Ser Met Leu Lys Tyr Glu
145                 150                 155                 160
Asn Met Val Asp Lys Glu Val Glu Lys Gly Ser Tyr Val Leu Tyr Glu
                165                 170                 175
Val Lys Pro Val Phe Ile Gly Asp Glu Leu Val Ala Arg Gly Val Gln
                180                 185                 190
Met Lys Ala Lys Thr Val Asn Asn Asn His Leu Asp Phe Asn Val Phe
            195                 200                 205
Cys Phe Asn Val Gln Asp Gly Val Glu Ile Asp Tyr Lys Asp Gly Thr
            210                 215                 220
Ser Lys Leu Val Asn Lys Gln
225                 230

<210> SEQ ID NO 99
<211> LENGTH: 268
<212> TYPE: PRT
<213> ORGANISM: Streptomyces iakyrus

<400> SEQUENCE: 99

Arg Ser Leu Leu Asp Leu Leu Lys Pro Pro Thr Gln His Gln Glu Gln
1               5                   10                  15
Thr Ser Arg Ser Gly Ser Ile Ser Gln Ser Ala Ala Leu Asp Leu Tyr
                20                  25                  30
Ser Asn Gln Gln Lys Gln Ala Ser Phe Asp Gly Cys Ala Glu Leu Phe
            35                  40                  45
Pro Ala Ala Lys Pro Ile Asn Val Ala Thr Val Pro Ala Thr Met Asn
50                  55                  60
Pro Met Ala Leu Cys Ser Asp Asn Phe Ala Val Leu Tyr Ser Gln Thr
65                  70                  75                  80
Ser Lys Thr Pro Leu Ile Val Val Glu Arg Leu Asn Ala Ser Gln Leu
                85                  90                  95
Gln Asp Ala Lys Gly Glu Glu Arg Thr Asn Gln Phe Tyr Pro Asp Pro
                100                 105                 110
Arg Ile Pro Lys Ser Gly Arg Ala Glu Leu Ser Asp Tyr Arg Gly Gln
            115                 120                 125
His Pro Ala Val Asp Arg Gly His Gln Ser Pro Ala Ala Asp Ala Pro
            130                 135                 140
Asn Pro Asn Ala Met Ala Gln Ser Phe Ala Leu Ser Asn Met Val Pro
145                 150                 155                 160
Gln Asp Pro Thr Asn Asn Arg Lys Ile Trp Ser Lys Val Glu Ser Asp
                165                 170                 175
Val Arg Lys Phe Ala Lys Arg Ala Asp Gly Asn Val Phe Val Phe Thr
                180                 185                 190
Gly Pro Leu Phe Asp Ser Gly His Ser Thr Ile Gly Glu Asn Lys Val
            195                 200                 205
Trp Val Pro Thr Arg Leu Phe Lys Leu Val Tyr Asp Ala Ser Ser Lys
            210                 215                 220
```

```
Arg Ala Trp Ala Tyr Val Leu Pro Asn Ala Glu Thr Arg Ile Glu Lys
225                 230                 235                 240

Pro Met Asp Tyr Asp Ala Phe Val Lys Ser Thr Gly Leu Lys Leu Leu
                245                 250                 255

Gly Asn Leu Pro Ile Ser Gly Ser Val Gly Arg Thr
            260                 265

<210> SEQ ID NO 100
<211> LENGTH: 245
<212> TYPE: PRT
<213> ORGANISM: Streptococcus infantis

<400> SEQUENCE: 100

Ser Asn Ala Thr Pro Gln Thr Gln Val Asn Gln Lys Ser Gln Ser Leu
1               5                   10                  15

Asp Thr Pro Ser Gln Lys Leu Ala Glu Ser Val Leu Thr Asp Ser Val
            20                  25                  30

Lys Lys Gln Ile Lys Gly Thr Leu Glu Trp Asn Gly Ser Gly Ala Phe
        35                  40                  45

Ile Val Asn Gly Asn Lys Thr Asn Leu Asp Ala Lys Val Ser Ser Lys
50                  55                  60

Pro Tyr Ala Asp Asn Lys Thr Lys Thr Val Gly Gly Glu Thr Val Pro
65                  70                  75                  80

Thr Val Ala Asn Ala Leu Met Ser Lys Ala Thr Arg Gln Tyr Lys Asp
                85                  90                  95

Arg Glu Glu Thr Gly Asn Gly Ser Thr Ser Trp Thr Pro Ala Gly Trp
            100                 105                 110

His Gln Val Lys Asn Leu Lys Gly Thr Tyr Asn His Ala Val Asp Arg
        115                 120                 125

Gly His Leu Leu Gly Tyr Ala Leu Ile Gly Gly Leu Asp Gly Phe Asp
    130                 135                 140

Ala Ser Thr Ser Asn Pro Lys Asn Ile Ala Val Gln Thr Ala Trp Ala
145                 150                 155                 160

Asn Gln Ala Arg Ala Glu Asp Ser Thr Gly Gln Asn Tyr Tyr Glu Ser
                165                 170                 175

Leu Val Arg Lys Ala Leu Asp Gln Asn Lys Arg Val Arg Tyr Arg Val
            180                 185                 190

Thr Leu Leu Tyr Ala Thr Glu Glu Asp Leu Val Pro Ser Ala Ser Gln
        195                 200                 205

Ile Glu Ala Lys Ser Ser Asp Gly Glu Leu Glu Phe Asn Val Val Val
    210                 215                 220

Pro Asn Val Gln Lys Gly Ile Gln Leu Asp Tyr Arg Thr Gly Lys Val
225                 230                 235                 240

Thr Val Thr Lys Asn
                245

<210> SEQ ID NO 101
<211> LENGTH: 110
<212> TYPE: PRT
<213> ORGANISM: Bacillus sp. 62599

<400> SEQUENCE: 101

Ala Ser Ser Tyr Asp Ala Thr Leu Thr Phe Pro Ser Asp Lys Tyr Pro
1               5                   10                  15

Tyr Thr Ala Asp His Ile Arg Asp Ala Ile Ala Ala Gly Gln Ser Ser
            20                  25                  30
```

```
Ile Cys Thr Ile Asp Arg Asp Gly Ala Glu Gln Asn Arg Glu Glu Ser
            35                  40                  45

Leu Arg Gly Ile Pro Thr Lys Lys Gly Tyr Arg Asp Glu Trp Pro
 50                  55                  60

Met Ala Met Cys Glu Glu Gly Ala Gly Ala Asp Val Arg Tyr Val
 65                  70                  75                  80

Pro Ser Ser Asp Asn Arg Gly Ser Gly Ala Trp Val Gly Asn Gln Leu
                 85                  90                  95

Ser Lys Tyr Pro Asp Gly Thr Arg Val Lys Phe Tyr Val Pro
            100                 105                 110

<210> SEQ ID NO 102
<211> LENGTH: 251
<212> TYPE: PRT
<213> ORGANISM: Bacillus akibai

<400> SEQUENCE: 102

Ser Thr Asp Glu Asn Lys Glu Asp Ile Leu Ile Glu Thr Ser Ser Ala
  1               5                  10                  15

Val Glu Thr Asp Glu Val Glu Val Asp Glu Gln Glu His Lys Glu Glu
                 20                  25                  30

Ser Pro Glu Glu Ser Asn Gly Thr Phe Ile Gln Ala Thr Val Val Arg
             35                  40                  45

Val Val Asp Gly Asp Thr Val Ile Val Lys Leu Pro Asn Asn Thr Glu
 50                  55                  60

Glu Arg Val Arg Leu Leu Leu Ile Asp Thr Pro Glu Ser Val His Pro
 65                  70                  75                  80

Thr Lys Pro Val Gln Pro Phe Gly Leu Glu Ala Ser Glu Phe Ala Lys
                 85                  90                  95

Glu Leu Met Tyr Pro Gly Lys Thr Val Glu Leu Glu Leu Asp Ile Asn
            100                 105                 110

Glu Arg Asp Arg Tyr Gly Arg Leu Leu Ala Tyr Val Trp Ile Gly Asp
            115                 120                 125

Glu Met Leu Asn Glu Leu Leu Leu Glu Asn Gly Leu Ala Arg Val Ala
            130                 135                 140

Tyr Ile Phe Ala Pro Asn Thr Arg His Val Asp Arg Phe Tyr Glu Ile
145                 150                 155                 160

Gln Lys Lys Ala Gln Gln Gln Ala Ile Gly Ile Trp Ser Ile Glu Asn
                165                 170                 175

Tyr Ala Thr Glu Gly Gly Phe Ala Glu Glu Val Asp Leu Glu Lys Gln
            180                 185                 190

Glu Pro Ser Lys Leu Ala Asn Ala Cys Asp Asp Pro Lys Ile Lys Gly
            195                 200                 205

Asn His Ser Ser Ser Gly Asp Leu Ile Tyr His Ile Pro Gly Gly Gln
            210                 215                 220

Tyr Tyr Glu Lys Thr Asn Pro Glu Glu Met Phe Cys Thr Glu Glu Glu
225                 230                 235                 240

Ala Lys Glu Ala Gly Tyr Arg Lys Ser Met Arg
                245                 250

<210> SEQ ID NO 103
<211> LENGTH: 125
<212> TYPE: PRT
<213> ORGANISM: Paenibacillus xylanexedens

<400> SEQUENCE: 103
```

```
Gly Gly Glu Trp Pro Glu Glu Ile Pro Asn Pro Phe Gly Gly Thr Asn
1               5                   10                  15

Lys Ser Val Asp His Thr Ile Thr Phe Pro Ser Glu Arg Tyr Pro Glu
            20                  25                  30

Thr Ala Lys His Ile Lys Ala Ala Ile Lys Ala Gly His Ser Asp Val
        35                  40                  45

Cys Thr Ile Asp Arg Asn Gly Ala Glu Gly Asn Arg Asp Leu Ser Leu
50                  55                  60

Lys Gly Val Pro Val Lys Gly Lys Asp Arg Asp Glu Trp Pro Met
65                  70                  75                  80

Ala Met Cys Ala Glu Gly Gly Thr Gly Ala Asp Ile Gln Tyr Ile Thr
                85                  90                  95

Pro Lys Asp Asn Arg Gly Ala Gly Ser Trp Val Gly Asn Gln Leu Ser
            100                 105                 110

Thr Tyr Pro Asp Gly Thr Arg Val Lys Phe Val Val Lys
            115                 120                 125
```

<210> SEQ ID NO 104
<211> LENGTH: 182
<212> TYPE: PRT
<213> ORGANISM: Fictibacillus sp. 62719

<400> SEQUENCE: 104

```
Leu Pro Pro Gly Thr Pro Thr Lys Ser Ala Ala Gln Ser Gln Leu Asn
1               5                   10                  15

Ala Leu Val Val Lys Thr Glu Gly Thr Met Thr Gly Tyr Ser Arg Asp
            20                  25                  30

Leu Phe Pro His Trp Ser Ser Gln Gly Gly Gly Cys Asp Thr Arg Gln
        35                  40                  45

Val Val Leu Lys Arg Asp Ala Asp Ser Phe Ser Gly Asn Cys Pro Val
50                  55                  60

Thr Ser Gly Ser Trp Tyr Ser Tyr Tyr Asp Gly Ile Thr Ile Thr Asn
65                  70                  75                  80

Pro Ser Asp Leu Asp Ile Asp His Val Val Pro Leu Ala Glu Ala Trp
                85                  90                  95

Arg Ser Gly Ala Ser Ser Trp Thr Thr Asp Arg Arg Glu Ala Phe Ala
            100                 105                 110

Asn Asp Leu Thr Gly Pro Gln Leu Ile Ala Val Thr Ala Ser Ser Asn
        115                 120                 125

Arg Ser Lys Gly Asp Gln Asp Pro Ser Thr Lys Pro Thr Arg Thr
130                 135                 140

Ala Ala Gly Cys Gly Tyr Ala Lys Trp Trp Ile Gln Thr Lys Tyr Asn
145                 150                 155                 160

Trp Gly Leu Asn Leu Gln Ser Ala Glu Lys Thr Ser Leu Gln Ser Met
                165                 170                 175

Leu Asn Thr Cys Thr Tyr
            180
```

<210> SEQ ID NO 105
<211> LENGTH: 182
<212> TYPE: PRT
<213> ORGANISM: Exiguobacterium sp. NG55

<400> SEQUENCE: 105

```
Phe Pro Pro Asn Ile Pro Ser Lys Ala Asp Ala Leu Thr Lys Leu Asn
1               5                   10                  15
```

```
Ala Leu Thr Val Lys Asn Glu Gly Ser Met Thr Gly Tyr Ser Arg Asp
            20                  25                  30

Ile Phe Pro His Trp Ser Ser Gln Gly Ser Gly Cys Asn Thr Arg His
        35                  40                  45

Ile Val Leu Lys Arg Asp Ala Asp Ser Val Val Asp Gln Cys Pro Val
    50                  55                  60

Thr Thr Gly Ser Trp Tyr Ser Tyr Tyr Asp Gly Leu Thr Phe Thr Ser
65                  70                  75                  80

Ala Ser Asp Ile Asp Ile Asp His Val Val Pro Leu Ala Glu Ala Trp
                85                  90                  95

Arg Ser Gly Ala Ser Ser Trp Thr Thr Thr Lys Arg Gln Ser Phe Ala
            100                 105                 110

Asn Asp Leu Asn Gly Pro Gln Leu Ile Ala Val Ser Ala Ser Ser Asn
        115                 120                 125

Arg Ser Lys Gly Asp Gln Asp Pro Ser Thr Trp Gln Pro Pro Arg Thr
    130                 135                 140

Gly Ala Arg Cys Ala Tyr Ala Lys Met Trp Val Glu Thr Lys Ser Arg
145                 150                 155                 160

Trp Gly Leu Ser Leu Gln Ser Ala Glu Lys Ser Ala Leu Thr Thr Ala
                165                 170                 175

Ile Asn Ala Cys Ser Tyr
            180

<210> SEQ ID NO 106
<211> LENGTH: 216
<212> TYPE: PRT
<213> ORGANISM: Streptomyces thermoalcalitolerans

<400> SEQUENCE: 106

Cys Thr Glu Asp Thr Gly Gly Pro Gly Thr Pro Glu Lys Thr Ala Ala
1               5                   10                  15

Gly Ala Ala Leu Ala Ala Val Glu Glu Leu Pro Val Lys Gly Arg Ala
            20                  25                  30

Pro Lys Thr Gly Tyr Glu Arg Glu Lys Phe Gly Arg Ala Trp Ala Asp
        35                  40                  45

Thr Asp Ser Asn Gly Cys Arg Thr Arg Asp Asp Ile Leu Lys Arg Asp
    50                  55                  60

Leu Glu Gln Val Arg Phe Thr Asp Gly Thr Cys Lys Val Ser Tyr Gly
65                  70                  75                  80

Val Leu Ala Ser Asp Pro Tyr Ser Gly Lys Glu Ile Val Phe Arg Arg
                85                  90                  95

Gly His Ser Gln Ile Asp Ile Asp His Val Val Ala Leu Ser Asp Ala
            100                 105                 110

Trp Gln Lys Gly Ala Lys Tyr Trp Asp Ala Ser Lys Arg Ile Ala Leu
        115                 120                 125

Ala Asn Asp Pro Leu Asn Leu Leu Ala Val Asp Ala Arg Thr Asn Arg
    130                 135                 140

Ala Lys Gly Asp Gly Asp Thr Ala Thr Trp Leu Pro Pro Asn Lys Ala
145                 150                 155                 160

Tyr Arg Cys Gln Tyr Val Ala Arg Gln Val Ala Val Lys Lys Lys Tyr
                165                 170                 175

Glu Leu Trp Val Thr Ala Ala Glu Lys Ala Ala Met Lys Arg Val Leu
            180                 185                 190

Ser Thr Cys Pro Asp Gln Lys Leu Pro Ser Gly Gly Thr Pro Thr Lys
        195                 200                 205
```

Ala Pro Glu Arg Phe Arg Ala Gln
    210                 215

<210> SEQ ID NO 107
<211> LENGTH: 200
<212> TYPE: PRT
<213> ORGANISM: Unknown
<220> FEATURE:
<223> OTHER INFORMATION: Metagenome from environmental sample C

<400> SEQUENCE: 107

Ser Leu Pro Asp Tyr Ala Ser Pro Ile Ser Thr Pro Thr Ser Gly Leu
1               5                   10                  15

Ala Thr Pro Ala Ser Asp Ala Ser Pro Ser Asp Arg Lys Asp Arg Thr
            20                  25                  30

Asp Tyr Asp Tyr Glu Leu Val Phe Pro Ser Asp Lys Tyr Pro Glu Thr
        35                  40                  45

Ala Leu His Ile His Gly Ala Ile Glu Met Gly Tyr Ser Asp Val Cys
    50                  55                  60

Thr Ile Asp Arg Gly Gly Ala Glu Gln Asn Arg Lys Glu Ser Leu Ala
65                  70                  75                  80

Gly Ile Glu Thr Arg Gln Gly Tyr Asp Arg Asp Glu Trp Pro Met Ala
                85                  90                  95

Met Cys Gly Glu Gly Gly Ala Gly Ala Ser Val Ala Tyr Ile Asp Ala
            100                 105                 110

Gly Asp Asn Arg Gly Ala Gly Ser Trp Val Gly Asn Gln Leu Lys Glu
        115                 120                 125

Tyr Pro Asp Gly Thr Arg Ile Leu Phe Ile Val Asp Lys Pro Ala Asn
    130                 135                 140

Leu Phe Pro Ala Gln Ser Pro Asn Ala Ser Ser Gln Pro Ala Asp Asp
145                 150                 155                 160

Ala Glu Val Tyr Tyr Lys Asn Cys Thr Ala Val Arg Glu Ala Gly Lys
                165                 170                 175

Ala Pro Leu His Lys Gly Glu Pro Gly Tyr Ala Ala His Leu Asp Arg
            180                 185                 190

Asp Gly Asn Gly Val Ala Cys Glu
        195                 200

<210> SEQ ID NO 108
<211> LENGTH: 463
<212> TYPE: PRT
<213> ORGANISM: Streptomyces davawensis

<400> SEQUENCE: 108

Asp Ala Thr Ile Val Ile Asn Pro Gly Thr Arg Tyr Gly Thr Trp Glu
1               5                   10                  15

Gly Trp Gly Thr Ser Leu Ala Trp Trp Gly Asn Val Phe Gly Thr Arg
            20                  25                  30

Asp Asp Phe Ala Asp Leu Phe Phe Thr Thr Lys Ser Val Thr Tyr Asn
        35                  40                  45

Gly Thr Ser Leu Pro Gly Leu Gly Leu Asn Ile Ala Arg Tyr Asn Leu
    50                  55                  60

Gly Ala Cys Ser Trp Asn Ala Val Asn Gly Glu Thr Met Val Lys Ser
65                  70                  75                  80

Pro Asn Ile Pro Ala Phe Lys Gln Ile Glu Gly Phe Trp Gln Asp Trp
                85                  90                  95

Asn Asn Glu Asp Pro Thr Ser Ser Ala Trp Asp Trp Thr Ala Asp Ala
            100                 105                 110

Thr Gln Arg Ala Met Leu Val Lys Ala Thr Gln Arg Gly Ala Val Thr
            115                 120                 125

Glu Leu Phe Ala Asn Ser Pro Met Trp Trp Met Cys Tyr Asn His Asn
        130                 135                 140

Pro Ser Gly Ala Ala Asp Gly Gly Asn Asn Leu Gln Thr Trp Asn Tyr
145                 150                 155                 160

Arg Gln His Ala Ser His Leu Ala Ala Ala Leu Tyr Ala Arg Thr
            165                 170                 175

Asn Trp Gly Val Asn Phe Ala Thr Val Asp Pro Phe Asn Glu Pro Ala
        180                 185                 190

Ser Ser Trp Trp Thr Ala Ser Gly Thr Gln Glu Gly Cys His Leu Asp
        195                 200                 205

Pro Ala Val Gln Ala Ala Val Leu Pro Tyr Met Arg Ser Glu Leu Asp
210                 215                 220

Lys Arg Gly Leu Thr Gly Val Arg Ile Ser Ala Ser Asp Glu Thr Asn
225                 230                 235                 240

Tyr Asp Thr Ala Arg Ser Thr Trp Ser Ser Phe Gly Ser Ala Thr Lys
            245                 250                 255

Ala Leu Val Ser Gln Val Asn Val His Gly Tyr Gln Gly Thr Gly Gly
            260                 265                 270

Arg Arg Asp Leu Leu Tyr Thr Asp Val Val Thr Thr Ser Gly Lys Lys
            275                 280                 285

Leu Trp Asn Ser Glu Thr Gly Asp Ser Asp Gly Thr Gly Leu Ser Met
        290                 295                 300

Ala Arg Asn Leu Cys Tyr Asp Phe Arg Trp Leu His Pro Thr Ala Trp
305                 310                 315                 320

Cys Tyr Trp Gln Val Met Asp Pro Ser Thr Gly Trp Ala Met Ile Ala
            325                 330                 335

Tyr Asp Ala Asn Thr Leu Gln Pro Thr Thr Val Gln Pro Lys Tyr Tyr
            340                 345                 350

Val Met Ala Gln Phe Ser Arg His Ile Arg Pro Gly Met Thr Ile Leu
            355                 360                 365

Asp Thr Gly Val Ser Phe Ala Ala Ala Tyr Asp Ala Ser Ala Arg
370                 375                 380

Arg Leu Val Leu Val Ala Asn Thr Ser Thr Ser Pro Gln Thr Phe
385                 390                 395                 400

Thr Phe Asp Leu Ser Arg Phe Thr Thr Val Thr Gly Gly Ser Gly Gly
            405                 410                 415

Leu Val Pro Arg Trp Asn Thr Val Thr Gly Gly Gly Asp Met Tyr Arg
            420                 425                 430

Ala Tyr Thr Asn Thr Tyr Val Thr Gly Lys Ser Val Ser Ala Thr Phe
            435                 440                 445

Ala Ala Gly Ser Val Gln Thr Leu Gln Val Asp Gly Val Thr Thr
            450                 455                 460

<210> SEQ ID NO 109
<211> LENGTH: 464
<212> TYPE: PRT
<213> ORGANISM: Streptomyces avermitilis

<400> SEQUENCE: 109

Asp Ala Thr Ile Ala Val Asn Pro Ser Thr Thr Tyr Gly Lys Trp Glu
1               5                   10                  15

Gly Trp Gly Thr Ser Leu Ala Trp Trp Ala Asn Val Phe Gly Ala Arg
            20                  25                  30

Asp Asp Phe Ala Asp Leu Phe Phe Thr Thr Lys Ser Val Thr Tyr Asn
            35                  40                  45

Gly Arg Thr Leu Pro Gly Leu Gly Leu Asn Ile Ala Arg Tyr Asn Leu
 50                  55                  60

Gly Ala Cys Ser Trp Asn Ser Val Ser Gly Glu Ser Met Val Ala Ser
 65                  70                  75                  80

Ala Asn Ile Pro Ala Phe Lys Gln Ile Glu Gly Tyr Trp Gln Asp Trp
            85                  90                  95

Asn Asn Glu Asp Pro Thr Ser Ser Ala Trp Lys Trp Thr Ala Asp Ala
            100                 105                 110

Ala Gln Arg Thr Met Leu Val Lys Ala Thr Ala Arg Gly Ala Thr Thr
            115                 120                 125

Glu Leu Phe Ala Asn Ser Pro Met Trp Trp Met Cys Leu Asn His Asn
130                 135                 140

Pro Ser Gly Ala Ser Gly Gly Asn Asn Leu Gln Ser Trp Asn Tyr
145                 150                 155                 160

Arg Gln His Ala Ser His Leu Ala Ala Val Ala Leu Tyr Ala Lys Ser
                    165                 170                 175

Asn Trp Gly Val Asn Phe Ala Thr Val Asp Pro Phe Asn Glu Pro Ser
            180                 185                 190

Ser Ser Trp Trp Thr Ala Thr Gly Thr Gln Glu Gly Cys His Met Asp
            195                 200                 205

Ala Ser Val Gln Ala Ala Val Leu Pro Tyr Leu Arg Ser Glu Leu Asp
            210                 215                 220

Arg Arg Gly Leu Thr Gly Thr Lys Ile Ser Ala Ser Asp Glu Thr Ser
225                 230                 235                 240

Tyr Asp Leu Ala Arg Thr Thr Trp Gly Ser Phe Gly Ser Ser Thr Lys
                    245                 250                 255

Ala Leu Val Asn Arg Val Asn Val His Gly Tyr Gln Gly Ser Gly Gly
            260                 265                 270

Arg Arg Asp Leu Leu Tyr Thr Asp Val Val Thr Thr Ala Gly Lys Ala
            275                 280                 285

Leu Trp Asn Ser Glu Thr Gly Asp Ser Asp Gly Thr Gly Leu Thr Leu
            290                 295                 300

Ala Ser Asn Leu Cys Leu Asp Phe Arg Trp Leu His Pro Thr Ala Trp
305                 310                 315                 320

Val Tyr Trp Gln Val Met Asp Pro Ser Ser Gly Trp Ala Met Ile Ala
                    325                 330                 335

Tyr Asp Ala Ser Thr Leu Gln Pro Gly Ala Val Gln Thr Lys Tyr Tyr
            340                 345                 350

Val Met Ala Gln Phe Ser Arg His Ile Arg Ala Gly Met Thr Ile Val
            355                 360                 365

Asp Thr Gly Val Gly Tyr Ala Ala Ala Tyr Asp Ala Thr Ala Arg
            370                 375                 380

Arg Leu Val Ile Val Ala Val Asn Thr Ser Thr Ser Ala Gln Thr Leu
385                 390                 395                 400

Thr Phe Asp Leu Ser Arg Phe Ser Thr Val Thr Gly Thr Gly Gly
                    405                 410                 415

Leu Val Arg Arg Trp Asn Thr Val Thr Gly Gly Gly Asp Leu Tyr
            420                 425                 430

```
Ala Ala His Ser Asp Thr Tyr Leu Ser Gly Lys Ser Leu Ser Val Pro
            435                 440                 445

Phe Ala Ala Gly Ala Val Gln Thr Leu Glu Val Asp Gly Val Thr Val
    450                 455                 460

<210> SEQ ID NO 110
<211> LENGTH: 458
<212> TYPE: PRT
<213> ORGANISM: Trichoderma harzianum

<400> SEQUENCE: 110

Asp Thr Thr Leu Ser Ile Asp Pro Thr Ser Asn Trp Gly Thr Trp Glu
1               5                   10                  15

Gly Trp Gly Val Ser Leu Ala Trp Trp Ala Lys Ala Phe Gly Asn Arg
            20                  25                  30

Asp Asp Leu Ala Asn Val Phe Phe Thr Arg Asn Asn Gln Val Ile Asn
        35                  40                  45

Gly Gln Asn Leu Pro Gly Leu Gly Phe Asn Ile Ala Arg Tyr Asn Ala
    50                  55                  60

Gly Ala Cys Ser Thr Asn Thr Tyr Asn Gly Ser Ser Met Val Val Ser
65                  70                  75                  80

Ser Ser Ile Lys Pro Ser Arg Gln Val Asp Gly Tyr Trp Leu Asp Trp
                85                  90                  95

Ala Ser Thr Asp Pro Ala Ser Ser Trp Asn Trp Asn Val Asp Ala
            100                 105                 110

Asn Gln Arg Ala Met Leu Gln Lys Ala Lys Ala Asn Gly Ala Asn Ile
        115                 120                 125

Phe Glu Leu Phe Ser Asn Ser Pro Met Trp Trp Met Cys Leu Asn His
    130                 135                 140

Asn Pro Ser Gly Ser Gly Ser Asp Asn Leu Gln Ser Trp Asn Tyr
145                 150                 155                 160

Gln Asn His Ala Val Tyr Leu Ala Asn Ile Ala Gln His Ala Gln Gln
                165                 170                 175

Asn Trp Gly Ile Gln Phe Gln Ser Val Glu Ala Phe Asn Glu Pro Ser
            180                 185                 190

Ser Gly Trp Gly Pro Thr Gly Thr Gln Glu Gly Cys His Phe Ala Val
        195                 200                 205

Ser Thr Met Ala Thr Val Ile Gly Tyr Leu Asn Thr Glu Leu Ala Gln
    210                 215                 220

Arg Gly Leu Ser Ser Phe Ile Ser Ala Ser Asp Glu Thr Ser Tyr Asp
225                 230                 235                 240

Leu Ala Ile Ser Thr Trp Gln Gly Leu Gly Ser Ser Ala Gln Asn Ala
                245                 250                 255

Val Lys Arg Val Asn Val His Gly Tyr Gln Gly Gly Gly Arg Arg
            260                 265                 270

Asp Thr Leu Tyr Ser Leu Val Ser Gln Ala Gly Lys Arg Leu Trp Asn
        275                 280                 285

Ser Glu Tyr Gly Asp Ala Asp Ala Ser Gly Lys Ser Met Tyr Thr Asn
    290                 295                 300

Leu Leu Leu Asp Phe Thr Trp Leu His Pro Thr Ala Trp Val Tyr Trp
305                 310                 315                 320

Gln Ala Ile Asp Gly Ser Gly Trp Gly Leu Ile Val Gly Asp Asn Asp
                325                 330                 335

Gln Leu Thr Leu Ser Ser Ala Ser Thr Lys Tyr Phe Val Leu Ala Gln
            340                 345                 350
```

```
Leu Thr Arg His Ile Arg Pro Gly Met Gln Ile Leu Thr Thr Pro Asp
            355                 360                 365

Gly Asn Thr Val Ala Ala Tyr Asp Ser Gly Ser Gln Lys Leu Val Ile
    370                 375                 380

Val Ala Ala Asn Trp Gly Ser Ala Gln Thr Ile Thr Phe Asp Leu Thr
385                 390                 395                 400

Arg Ala Lys Thr Ala Gly Ser Asn Gly Ala Thr Val Pro Arg Trp Ser
                405                 410                 415

Thr Gln Thr Ser Gly Gly Asp Gln Tyr Lys Ser Tyr Ser Asp Thr Lys
            420                 425                 430

Ile Asn Asn Gly Lys Phe Ser Val Ser Phe Ser Thr Gly Gln Val Gln
        435                 440                 445

Thr Phe Glu Ile Ser Gly Val Val Leu Lys
    450                 455

<210> SEQ ID NO 111
<211> LENGTH: 541
<212> TYPE: PRT
<213> ORGANISM: Ascobolus stictoideus

<400> SEQUENCE: 111

Gln Thr Tyr Thr Leu Glu Ala Glu Ala Gly Thr Leu Thr Gly Val Thr
1               5                   10                  15

Val Met Asn Glu Ile Ala Gly Phe Ser Gly Thr Gly Tyr Val Gly Gly
            20                  25                  30

Trp Asp Glu Asp Ala Asp Thr Val Ser Leu Thr Phe Thr Ser Asp Ala
        35                  40                  45

Thr Lys Leu Tyr Asp Val Lys Ile Arg Tyr Ser Gly Pro Tyr Gly Ser
    50                  55                  60

Lys Tyr Thr Arg Ile Ser Tyr Asn Gly Ala Thr Gly Gly Asp Ile Ser
65                  70                  75                  80

Leu Pro Glu Thr Thr Glu Trp Ala Thr Val Asn Ala Gly Gln Ala Leu
            85                  90                  95

Leu Asn Ala Gly Ser Asn Thr Ile Lys Leu His Asn Asn Trp Gly Trp
            100                 105                 110

Tyr Leu Ile Asp Ala Val Ile Leu Thr Pro Ser Val Pro Arg Pro Pro
        115                 120                 125

His Gln Val Thr Asp Ala Leu Val Asn Thr Asn Ser Asn Ala Val Thr
    130                 135                 140

Lys Gln Leu Met Lys Phe Leu Val Ser Lys Tyr His Lys Ala Tyr Ile
145                 150                 155                 160

Thr Gly Gln Gln Glu Leu His Ala His Gln Trp Val Glu Lys Asn Val
            165                 170                 175

Gly Lys Ser Pro Ala Ile Leu Gly Leu Asp Phe Met Asp Tyr Ser Pro
        180                 185                 190

Ser Arg Val Glu Phe Gly Thr Thr Ser Gln Ala Val Glu Gln Ala Ile
    195                 200                 205

Asp Phe Asp Lys Arg Gly Gly Ile Val Thr Phe Ala Trp His Trp Asn
    210                 215                 220

Ala Pro Ser Gly Leu Ile Asn Thr Pro Gly Ser Glu Trp Trp Arg Gly
225                 230                 235                 240

Phe Tyr Thr Glu His Thr Thr Phe Asp Val Ala Ala Leu Gln Asn
            245                 250                 255

Thr Thr Asn Ala Asn Tyr Asn Leu Leu Ile Arg Asp Ile Asp Ala Ile
```

```
                260                 265                 270
Ala Val Gln Leu Lys Arg Leu Gln Thr Ala Gly Val Pro Val Leu Trp
            275                 280                 285

Arg Pro Leu His Glu Ala Glu Gly Gly Trp Phe Trp Trp Gly Ala Lys
        290                 295                 300

Gly Pro Glu Pro Ala Lys Lys Leu Tyr Lys Ile Leu Tyr Asp Arg Leu
305                 310                 315                 320

Thr Asn Tyr His Lys Leu Asn Asn Leu Ile Trp Val Trp Asn Ser Val
                325                 330                 335

Ala Lys Asp Trp Tyr Pro Gly Asp Glu Ile Val Asp Val Leu Ser Phe
            340                 345                 350

Asp Ser Tyr Pro Ala Gln Pro Gly Asp His Gly Pro Val Ser Ala Gln
        355                 360                 365

Tyr Asn Ala Leu Val Glu Leu Gly Lys Asp Lys Leu Ile Ala Ala
370                 375                 380

Thr Glu Val Gly Thr Ile Pro Asp Pro Asp Leu Met Gln Leu Tyr Glu
385                 390                 395                 400

Ser Tyr Trp Ser Phe Phe Val Thr Trp Glu Gly Glu Phe Ile Glu Asn
                405                 410                 415

Gly Val His Asn Ser Leu Glu Phe Leu Lys Lys Leu Tyr Asn Asn Ser
            420                 425                 430

Phe Val Leu Asn Leu Asp Thr Ile Gln Gly Trp Lys Asn Gly Ala Gly
        435                 440                 445

Ser Ser Thr Thr Thr Val Lys Ser Thr Thr Thr Pro Thr Thr Thr
450                 455                 460

Ile Lys Ser Thr Thr Thr Pro Val Thr Thr Pro Thr Thr Val Lys
465                 470                 475                 480

Thr Thr Thr Thr Pro Thr Thr Thr Ala Thr Thr Val Lys Ser Thr Thr
                485                 490                 495

Thr Thr Ala Gly Pro Thr Pro Thr Ala Val Ala Gly Arg Trp Gln Gln
            500                 505                 510

Cys Gly Gly Ile Gly Phe Thr Gly Pro Thr Cys Glu Ala Gly Thr
        515                 520                 525

Thr Cys Asn Val Leu Asn Pro Tyr Tyr Ser Gln Cys Leu
530                 535                 540

<210> SEQ ID NO 112
<211> LENGTH: 526
<212> TYPE: PRT
<213> ORGANISM: Chaetomium virescens

<400> SEQUENCE: 112

Pro Arg Asp Pro Gly Ala Thr Ala Arg Thr Phe Glu Ala Glu Asp Ala
1               5                   10                  15

Thr Leu Ala Gly Thr Asn Val Asp Thr Ala Leu Ser Gly Phe Thr Gly
            20                  25                  30

Thr Gly Tyr Val Thr Gly Phe Asp Gln Ala Ala Asp Lys Val Thr Phe
        35                  40                  45

Thr Val Asp Ser Ala Ser Thr Glu Leu Tyr Asp Leu Ser Ile Arg Val
    50                  55                  60

Ala Ala Ile Tyr Gly Asp Lys Arg Thr Ser Val Val Leu Asn Gly Gly
65                  70                  75                  80

Ala Ser Ser Glu Val Tyr Phe Pro Ala Gly Glu Thr Trp Thr Asn Val
                85                  90                  95
```

-continued

```
Ala Ala Gly Gln Leu Leu Leu Asn Gln Gly Ser Asn Thr Ile Asp Ile
            100                 105                 110

Val Ser Asn Trp Gly Trp Tyr Leu Ile Asp Ser Ile Thr Leu Thr Pro
        115                 120                 125

Ser Thr Pro Arg Pro Ala His Gln Ile Asn Glu Ala Pro Val Asn Ala
    130                 135                 140

Ala Ala Asp Lys Asn Ala Lys Ala Leu Tyr Ser Tyr Leu Arg Ser Ile
145                 150                 155                 160

Tyr Gly Lys Lys Ile Leu Ser Gly Gln Gln Glu Leu Ser Leu Ser Asn
                165                 170                 175

Trp Ile Ala Gln Gln Thr Gly Lys Thr Pro Ala Leu Val Ser Val Asp
            180                 185                 190

Leu Met Asp Tyr Ser Pro Ser Arg Val Glu Arg Gly Thr Val Gly Thr
        195                 200                 205

Ala Val Glu Glu Ala Ile Gln His His Asn Arg Gly Gly Ile Val Ser
    210                 215                 220

Val Leu Trp His Trp Asn Ala Pro Thr Gly Leu Tyr Asp Thr Glu Glu
225                 230                 235                 240

His Arg Trp Trp Ser Gly Phe Tyr Thr Ser Ala Thr Asp Phe Asp Val
                245                 250                 255

Ala Ala Ala Leu Ser Ser Thr Thr Asn Ala Asn Tyr Thr Leu Leu Ile
            260                 265                 270

Arg Asp Ile Asp Ala Ile Ala Val Gln Leu Lys Arg Leu Gln Ser Ala
        275                 280                 285

Gly Val Pro Val Leu Phe Arg Pro Leu His Glu Ala Glu Gly Gly Trp
    290                 295                 300

Phe Trp Trp Gly Ala Lys Gly Pro Glu Pro Ala Lys Lys Leu Trp Gly
305                 310                 315                 320

Ile Leu Tyr Asp Arg Val Thr Asn His His Gln Ile Asn Asn Leu Leu
                325                 330                 335

Trp Val Trp Asn Ser Ile Leu Pro Glu Trp Tyr Pro Gly Asp Ala Thr
            340                 345                 350

Val Asp Ile Leu Ser Ala Asp Val Tyr Ala Gln Gly Asn Gly Pro Met
        355                 360                 365

Ser Thr Gln Tyr Asn Gln Leu Ile Glu Leu Gly Lys Asp Lys Lys Met
    370                 375                 380

Ile Ala Ala Ala Glu Val Gly Ala Ala Pro Leu Pro Asp Leu Leu Gln
385                 390                 395                 400

Ala Tyr Glu Ala His Trp Leu Trp Phe Thr Val Trp Gly Asp Ser Phe
                405                 410                 415

Ile Asn Asn Ala Asp Trp Asn Ser Leu Asp Thr Leu Lys Lys Val Tyr
            420                 425                 430

Thr Ser Asp Tyr Val Leu Thr Leu Asp Glu Ile Gln Gly Trp Gln Gly
        435                 440                 445

Ser Thr Pro Ser Ala Thr Thr Ser Ser Thr Thr Pro Ser Ala
    450                 455                 460

Thr Thr Thr Thr Thr Thr Pro Ser Thr Ala Thr Ala Thr Pro
465                 470                 475                 480

Ser Ala Thr Thr Thr Ala Ser Pro Val Thr Tyr Ala Glu His Trp Gly
                485                 490                 495

Gln Cys Ala Gly Lys Gly Trp Thr Gly Pro Thr Thr Cys Arg Pro Pro
            500                 505                 510

Tyr Thr Cys Lys Tyr Gln Asn Asp Trp Tyr Ser Gln Cys Leu
```

<210> SEQ ID NO 113
<211> LENGTH: 452
<212> TYPE: PRT
<213> ORGANISM: Preussia aemulans

<400> SEQUENCE: 113

Gln Thr Val Ile Tyr Gln Ala Glu Gln Ala Lys Leu Ser Gly Val Thr
1               5                   10                  15

Val Glu Phe Ser Ile Ile Lys Gln Val Val Gly Thr Gly Tyr Val Glu
            20                  25                  30

Gly Phe Asp Glu Ser Thr Asp Ser Ile Thr Phe Thr Val Glu Ser Thr
        35                  40                  45

Thr Ala Ala Leu Tyr Asp Leu Ala Leu Thr Tyr Asn Gly Pro Tyr Gly
    50                  55                  60

Asp Lys Tyr Thr Asn Val Val Leu Asn Asn Ala Ala Gly Ser Gln Val
65                  70                  75                  80

Ser Leu Pro Ala Thr Ala Trp Thr Thr Val Pro Ala Gly Gln Val
            85                  90                  95

Leu Leu Asn Ala Gly Ala Asn Thr Ile Gln Ile Gln Asn Asn Trp Gly
            100                 105                 110

Trp Tyr Leu Val Asp Ser Ile Ser Leu Lys Pro Ala Ala Thr Arg Gly
            115                 120                 125

Ala His Gln Ile Thr Thr Lys Pro Val Asn Lys Asn Ala Asn Ser Asp
130                 135                 140

Ala Lys Ala Leu Leu Lys Tyr Leu Gly Ser Ile Tyr Gly Lys Lys Ile
145                 150                 155                 160

Leu Ser Gly Gln Gln Asp Leu Ser Ser Leu Asp Trp Val Thr Lys Asn
            165                 170                 175

Val Gly Lys Thr Pro Ala Val Leu Gly Leu Asp Thr Met Asp Tyr Ser
            180                 185                 190

Glu Ser Arg Lys Ser Arg Gly Ala Val Ser Thr Asp Val Asp Lys Ala
            195                 200                 205

Ile Ala Phe Ala Lys Lys Gly Gly Ile Val Thr Phe Cys Trp His Trp
210                 215                 220

Gly Ala Pro Thr Gly Leu Phe Asp Ser Ala Ala Gln Pro Trp Tyr Arg
225                 230                 235                 240

Gly Phe Tyr Thr Asp Ala Thr Asp Phe Asn Ile Glu Thr Ala Leu Lys
            245                 250                 255

Asp Thr Thr Asn Ala Asn Tyr Thr Leu Leu Met Lys Asp Ile Asp Thr
            260                 265                 270

Ile Ala Val Gln Leu Lys Lys Leu Gln Asp Ala Gly Val Pro Val Ile
            275                 280                 285

Trp Arg Pro Leu His Glu Ala Glu Gly Gly Trp Phe Trp Trp Gly Ala
290                 295                 300

Lys Gly Pro Glu Pro Ala Lys Lys Leu Trp Lys Ile Met Tyr Asp Arg
305                 310                 315                 320

Leu Thr Asn Gln His Gly Leu Asn Asn Leu Val Trp Thr Trp Asn Ser
            325                 330                 335

Val Ala Pro Asn Trp Tyr Pro Gly Asp Asp Thr Val Asp Ile Val Ser
            340                 345                 350

Ala Asp Thr Tyr Ser Gln Gly Asp His Gly Pro Ile Ser Ala Thr Tyr
            355                 360                 365

Asn Asn Leu Leu Ala Leu Thr Asn Asp Thr Lys Ile Ala Ala Ala
    370                 375                 380

Glu Ile Gly Ser Val Met Glu Pro Ala Gln Leu Gln Ala Tyr Gln Ala
385                 390                 395                 400

Asp Trp Val Tyr Phe Cys Val Trp Ser Gly Glu Phe Ile Asp Gly Gly
                405                 410                 415

Val Trp Asn Ser Leu Asp Phe Leu Lys Lys Val Tyr Asn Asp Pro Tyr
                420                 425                 430

Val Leu Thr Leu Asp Glu Ile Gln Gly Trp Lys Thr Ala Arg Gly Lys
            435                 440                 445

Pro Arg Val Ser
    450

<210> SEQ ID NO 114
<211> LENGTH: 312
<212> TYPE: PRT
<213> ORGANISM: Yunnania penicillata

<400> SEQUENCE: 114

Ala Pro Ser Thr Thr Pro Val Asn Glu Lys Ala Thr Asp Ala Ala Lys
1               5                   10                  15

Asn Leu Leu Ser Tyr Leu Val Glu Gln Ala Ala Asn Gly Val Thr Leu
            20                  25                  30

Ser Gly Gln Gln Asp Leu Glu Ser Ala Gln Trp Val Ser Asp Asn Val
        35                  40                  45

Gly Lys Trp Pro Ala Ile Leu Gly Ile Asp Phe Met Asp Tyr Ser Pro
    50                  55                  60

Ser Arg Val Glu Tyr Gly Ala Val Gly Ser Thr Val Pro Asp Ala Ile
65                  70                  75                  80

Ser Tyr Asp Ser Asp Gly Gly Ile Val Thr Phe Cys Trp His Trp Gly
                85                  90                  95

Ser Pro Ser Gly Thr Tyr Asn Thr Thr Asp Gln Pro Trp Trp Ser Asn
            100                 105                 110

Phe Tyr Thr Glu Ala Thr Ala Phe Asp Ile Ala Ala Ala Met Asp Asp
        115                 120                 125

Pro Asp Ser Ala Asp Tyr Asn Leu Leu Val Arg Asp Ile Asp Ala Ile
    130                 135                 140

Ser Glu Leu Leu Leu Gln Leu Gln Asp Leu Asp Ile Pro Ile Leu Trp
145                 150                 155                 160

Arg Pro Leu His Glu Ala Glu Gly Gly Trp Phe Trp Trp Gly Ala Lys
                165                 170                 175

Gly Pro Glu Ala Cys Ile Ala Leu Tyr Arg Leu Met Phe Asp Arg Met
            180                 185                 190

Thr Asn His His Gly Leu Asn Asn Leu Leu Trp Val Trp Asn Ser Val
        195                 200                 205

Asp Pro Ser Trp Tyr Pro Gly Asn Asp Val Val Asp Ile Val Ser Ala
    210                 215                 220

Asp Ile Tyr Ala Asp Ala Gly Asp His Ser Pro Gln Glu Glu Thr Phe
225                 230                 235                 240

Ala Ser Leu Gln Ser Leu Thr Gly Asp Thr Lys Leu Val Ala Leu Gly
                245                 250                 255

Glu Val Gly Asn Ile Pro Asp Pro Ala Ser Thr Gly Gly Val Ala Asp
            260                 265                 270

Trp Ala Tyr Trp Val Thr Trp Asn Gly Asp Phe Ile Lys Gly Glu Asp
        275                 280                 285

```
Tyr Asn Pro Leu Glu Tyr Lys Lys Glu Val Phe Ser Ala Glu Asn Ile
            290                 295                 300

Ile Thr Arg Asp Glu Val Asp Val
305                 310

<210> SEQ ID NO 115
<211> LENGTH: 327
<212> TYPE: PRT
<213> ORGANISM: Myrothecium roridum

<400> SEQUENCE: 115

Gly Thr Ile Glu Asn Arg Gln Trp Leu Thr Tyr Asn Pro Val Asp Ser
1               5                   10                  15

Ala Ala Thr Thr Glu Ala Arg Ala Leu Leu Arg Tyr Ile Gln Ser Gln
            20                  25                  30

Tyr Gly Trp Arg Tyr Leu Ser Gly Gln Gln Glu Arg Ala Glu Val Gln
        35                  40                  45

Trp Leu Lys Ser Asn Ile Gly Lys Thr Pro Ala Ile Gln Gly Ser Asp
50                  55                  60

Leu Ile Asp Tyr Ser Pro Ser Arg Val Ser Tyr Gly Ala Thr Ser Thr
65                  70                  75                  80

Ala Val Glu Asp Ala Ile Ala Phe Asp Arg Gln Gly Gly Ile Val Thr
                85                  90                  95

Phe Thr Trp His Trp Asn Ala Pro Asn Cys Leu Tyr Asn Ser Ala Asp
            100                 105                 110

Gln Pro Trp Tyr Phe Gly Phe Tyr Thr Lys Ala Thr Cys Phe Asn Ile
        115                 120                 125

Gln Ala Ala Leu Ala Gln Gly Ser Asn Gly Ala Asp Tyr Lys Leu Leu
130                 135                 140

Ile Arg Asp Ile Asp Ala Ile Ala Val Gln Leu Lys Arg Leu Arg Asp
145                 150                 155                 160

Ala Lys Val Pro Ile Leu Phe Arg Pro Leu His Glu Pro Asp Gly Ala
                165                 170                 175

Trp Phe Trp Trp Gly Ala Lys Gly Ser Gly Pro Phe Lys Gln Leu Trp
            180                 185                 190

Asp Ile Leu Tyr Asp Arg Leu Thr Lys Tyr His Gly Leu His Asn Met
        195                 200                 205

Leu Trp Val Cys Asn Thr Glu Lys Ser Asp Trp Tyr Pro Gly Asn Asn
210                 215                 220

Lys Cys Asp Ile Ala Thr Thr Asp Val Tyr Val Asn Ala Gly Asp His
225                 230                 235                 240

Ser Val Gln Lys Ser His Trp Asp Ala Leu Tyr Gly Val Ser Gly Gly
                245                 250                 255

Gln Arg Ile Leu Ala Leu Gly Glu Gly Val Ile Pro Asp Pro Glu
            260                 265                 270

Arg Gln Ala Ser Glu Asn Val Pro Trp Ala Tyr Trp Met Thr Trp Asn
        275                 280                 285

Gly Tyr Phe Ile Arg Asp Gly Asn Tyr Asn Ser Arg Asn Phe Leu Gln
290                 295                 300

Ser Thr Phe Ser Asn Ala Arg Val Val Thr Leu Asp Gly Thr Ser Pro
305                 310                 315                 320

Leu Gly Asn Trp Lys Ser Ser
                325
```